United States Patent
Asai et al.

(10) Patent No.: US 8,933,601 B2
(45) Date of Patent: Jan. 13, 2015

(54) DETECTION STATOR, ROTATION DETECTOR AND MOUNTING STRUCTURE THEREOF

(75) Inventors: Toshimichi Asai, Kariya (JP); Hisashi Kino, Ichinomiya (JP); Kazuhiro Nakamura, Ichinomiya (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 311 days.

(21) Appl. No.: 13/363,477

(22) Filed: Feb. 1, 2012

(65) Prior Publication Data
US 2012/0200202 A1    Aug. 9, 2012

(30) Foreign Application Priority Data

Feb. 4, 2011  (JP) ................................. 2011-022217
Feb. 4, 2011  (JP) ................................. 2011-022218

(51) Int. Cl.
*H02K 11/00*  (2006.01)
*H02K 5/00*   (2006.01)
*H02K 24/00*  (2006.01)

(52) U.S. Cl.
CPC ............ *H02K 11/0031* (2013.01); *H02K 24/00* (2013.01)
USPC .............................. 310/68 B; 310/89; 310/91

(58) Field of Classification Search
CPC ................................................. H02K 11/0031
USPC ..................................... 310/68 B; 324/207.25
See application file for complete search history.

(56) References Cited

U.S. PATENT DOCUMENTS

| 5,931,620 | A  | * | 8/1999  | Sugai et al. ...................... 411/82 |
| 7,298,138 | B2 | * | 11/2007 | Mimura .................... 324/207.25 |
| 8,390,158 | B2 |   | 3/2013  | Nakamura et al. |
| 2008/0120850 | A1 |   | 5/2008  | Brandl |
| 2011/0031850 | A1 | * | 2/2011 | Nakamura et al. ........... 310/68 B |

FOREIGN PATENT DOCUMENTS

| JP | A-08-136211   |   | 5/1996  |           |
| JP | 2003023761 A  | * | 1/2003  | ............. H02K 29/12 |
| JP | A-2006-242758 |   | 9/2006  |           |
| JP | A-2008-134249 |   | 6/2008  |           |

(Continued)

OTHER PUBLICATIONS

Machine Translation, Tsuge et al., JP 2003023761 A, Jan. 24, 2003.*

(Continued)

*Primary Examiner* — Tran Nguyen
*Assistant Examiner* — Thomas Truong
(74) *Attorney, Agent, or Firm* — Oliff PLC

(57) ABSTRACT

A motor includes a rotary shaft and a motor housing internally housing the rotary shaft. The motor housing is provided with a mounting hole in a position corresponding to an end of the rotary shaft. A detection rotor is fixed to the end of the rotary shaft. A detection stator includes a detection part made of resin into a plate-like shape having a surface on which a planar coil is placed, an outer peripheral wall axially extending from an outer circumferential edge of the detection part, and a flange radially extending from the outer peripheral wall. The detection stator is placed so that a surface of the detection part faces the detection rotor and the surface of the detection part faces to the inside of the motor housing in the mounting hole, and fixed to outside of the motor housing with a screw to the flange.

6 Claims, 50 Drawing Sheets

(56) References Cited

FOREIGN PATENT DOCUMENTS

| | | |
|---|---|---|
| JP | A-2008-197046 | 8/2008 |
| JP | 2009-063443 A | 3/2009 |
| JP | 2009-133632 A | 6/2009 |
| JP | A-2010-133922 | 6/2010 |
| JP | A-2010-237077 | 10/2010 |
| JP | A-2011-041381 | 2/2011 |
| JP | A-2011-041382 | 2/2011 |
| JP | A-2011-099837 | 5/2011 |
| JP | A-2011-137633 | 7/2011 |

OTHER PUBLICATIONS

Japanese Office Action issued in Application No. 2011-022217 mailed Jan. 14, 2014 (with English Translation).

Office Action issued in Japanese Patent Application No. 2011-022217 dated Oct. 29, 2013 (with translation).

* cited by examiner

DETECTION STATOR, ROTATION DETECTOR AND MOUNTING STRUCTURE THEREOF

CROSS-REFERENCE TO RELATED APPLICATIONS

This application is based upon and claims the benefit of priority from the prior Japanese Patent Applications Nos. 2011-22217 and 2011-22218 both filed on Feb. 4, 2011, the entire contents of which are incorporated herein by reference.

TECHNICAL FIELD

The present invention relates to a detection stator to be used for detecting rotation of a rotary shaft of a motor, a rotation detector and a mounting structure thereof to the motor.

BACKGROUND ART

Conventionally, one example of this type of technique is known as a rotary transformer resolver disclosed in Patent Document 1 listed below. This resolver includes a stator-side core, a rotor-side core facing the stator-side core with a gap therefrom, a primary-side winding provided in the stator-side core, a secondary-side winding provided in the rotor-side core, a rotary transformer part including those primary-side winding and secondary-side winding, an excitation winding provided in the rotor-side core, a detection winding provided in the stator-side core, and a signal generator consisting of those excitation winding and detection winding. This resolver includes a stator-side sheet coil fixed to a surface of the stator-side core facing the gap and integrally formed with the primary winding of the rotary transformer part and the detecting winding of the signal generator, and a rotor-side sheet coil fixed to a surface of the rotor-side core facing the gap and integrally formed with the secondary-side winding of the rotary transformer part and the excitation winding of the signal generator which are connected in series.

Herein, the stator-side core is fixed to the inside of a bracket that internally holds and rotatably supports a shaft. The rotor-side core is fixed on the outer periphery of the shaft while facing the stator-side core with a gap therefrom.

RELATED ART DOCUMENTS

Patent Documents

Patent Document 1: JP 8 (1996)-136211A

DISCLOSURE OF THE INVENTION

Problems to be Solved by the Invention

In the resolver disclosed in Patent Document 1, however, the stator-side core is merely fixed to the inside of the bracket while the rotor-side core is merely fixed on the outer periphery of the shaft. Accordingly, their alignment and positional adjustment are difficult. In the case where a substrate of the stator-side core and a substrate of the rotor-side core are formed of resin or the like, for example, if those substrates are deformed, e.g., slightly warped, it is impossible to obtain parallelism and accurate distance between the stator-side sheet coil and the rotor-side sheet coil. In this case, at least one of the stator-side core and the rotor-side core has to be subjected to alignment and positional adjustment. However, Patent Document 1 neither discloses nor suggests such alignment and positional adjustment. Poor alignment and poor positional adjustment between the stator-side core and the rotor-side core affect detection accuracy of the resolver. This may have an influence on productivity of the resolver.

The present invention has been made in view of the above circumstances and to has a first purpose to provide a detection stator, a rotation detector and a mounting structure thereof, configured to able to facilitate alignment and positional adjustment of the detection stator with respect to a detection rotor and achieve detection accuracy of the rotation detector. A second purpose of the present invention is to provide a detection stator, a rotation detector and a mounting structure thereof, configured to facilitate alignment and positional adjustment of the detection stator to ensure parallelism and accurate distance with respect to a detection rotor and achieve detection accuracy of the rotation detector.

Means of Solving the Problems

To achieve the above purpose, one aspect of the invention provides a mounting structure of a rotation detector to a motor, the rotation detector including a detection stator and a detection rotor, wherein the motor includes a rotary shaft and a motor housing internally housing the rotary shaft, the motor housing being provided with a mounting hole in a position corresponding to an end of the rotary shaft, the detection rotor is fixed to the end of the rotary shaft, the detection stator includes: a detection part made of resin into a plate-like shape, the detection part having a surface on which a planar coil is placed; an outer peripheral wall formed along an outer circumferential edge of the detection part and extending in an axial direction; and a flange extending from the outer peripheral wall in a radial direction, the mounting structure includes a fixing member for fixing the detection stator to the motor housing, and the detection stator is placed so that the surface of the detection part faces the detection rotor and the surface of the detection part faces to the inside of the motor housing through the mounting hole, and the detection stator is fixed to the outside of the motor housing by the fixing member in the flange.

Another aspect of the invention provides a rotation detector to be mounted to a motor for use, the rotation detector including a detection stator and a detection rotor, wherein the motor includes a rotary shaft and a motor housing internally housing the rotary shaft, the motor housing being provided with a mounting hole in a position corresponding to an end of the rotary shaft, the detection rotor is configured to be fixed to the end of the rotary shaft of the motor, the detection stator includes: a detection part made of resin into a plate-like shape, the detection part having a surface on which a planar coil is placed; an outer peripheral wall formed along an outer circumferential edge of the detection part and extending in an axial direction; and a flange extending from the outer peripheral wall in a radial direction, the mounting structure includes a fixing member for fixing the detection stator to the motor housing, and the detection stator is placed so that the surface of the detection part faces the detection rotor and the surface of the detection part faces to the inside of the motor housing through the mounting hole, and the detection stator is fixed to the outside of the motor housing by the fixing member in the flange.

Another aspect of the invention provides a detection stator to form a rotation detector in cooperation with a detection rotor, the detection stator including: a detection part made of resin into a plate-like shape, having a surface on which a planar coil is placed; an outer peripheral wall formed along an outer circumferential edge of the detection part and extending in an axial direction; and a flange extending from the outer peripheral wall in a radial direction, the detection part being placed with its surface facing the detection rotor, and fixed to a motor by the fixing member through the flange.

Another aspect of the invention provides a mounting structure of a rotation detector to a motor, the rotation detector including a detection stator and a detection rotor, wherein the motor includes a rotary shaft and a motor housing internally housing the rotary shaft, the detection rotor is fixed to the rotary shaft inside of the motor housing, the detection stator is made of resin into a plate-like shape, the detection stator including: a detection part having a surface on which a planar coil is placed; and a plurality of protrusions provided on a back surface of the detection part, the mounting structure includes a fixing member for fixing the detection stator to the motor housing, and the detection stator is placed inside the motor housing so that the surface of the detection part faces the surface of the detection rotor, and the detection stator is fixed, through the plurality of protrusions, to the motor housing by the fixing member from outside of the motor housing.

Another aspect of the invention provides a rotation detector to be mounted to a motor for use, the rotation detector including a detection stator and a detection rotor, wherein the motor includes a rotary shaft and a motor housing internally housing the rotary shaft, the detection rotor is fixed to the rotary shaft of the motor inside of the motor housing, the detection stator is made of resin into a plate-like shape, the detection stator including: a detection part having a surface on which a planar coil is placed; and a plurality of protrusions provided on a back surface of the detection part, the mounting structure includes a fixing member for fixing the detection stator to the motor housing, and the detection stator is placed inside the motor housing so that the surface of the detection part faces the surface of the detection rotor, and the detection stator is fixed, through the plurality of protrusions, to the motor housing by the fixing member from outside of the motor housing.

Another aspect of the invention provides a detection stator forming a rotation detector in cooperation with a detection rotor, the detection stator including: a detection part made of resin into a plate-like shape, having a surface on which a planar coil is placed; and a plurality of fixing protrusions provided on a back surface of the detection part; and the detection stator is placed so that the surface of the detection part faces the detection rotor, and the detection stator is fixed, through the fixing protrusions, to the motor by a fixing member from outside of the motor.

Effects of the Invention

According to a mounting structure of a rotation detector of the invention, it is possible to facilitate alignment and positional adjustment of a detection stator with respect to a detection rotor, and easily achieve detection accuracy of the rotation detector.

According to a rotation detector of the invention, it is possible to facilitate alignment and positional adjustment of a detection stator with respect to a detection rotor, and easily achieve detection accuracy.

According to a detection stator of the invention, it can be suitably utilized in a rotation detector.

MODE FOR CARRYING OUT THE INVENTION

First Embodiment

A detailed description of a first embodiment of a detection stator, a rotation detector and a mounting structure thereof embodying present invention will now be given referring to the accompanying drawings.

Figure 1:
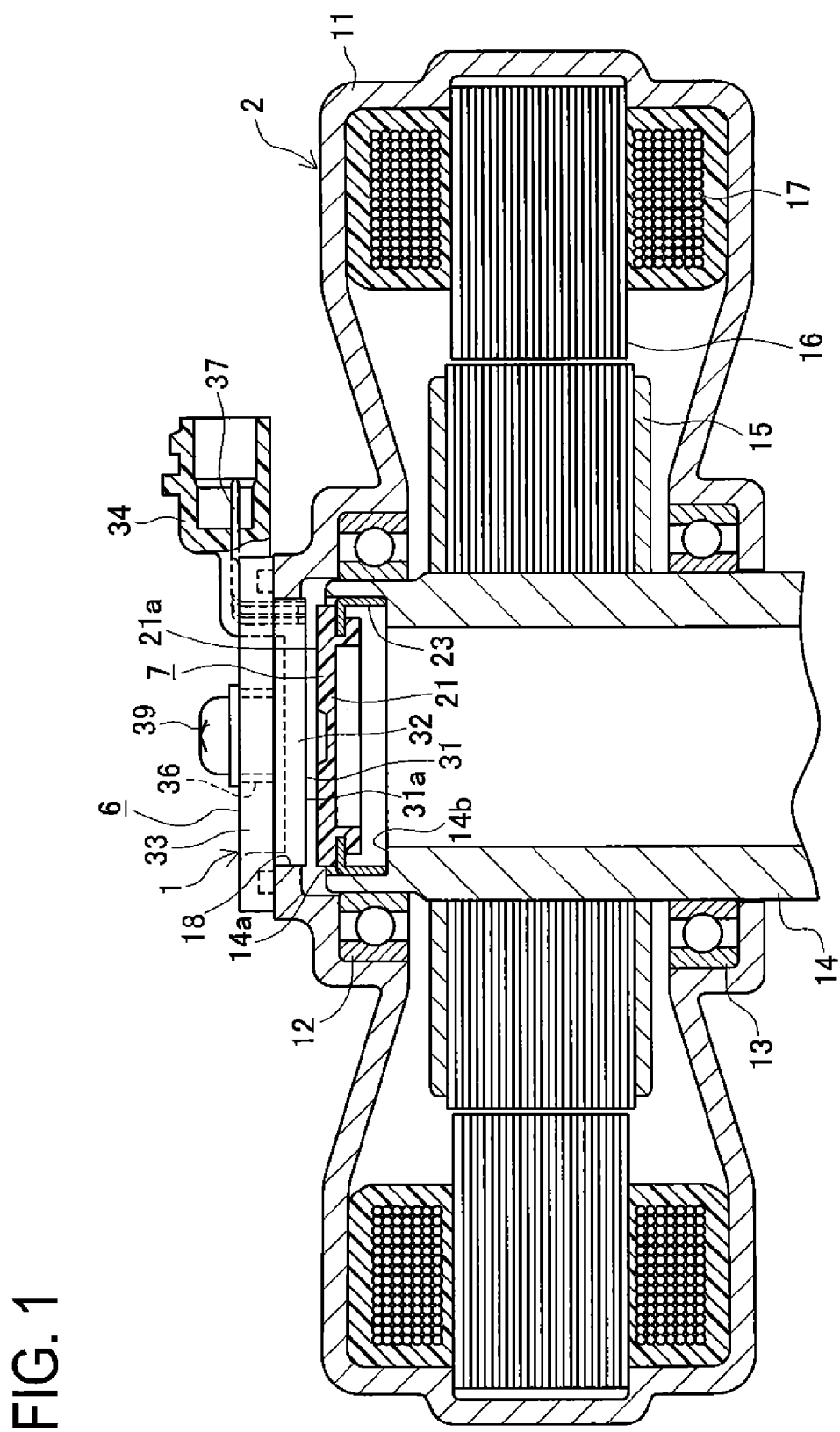
FIG. 1 is a front sectional view of a rotation detector and a motor to which the rotation detector is mounted in a first embodiment.

FIG. 1 is a front sectional view showing a rotation detector 1 and a motor 2 to which the rotation detector 1 is mounted in the present embodiment (hereinafter, the orientation in FIG. 1 is referred to as a front view for convenience). The motor 2 includes a motor housing 11 having an almost disk-like outer shape, a rotary shaft 14 housed in the motor housing 11 and rotatably supported at the inside center thereof through bearings 12 and 13, a motor rotor 15 fixed on an outer periphery of the rotary shaft 14 inside the motor housing 11, and a motor stator 16 placed outside the motor rotor 15 and fixed to the inside of the housing 11 with a gap therefrom. The motor stator 16 is provided with a coil 17.

The rotary shaft 14 of the motor 2 has a cylindrical shape at an end of which an opening 14a is formed. A shoulder 14b is formed near the opening 14a. The motor housing 11 is provided with a mounting hole 18 having a circular shape in plan view in a position corresponding to the end of the rotary shaft 14. This hole 18 is arranged with its inner periphery coaxial with the rotary shaft 14.

The rotation detector 1 includes a detection stator 6 and a detection rotor 7. The detection rotor 7 is fixed to the end of the rotary shaft 14 inside the motor housing 11. Specifically, the detection rotor 7 is fixed by being fitted in the opening 14a at the end of the rotary shaft 14 and aligned in contact with the shoulder 14b. The detection stator 6 is mounted in such a manner that it is externally inserted and mounted in the mounting hole 18 of the motor housing 11 so as to face the detection rotor 7.

Figure 2:
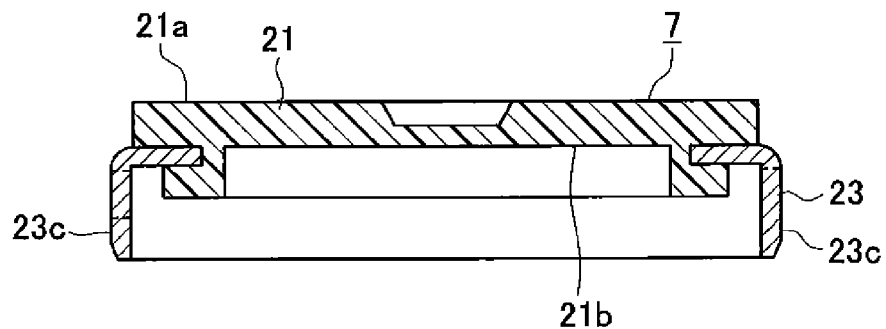
FIG. 2 is a front sectional view of a detection rotor in the first embodiment.
Figure 3:
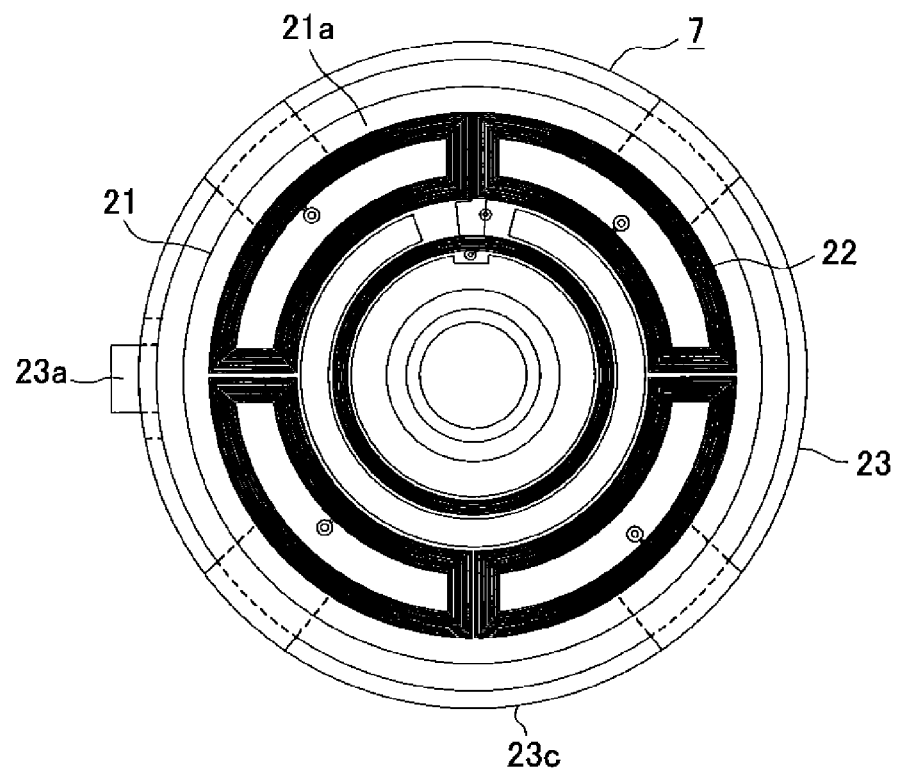
FIG. 3 is a plan view of the detection rotor in the first embodiment.
Figure 4:
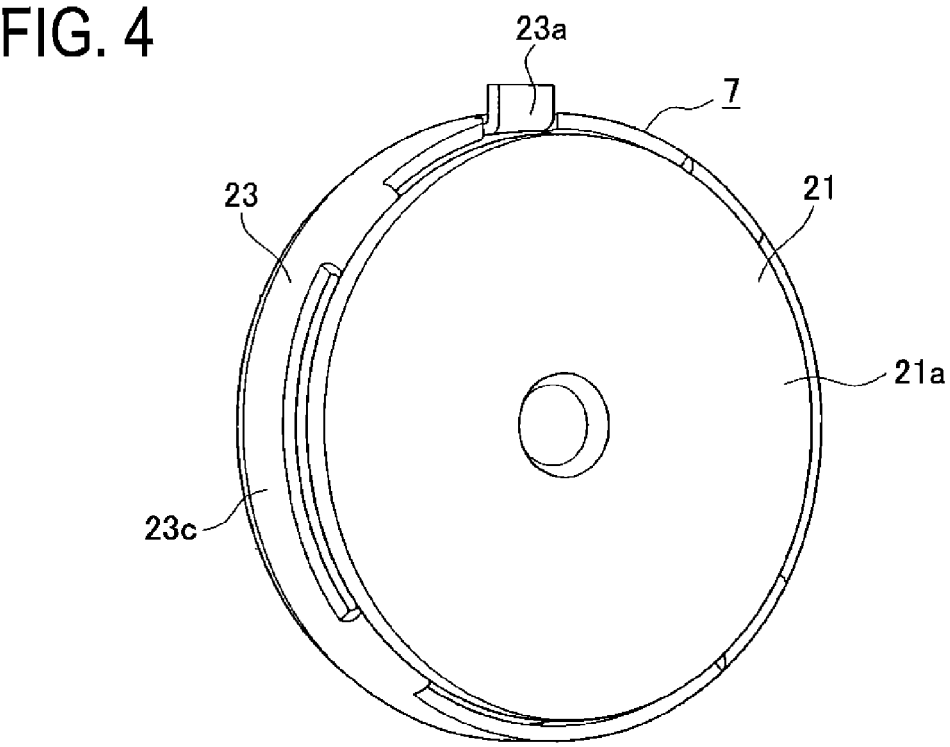
FIG. 4 is a perspective view of the detection rotor oriented vertically and seen from front in the first embodiment.
Figure 5:
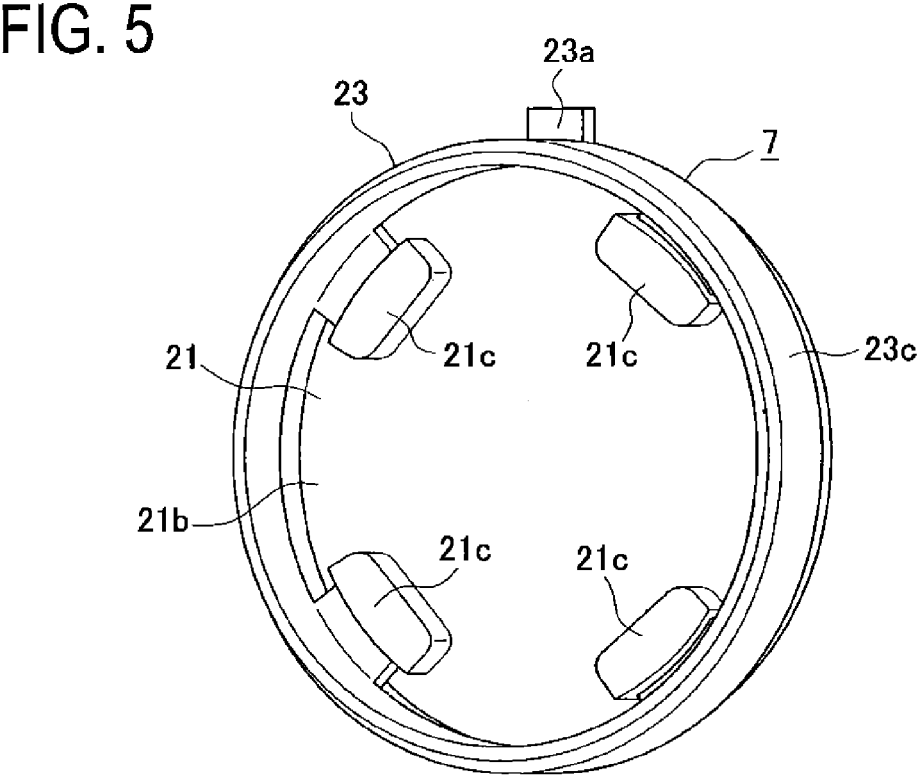
FIG. 5 is a perspective view of the detection rotor oriented vertically and seen from back in the first embodiment.

FIG. 2 is a front sectional view of the detection rotor 7. FIG. 3 is a plan view of the detection rotor 7. FIG. 4 is a perspective view of the detection rotor 7 oriented vertically and seen from front (in FIG. 4, a planar coil 22 is not illustrated). FIG. 5 is a perspective view of the detection rotor 7 oriented vertically and seen from back. As shown in FIGS. 2 to 5, the detection rotor 7 includes a resin substrate 21 having a circular flat plate shape, a planar coil 22 (see FIG. 3) placed on a surface 21a of the resin substrate 21, a metal member 23 having a nearly ring-like shape integrally provided with the resin substrate 21 and placed in contact with the rotary shaft 14 to fix the detection rotor 7 to the shoulder 14b in the opening 14a of the rotary shaft 14, and a single lug 23a provided in the metal member 23 and protruding outward. The resin substrate 21 is made of e.g. PPS resin. The metal member 23 is made of e.g. SUS.

Figure 6:
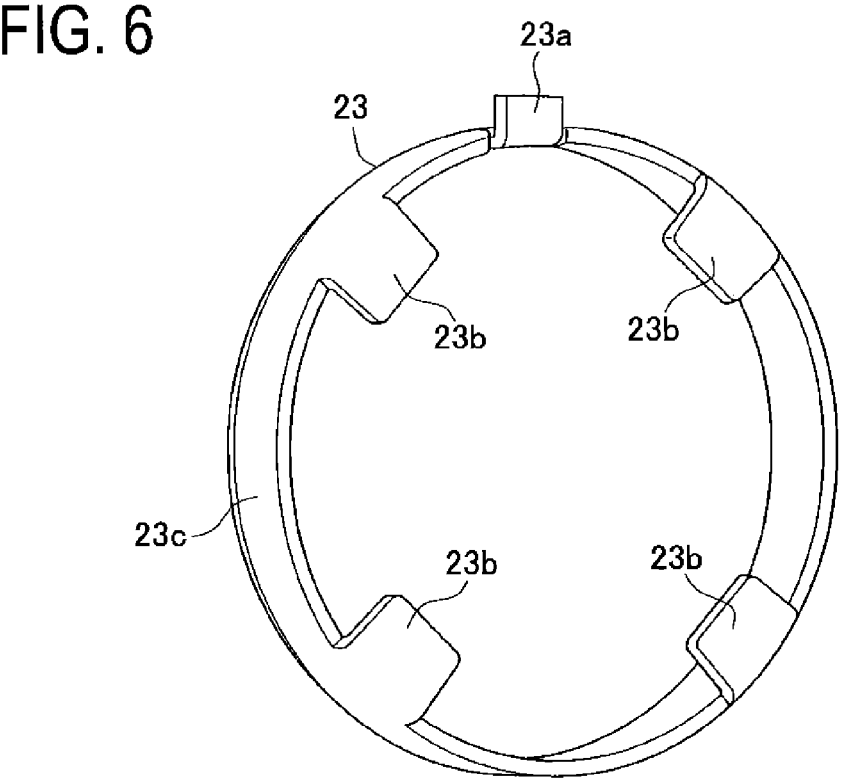
FIG. 6 is a perspective view of a metal member oriented vertically and seen from front in the first embodiment.
Figure 7:
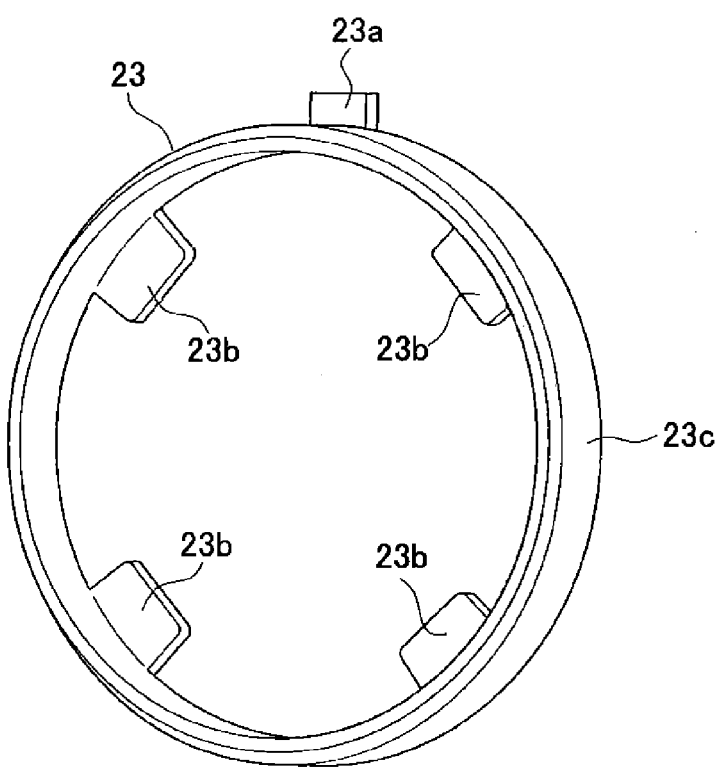
FIG. 7 is a perspective view of the metal member oriented vertically and seen from back in the first embodiment.

FIG. 6 is a perspective view of the metal member 23 oriented vertically and seen from front. FIG. 7 is a perspective view of the metal member 23 oriented vertically and seen from back. As shown in FIGS. 6 and 7, the metal member 23 having a nearly ring-like shape includes, in addition to the lug 23a, four joints 23b which are joined with the resin substrate 21. Each joint 23b is arranged in an offset position from an outer peripheral surface 23c of the metal member 23 which contacts with an inner peripheral surface of the opening 14a of the rotary shaft 14. The four joints 23b are bent inward of the nearly ring shape and arranged at equal angular intervals. The single lug 23a is bent outward of the nearly ring shape. Each joint 23b is integrally insert-molded in a back surface side of the resin substrate 21 as shown in FIGS. 2 and 5. In other words, they are insert-molded in four protrusions 21c formed on a back surface 21b of the resin substrate 21.

As shown in FIG. 1, the detection rotor 7 is mounted on the shoulder 14b in the opening 14a of the rotary shaft 14 so that the surface 21a of the resin substrate 21 faces a bottom side of the detection stator 6. Herein, the metal member 23 is press-fitted so that its outer peripheral surface 23c contacts with the inner periphery of the opening 14a of the rotary shaft 14, thereby fixing the detection rotor 7 to the rotary shaft 14. At that time, the lug 23a engages in a key groove (not shown) formed in the opening 14a, thereby ensuring circumferential alignment of the detection rotor 7 with respect to the rotary shaft 14.

Figure 8:
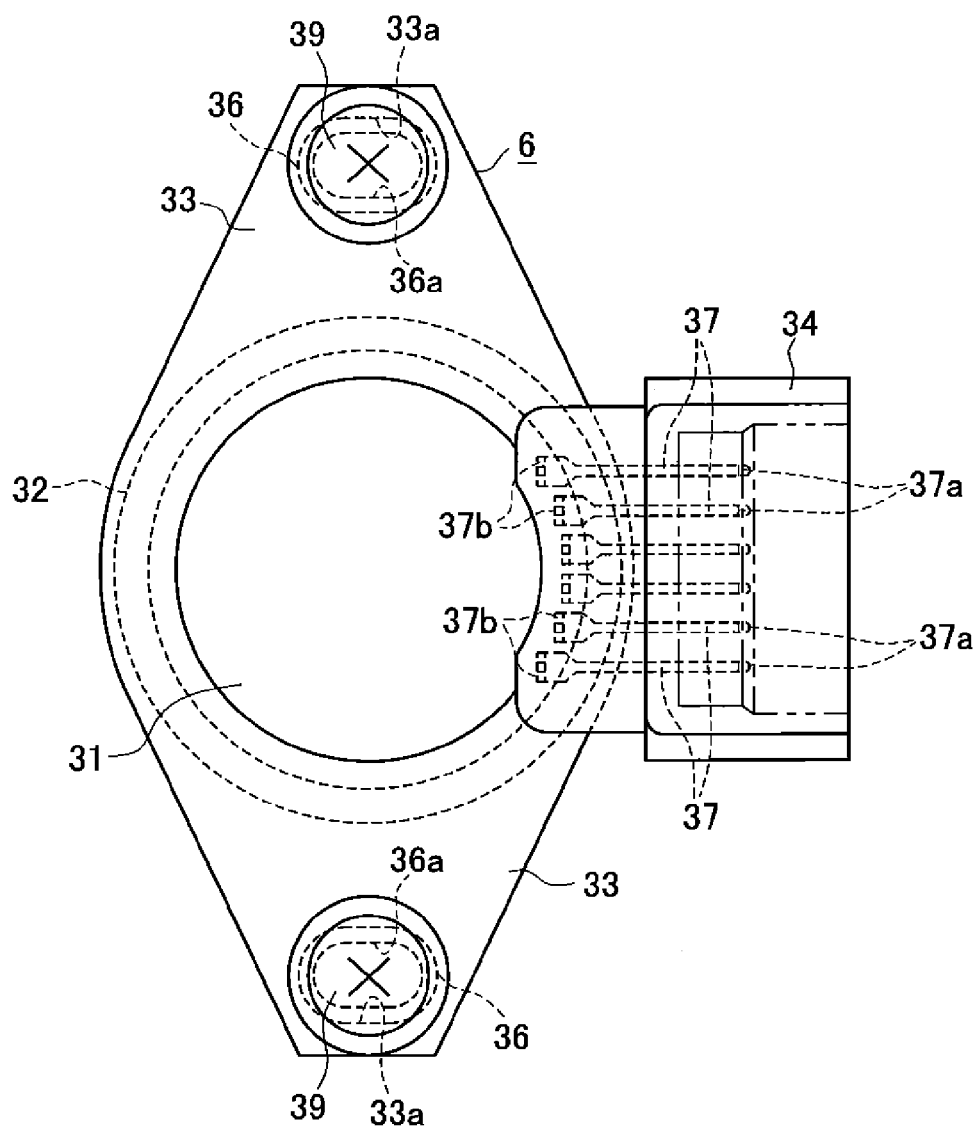
FIG. 8 is a plan view of a detection stator in the first embodiment.
Figure 9:
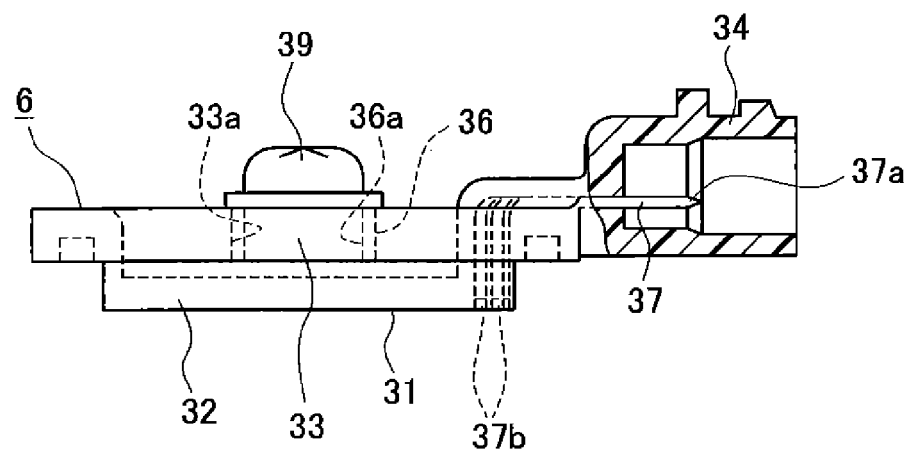
FIG. 9 is a front view of the detection stator with a partial cutaway view in the first embodiment.
Figure 10:
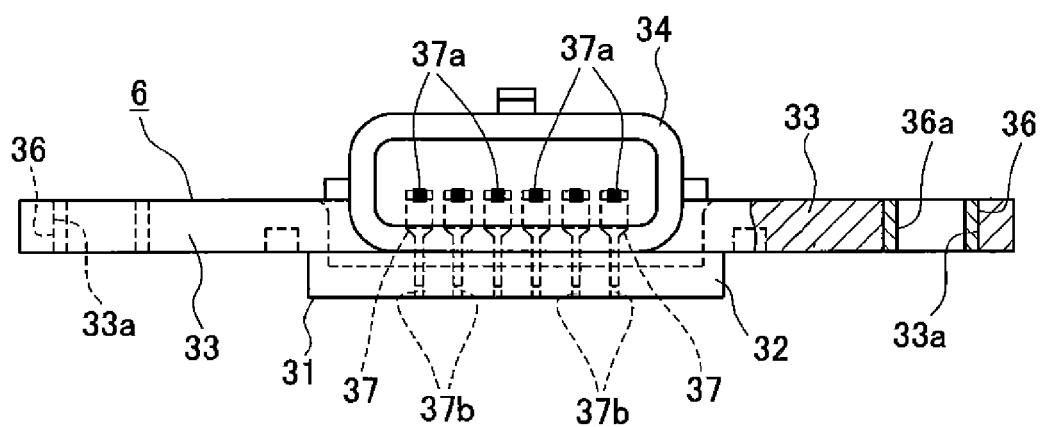
FIG. 10 is a right side view of the detection stator with a partial cutaway view in the first embodiment.
Figure 11:
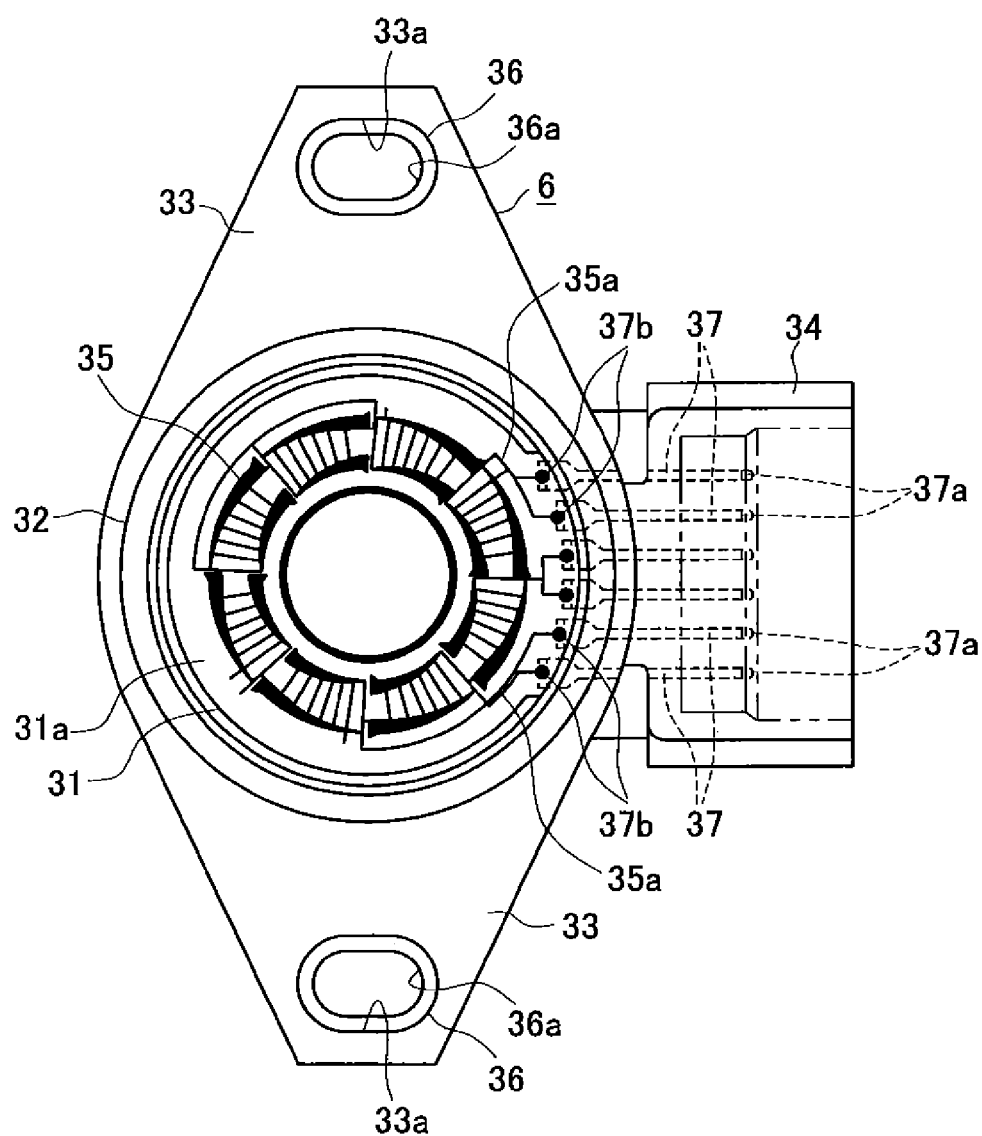
FIG. 11 is a bottom view of the detection stator in the first embodiment.

FIG. 8 is a plan view of the detection stator 6. FIG. 9 is a front view of the detection stator 6 with a partial cutaway view. FIG. 10 is a right side view of the detection stator 6 with a partial cutaway view. FIG. 11 is a bottom view of the detection stator 6. This detection stator 6, as shown in FIGS. 8-11, includes a detection part 31 having an almost circular flat plate shape made of resin such as PPS, an outer peripheral wall 32 formed along an outer peripheral edge of the detection part 31 and extending in an axial direction, a pair of flanges 33 extending outward from the outer peripheral wall 32 in a radial direction, and a single connector 34 oriented sideways (in a horizontally direction). The connector 34 is placed in an orientation different by 90° from the orientation of each flange 33.

As shown in FIG. 11, a planar coil 35 is placed on a bottom surface 31a which is a surface (first surface) of the detection part 31. This planar coil 35 is formed by printing using ink jet or the like. Further, on the planar coil 35, an insulation layer is further formed.

As shown in FIGS. 8 and 11, each flange 33 is formed, in a distal end portion, with an elongated hole 33a being almost oblong in plan view. In each elongated hole 33a, a metal collar 36 similarly having an oblong shape in plan view is insert-molded. Each collar 36 includes a hole 36a having an oblong shape in plan view. A screw 39 serving as a fixing member is inserted in the hole 36a of each collar 36.

In the connector 34, a plurality of metal terminals 37 are insert-molded. Each terminal 37 is bent at right angle so that a first end portion 37a is placed in the connector 34 and a second end portion 37b is placed in the detection part 31. The second end portions 37b placed in the detection part 31 are connected respectively to coil wires 35a constituting the planar coil 35.

Figure 12:
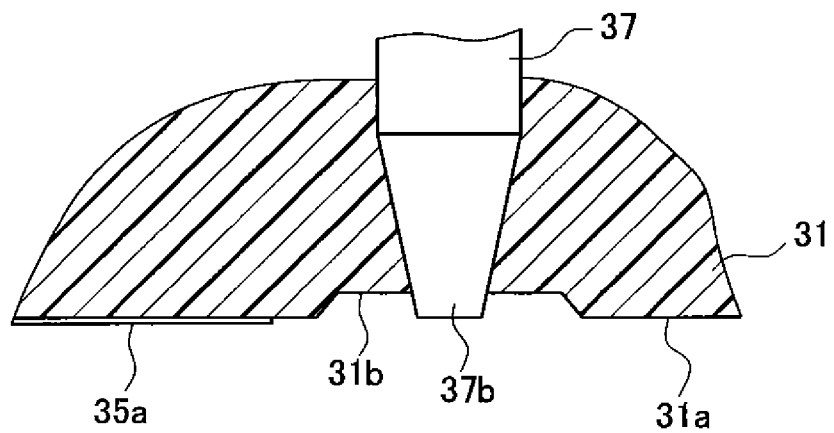
FIG. 12 is a partial enlarged sectional view showing an unconnected state between a second end portion of one terminal and a coil wire on a bottom surface of a detection part in the first embodiment.
Figure 13:
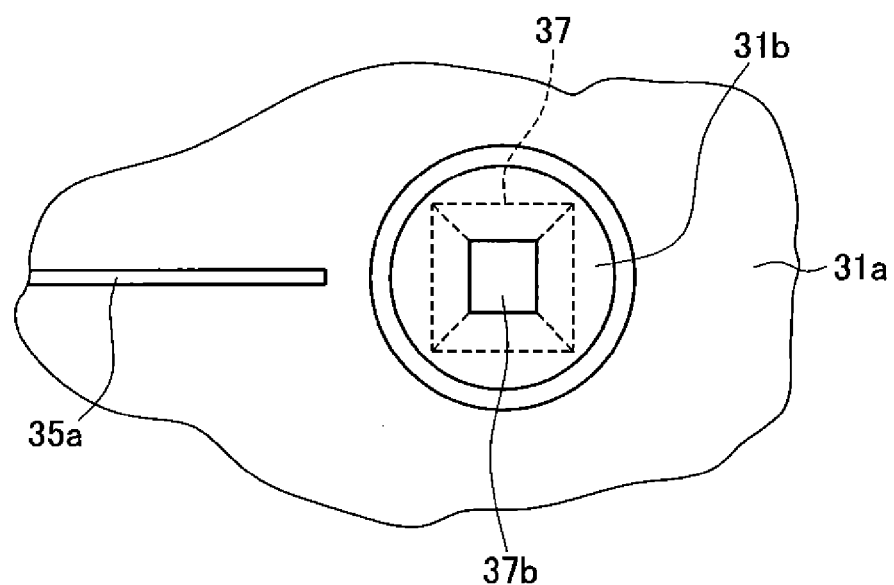
FIG. 13 is a partial enlarged bottom view showing the unconnected state between the second end portion of the one terminal and the coil wire on the bottom surface of the detection part in the first embodiment.

FIG. 12 is a partial enlarged sectional view showing an unconnected state between the second end portion 37b of one of the terminals 37 and the coil wire 35a on the bottom surface 31a of the detection part 31. FIG. 13 is a partial enlarged bottom view showing the unconnected state between the second end portion 37b of the one terminal 37 and the coil wire 35a on the bottom surface 31a of the detection part 31. The terminals 37 used in this embodiment are wires each having a rectangular cross section. Their second end portions 37b each have a tapered shape. In the bottom surface 31a of the detection part 31, there are formed recesses 31b each having a circular shape centered at respective second end portions 37b. A leading end portion of each coil wire 35a is placed close to the corresponding recess 31b.

Figure 14:
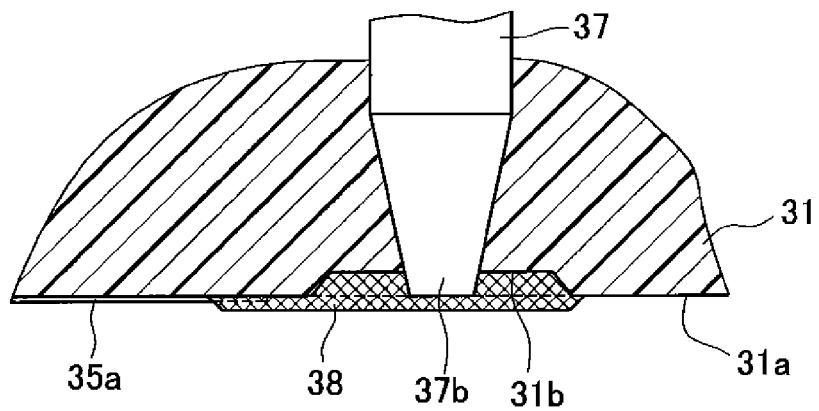
FIG. 14 is a partial enlarged sectional view showing a connected state between the second end portion of the one terminal and the coil wire on the bottom surface of the detection part in the first embodiment.
Figure 15:
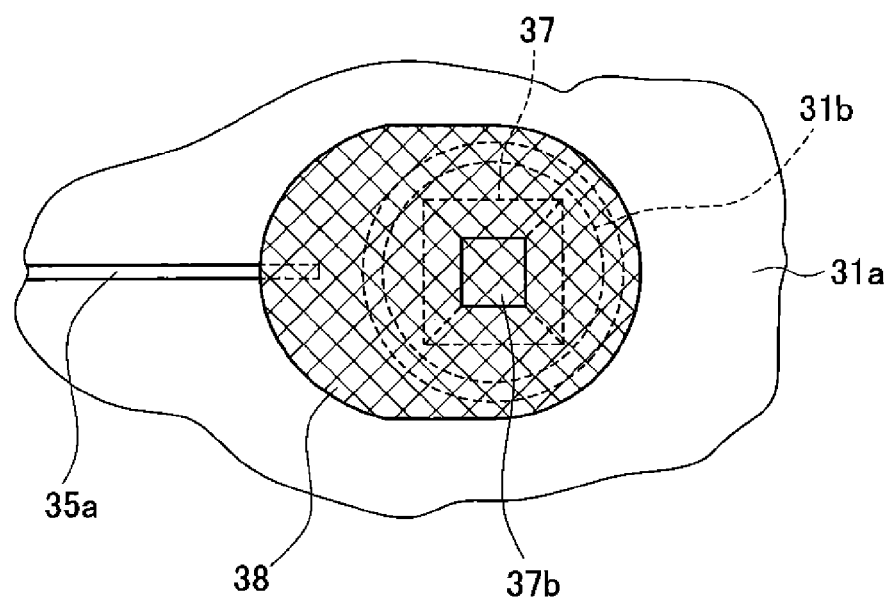
FIG. 15 is a partial enlarged bottom view showing the connected state between the second end portion of the one terminal and the coil wire on the bottom surface of the detection part in the first embodiment.

From an above state, the second end portions 37b of the terminals 37 are connected respectively to the leading end portions of the coil wires 35a as below. FIG. 14 is a partial enlarged sectional view showing a connected state between the second end portion 37b of one of the terminals 37 and the coil wire 35a on the bottom surface 31a of the detection part 31. FIG. 15 is a partial enlarged bottom view showing the connected state between the second end portion 37b of the one terminal 37 and the coil wire 35a on the bottom surface 31a of the detection part 31. In this embodiment, conductive paste 38 is used to connect the terminals 37 and the coil wires 35a. When the paste 38 enters each recess 31b, an application range of the paste 38 is stabilized by an anchor effect. This can improve joining strength of the paste 38 with the terminals 37 and the coil wires 35a.

In this embodiment, as shown in FIG. 1, the detection part 31 of the detection stator 6 is disposed in the mounting hole 18 of the motor housing 11 so that its bottom surface 31a faces to the inside of the housing 11. The detection stator 6 is also placed so that the bottom surface 31a of the detection part 31 faces the resin substrate 21 of the detection rotor 7. In this embodiment, the outer peripheral wall 32 of the detection stator 6 is inserted in the mounting hole 18 of the motor housing 11, thereby mounting the detection stator 6 to the motor housing 11. Further, the detection stator 6 is fixed, at the flanges 33, to the outside of the motor housing 11. To be concrete, the screws 39 serving as fixing members are inserted respectively in the collars 36 of the flanges 33 and tightened in screw holes (not shown) of the motor housing 11, thereby mounting and fixing the detection stator 6 to the motor housing 11.

According to the mounting structure of the rotation detector in the present embodiment explained above, the detection stator 6 includes the outer peripheral wall 32 in the outer peripheral edge of the detection part 31, so that the parallelism of the bottom surface 31a of the detection part 31 having the planar coil 35 can be easily maintained. In other words, in the detection stator 6 made of resin, deformation of the detection part 31 is prevented by the outer peripheral wall 32. Thus, the parallelism of the bottom surface 31a, namely, the parallelism of the planar coil 35 can be easily kept. Therefore, the detection stator 6 can ensure reliability and hence the rotation detector 1 can achieve detection accuracy.

In the present embodiment, the detection stator 6 is fixed to the outside of the motor housing 11 with the screws 39 individually inserted in the flanges 33. This makes it possible to facilitate operation of the detection stator 6 from outside of the motor housing 11. It is accordingly possible to facilitate alignment and positional adjustment of the detection stator 6 with respect to the detection rotor 7 fixed at the end of the rotary shaft 14 of the motor 2. As a result, the detection stator 6 and the detection rotor 7 can be operated precisely. Thus, the rotation detector 1 can easily achieve detection accuracy.

In the present embodiment, since the outer peripheral wall 32 of the detection stator 6 is inserted in the mounting hole 18 of the motor housing 11, the housing 11 and the detection stator 6 can be aligned coaxially. Specifically, since the outer peripheral wall 32 of the detection stator 6 is inserted in the mounting hole 18 of the motor housing 11, the housing 11 and the stator 6 can be aligned coaxially and hence the detection part 31 and the rotary shaft 14 can be aligned coaxially. As a result, the coaxial alignment between the detection part 31 of the detection stator 6 and the detection rotor 7 can be facilitated.

In the present embodiment, the screws 39 inserted individually in the almost oblong holes 36a of the collars 36 are slightly movable in respective holes 36a. Therefore, while the screws 39 mounted in the collars 36 are loosely tightened to the motor housing 11, the detection stator 6 is permitted to be slightly moved. Accordingly, the position of the detection stator 6 can be finely adjusted in the movable range. This can improve a positional adjustment work and further productivity of the rotation detector 1.

The detection stator 6 in the present embodiment can be suitably used in the rotation detector 1 in the aforementioned rotation-detector mounting structure. The rotation detector 1 in the present embodiment can be suitably used in the aforementioned rotation-detector mounting structure.

Second Embodiment

A second embodiment of a detection stator, a rotation detector and its mounting structure according to the invention will be explained in detail below referring to the accompanying drawings.

In the following explanations of second through seventh embodiments, identical or similar parts or components to those in the first embodiment are given the same reference signs and their details are not repeated. Differences from the first embodiment are mainly explained below.

Figure 16:
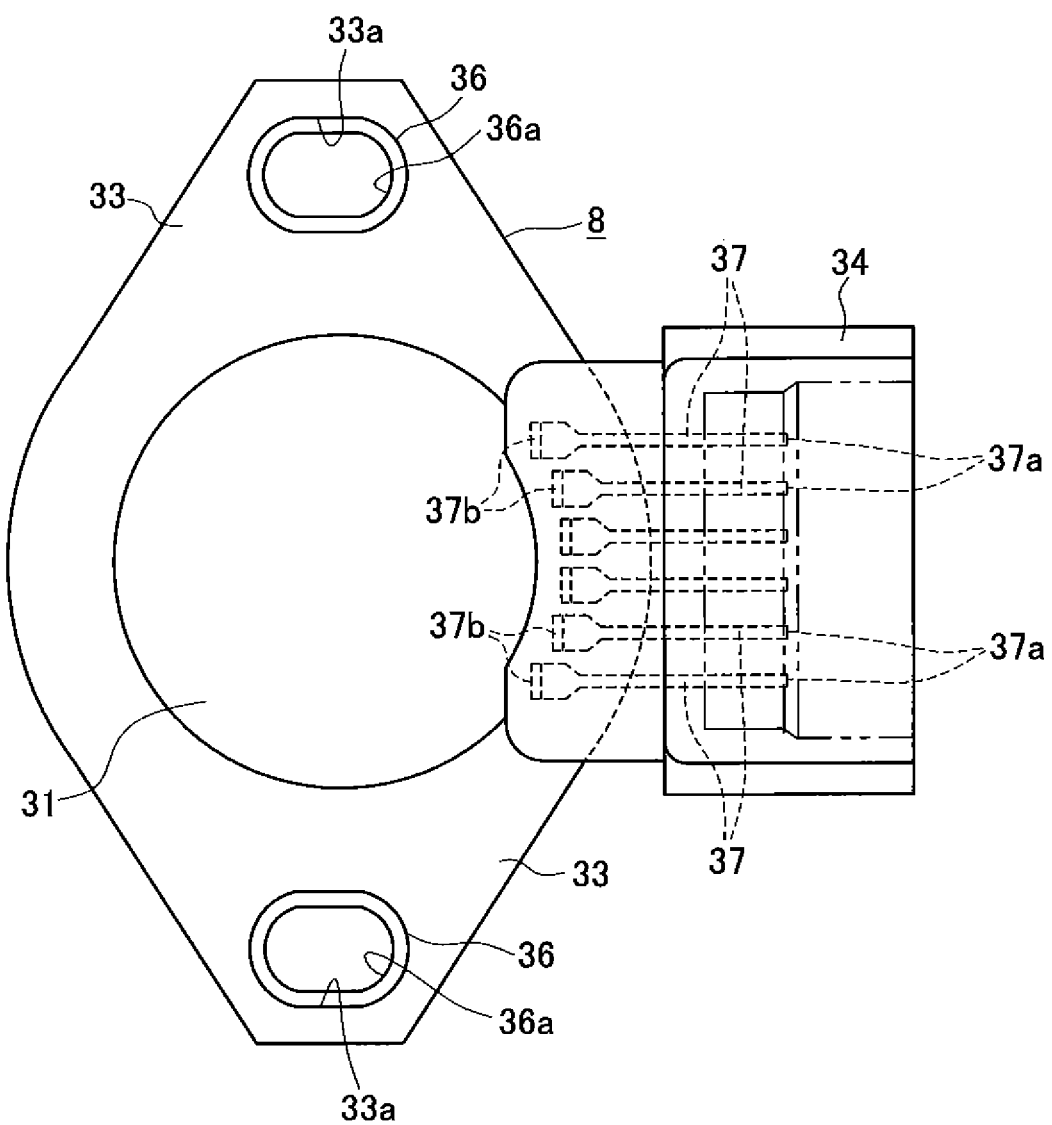
FIG. 16 is a plan view of a detection stator in a second embodiment.
Figure 17:
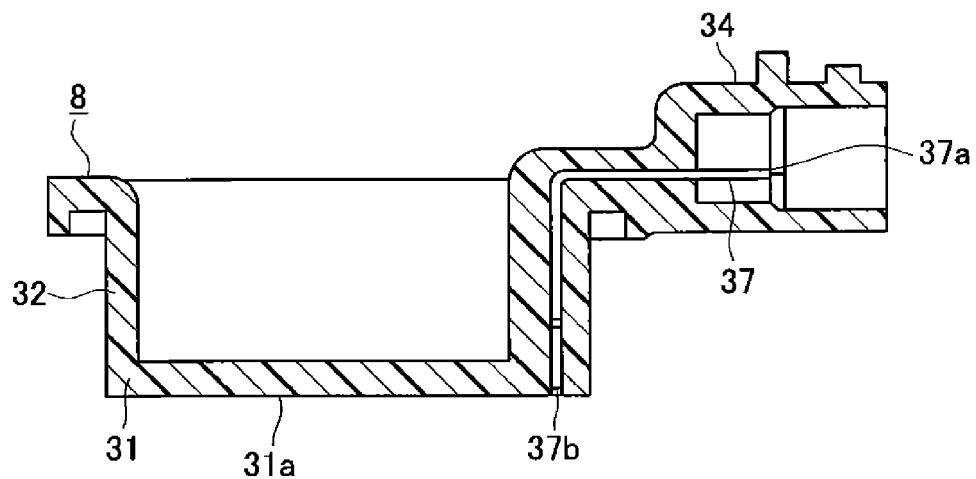
FIG. 17 is a front sectional view of the detection stator in the second embodiment.
Figure 18:
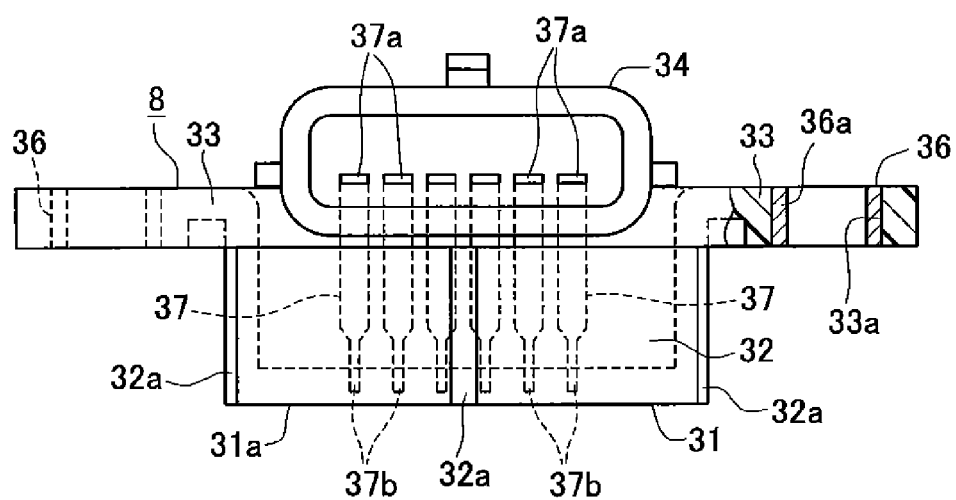
FIG. 18 is a right side view of the detection stator with a partial cutaway view in the second embodiment.
Figure 19:
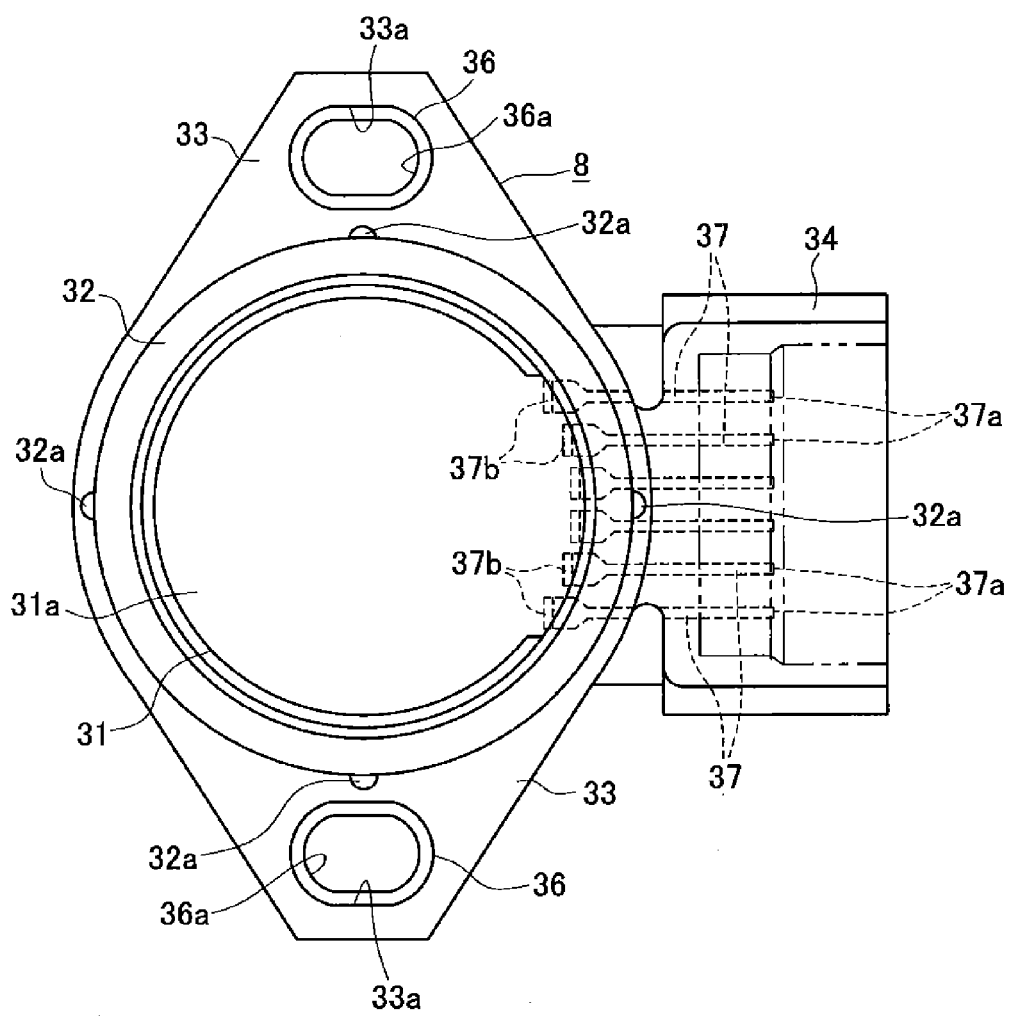
FIG. 19 is a bottom view of the detection stator in the second embodiment.

The present embodiment differs from the first embodiment in a configuration of a detection stator 8. FIG. 16 is a plan view of the detection stator 8. FIG. 17 is a front sectional view of the detection stator 8. FIG. 18 is a right side view of the detection stator 8 with a partial cutaway view. FIG. 19 is a bottom view of the detection stator 8 (from which the planar coils 35 provided on the bottom surface 31 of the detection part 31 are omitted).

In the present embodiment, specifically, the axial length of the outer peripheral wall 32 of the detection stator 8 is three times longer than that of the first, embodiment. Furthermore, in the present embodiment, a plurality (four in this case) of protrusions 32a are provided on the outer periphery of the outer peripheral wall 32 so that the protrusions 32a contact the inner periphery of the mounting hole 18 of the motor housing 11. Those protrusions 32a are arranged at equal angular intervals along the outer periphery of the outer peripheral wall 32 and extending in the axial direction of the outer peripheral wall 32.

Accordingly, in the present embodiment, if the end of the rotary shaft 14 of the motor 2 is located relatively apart from an opening of the mounting hole 18 of the housing 11, that is, if the distance from the opening of the mounting hole 18 to the detection rotor 7 provided on the rotary shaft 14 is relatively long, this detection stator 8 can be effectively used.

Furthermore, in the present embodiment, when the outer peripheral wall 32 of the detection stator 8 is inserted in the mounting hole 18 of the motor housing 11 by making the protrusions 32a contact with the inner periphery of the mounting hole 18, the contact area of the outer peripheral wall 32 with the inner periphery of the mounting hole 18 is small. This can reduce insertion resistance of the detection part 31 to the mounting hole 18, thereby improving workability.

Other operations and effects in the present embodiment are substantially the same as those in the first embodiment.

Third Embodiment

A third embodiment of a detection stator, a rotation detector and its mounting structure according to the invention will be explained in detail below referring to the accompanying drawings.

Figure 20:
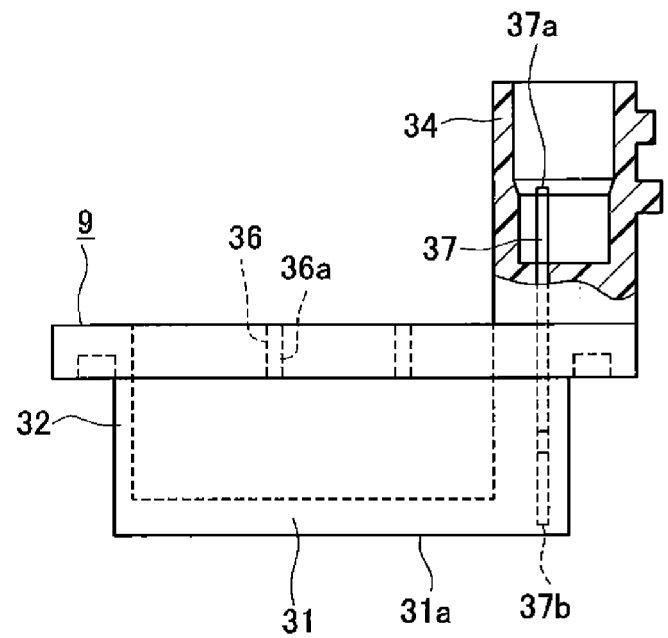
FIG. 20 is a front view of a detection stator with a partial cutaway view in a third embodiment.
Figure 21:
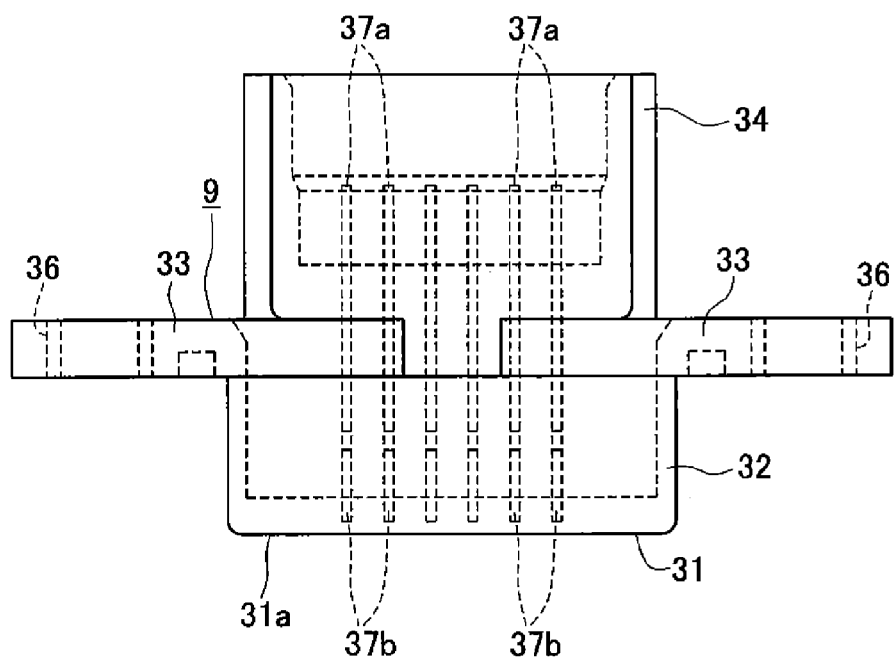
FIG. 21 is a right side view of the detection stator in the third embodiment.

The present embodiment differs from the second embodiment in a configuration of a detection stator 9. FIG. 20 is a front view of the detection stator 9 with a partial cutaway view. FIG. 21 is a right side view of the detection stator 9.

In the present embodiment, specifically, the connector 34 constituting the detection stator 9 is oriented upward, differently from the second embodiment. Accordingly, a plurality of terminals 37 provided in the connector 34 are designed to be linearly straight, different from a bent form in the first and second embodiments.

In the present embodiment, if the end of the rotary shaft 14 of the motor 2 is located relatively apart from the opening of the mounting hole 18 of the motor housing 11, that is, the distance from the opening of the mounting hole 18 to the detection rotor 7 provided on the rotary shaft 14 is relatively long, this detection stator 9 can be effectively used.

In the present embodiment, furthermore, each terminal 37 is of a straight shape which enables easy forming, and insert molding with the detection stator 9.

Other operations and effects in the present embodiment are substantially the same as those in the first embodiment.

Fourth Embodiment

A fourth embodiment of a detection stator, a rotation detector and its mounting structure according to the invention will be explained in detail below referring to the accompanying drawings.

Figure 22:
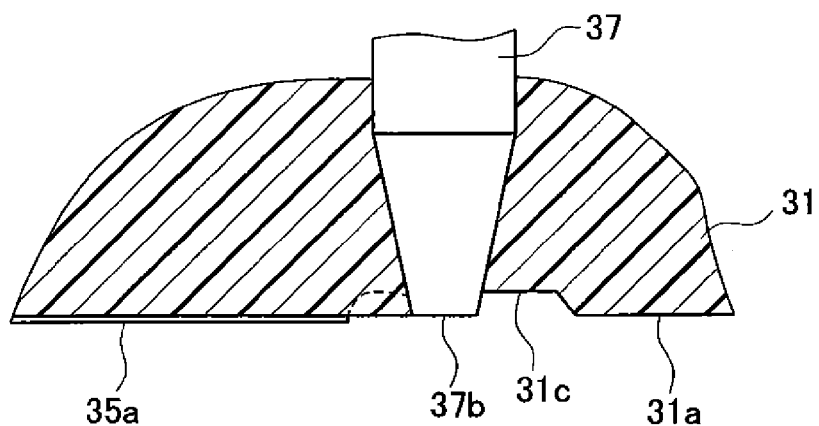
FIG. 22 is a partial enlarged sectional view showing an unconnected state between a second end portion of one terminal and a coil wire on a bottom surface of a detection part in a fourth embodiment.
Figure 23:
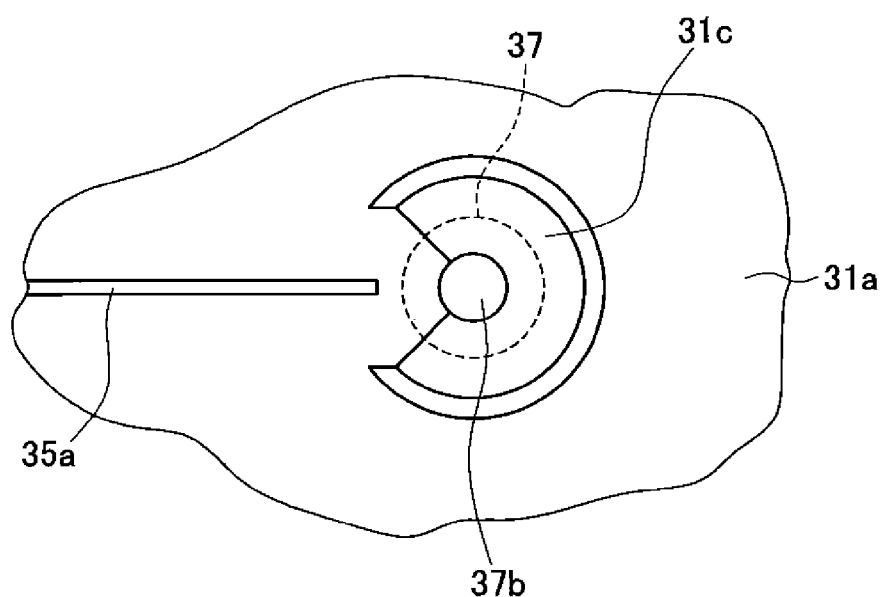
FIG. 23 is a partial enlarged bottom view showing the unconnected state between the second end portion of the one terminal and the coil wire on the bottom surface of the detection part in the fourth embodiment.

The present embodiment differs from the first embodiment in a configuration for connection between the second end portion 37b of one terminal 37 and the coil wire 35a on the bottom surface 31a of the detection part 31. FIG. 22 is a partial enlarged sectional view showing an unconnected state between the second end portion 37b of the one terminal 37 and the coil wire 35a on the bottom surface 31a of the detection part 31. FIG. 23 is a partial enlarged bottom view showing the unconnected state between the second end portion 37b of the one terminal 37 and the coil wire 35a on the bottom surface 31a of the detection part 31. The terminals 37 used in this embodiment are wires each having a round cross section with the second end portion 37b having a tapered shape. The bottom surface 31a of the detection part 31 is formed with recesses 31c each having a three-quarter circular shape centered at the second end portion 37b. In correspondence with a portion other than the recess 31c around the second end portion 37b, a leading end portion of each coil wire 35a is placed close to the corresponding second end portion 37b.

Figure 24:
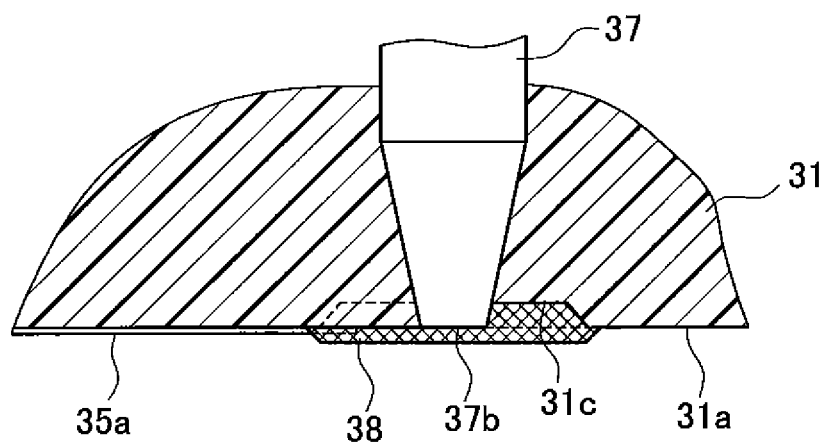
FIG. 24 is a partial enlarged sectional view showing a connected state between the second end portion of the one terminal and the coil wire on the bottom surface of the detection part in the fourth embodiment.
Figure 25:
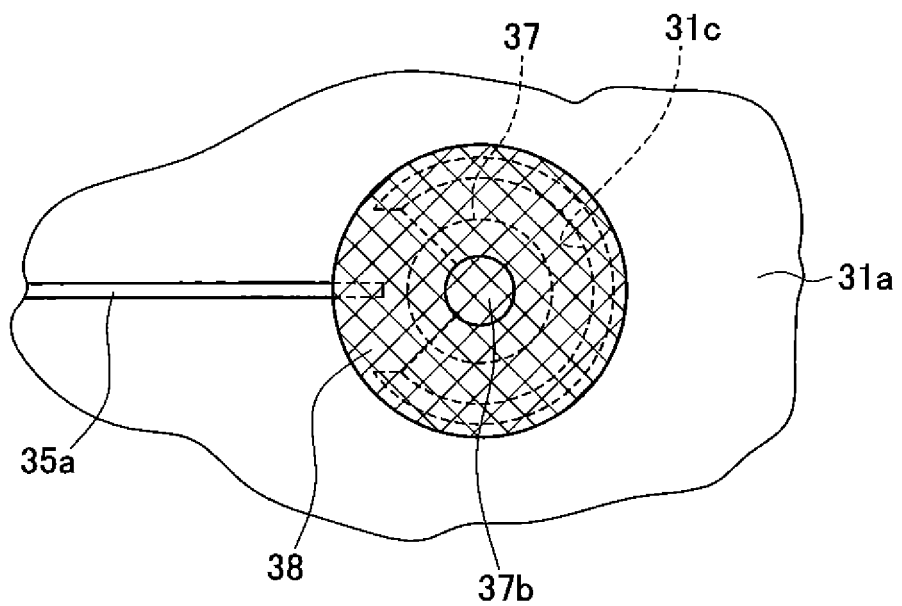
FIG. 25 is a partial enlarged bottom view showing the connected state between the second end portion of the one terminal and the coil wire on the bottom surface of the detection part in the fourth embodiment.

From the above state, the second end portions 37b of the terminals 37 are connected to the leading end portions of the corresponding coil wires 35a. FIG. 24 is a partial enlarged sectional view showing a connected state between the second end portion 37b of the one terminal 37 and the coil wire 35a on the bottom surface 31a of the detection part 31. FIG. 25 is a partial enlarged bottom view showing the connected state between the second end portion 37b of the one terminal 37 and the coil wire 35a on the bottom surface 31a of the detection part 31. In the present embodiment, conductive paste 38 is used to connect the terminals 37 and the coil wires 35a. When the paste 38 enters each recess 31b, an application range of the paste 38 is stabilized by an anchor effect. This can improve joining strength of the paste 38 with the terminals 37 and the coil wires 35a.

In the present embodiment, the coil wires 35a can be placed close to the second end portions 37b of the terminals 37. As compared with the first embodiment, the amount of conductive paste 38 to be used can be reduced.

Other operations and effects in the present embodiment are substantially the same as those in the first embodiment.

Fifth Embodiment

A fifth embodiment of a detection stator, a rotation detector and its mounting structure according to the invention will be explained in detail below referring to the accompanying drawings.

Figure 26:
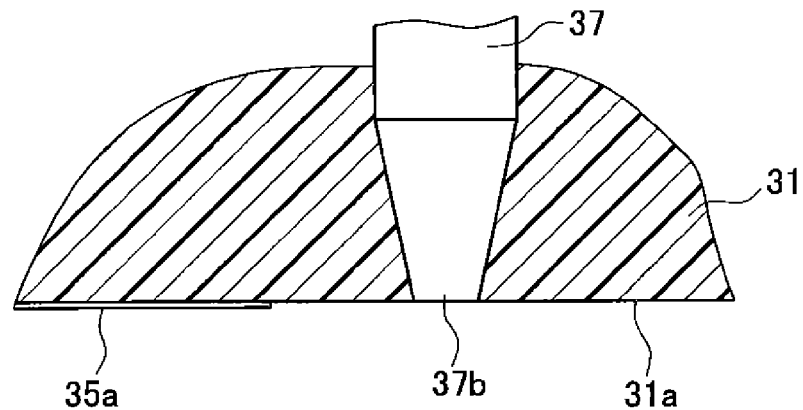
FIG. 26 is a partial enlarged sectional view showing an unconnected state between a second end portion of one terminal and a coil wire on a bottom surface of a detection part in a fifth embodiment.
Figure 27:
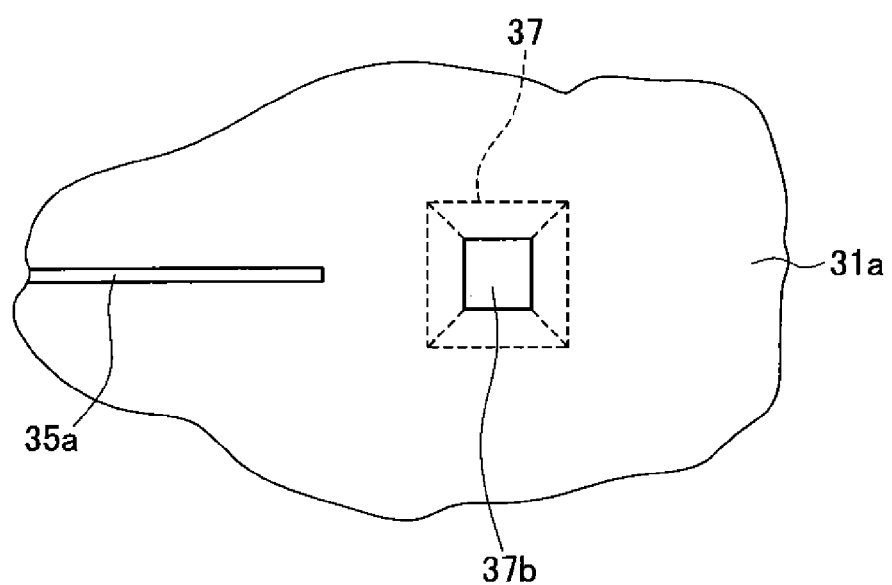
FIG. 27 is a partial enlarged bottom view showing the unconnected state between the second end portion of the one terminal and the coil wire on the bottom surface of the detection part in the fifth embodiment.

The present embodiment differs from the first embodiment in a configuration for connection between the second end portion 37b of one terminal 37 and the coil wire 35a on the bottom surface 31a of the detection part 31. FIG. 26 is a partial enlarged sectional view showing an unconnected state between the second end portion 37b of the one terminal 37 and the coil wire 35a on the bottom surface 31a of the detection part 31. FIG. 27 is an enlarged bottom view showing the unconnected state between the second end portion 37b of the one terminal 37 and the coil wire 35a on the bottom surface 31a of the detection part 31. The present embodiment differs from the first embodiment in the absence of the recesses 31*b* each centered at respective second end portions 37*b* of the terminals 37 each being a rectangular cross-section wire.

Figure 28:
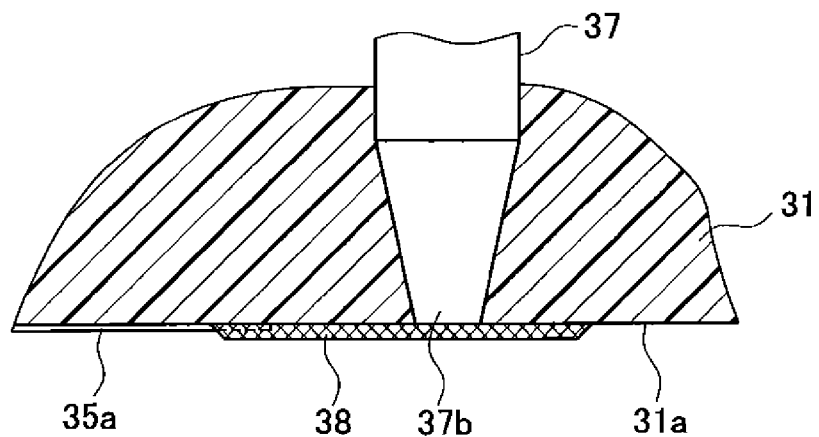
FIG. 28 is a partial enlarged sectional view showing a connected state between the second end portion of the one terminal and the coil wire on the bottom surface of the detection part in the fifth embodiment.
Figure 29:
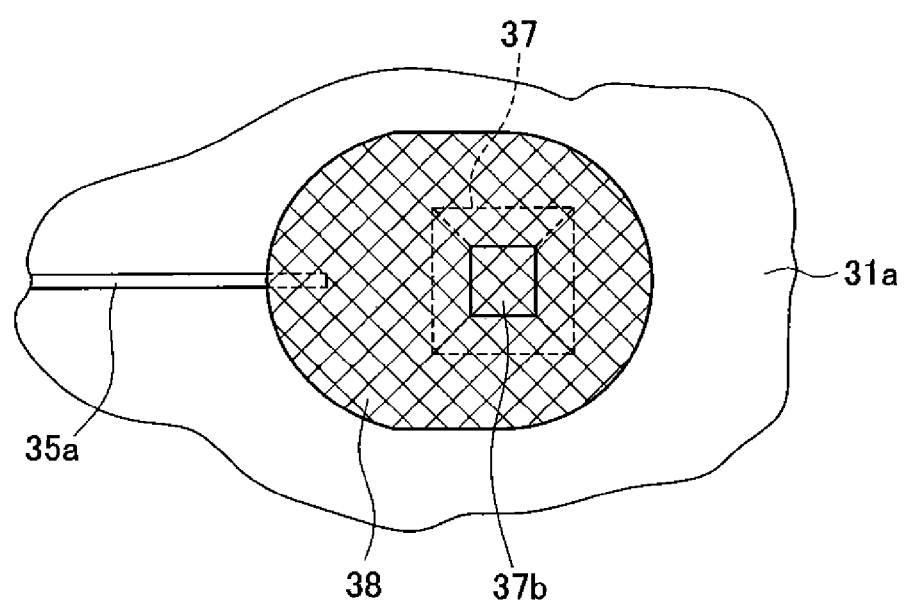
FIG. 29 is a partial enlarged bottom view showing the connected state between the second end portion of the one terminal and the coil wire on the bottom surface of the detection part in the fifth embodiment.

From the above state, the second end portions 37*b* of the terminals 37 and the leading end portions of the coil wires 35 are connected as below. FIG. 28 is an enlarged sectional view showing a connected state between the second end portion 37*b* of the one terminal 37 and the coil wire 35*a* on the bottom surface 31*a* of the detection part 31. FIG. 29 is an enlarged bottom view showing the connected state between the second end portion 37*b* of the one terminal 37 and the coil wire 35*a* on the bottom surface 31*a* of the detection part 31. In the present embodiment, conductive paste 38 is used to connect the terminals 37 and the coil wires 35*a*. Since the recesses 31*b* are absent in the present embodiment, different from the first embodiment, the coating thickness of the conductive paste 38 applied on the bottom surface 31*a* can be made uniform. Accordingly, it is possible to reduce stress at the time of thermal expansion, thereby preventing breakage of the conductive paste 38.

Other operations and effects in the present embodiment are substantially the same as those in the first embodiment.

Sixth Embodiment

A sixth embodiment of a detection stator, a rotation detector and its mounting structure according to the invention will be explained in detail below referring to the accompanying drawings.

Figure 30:
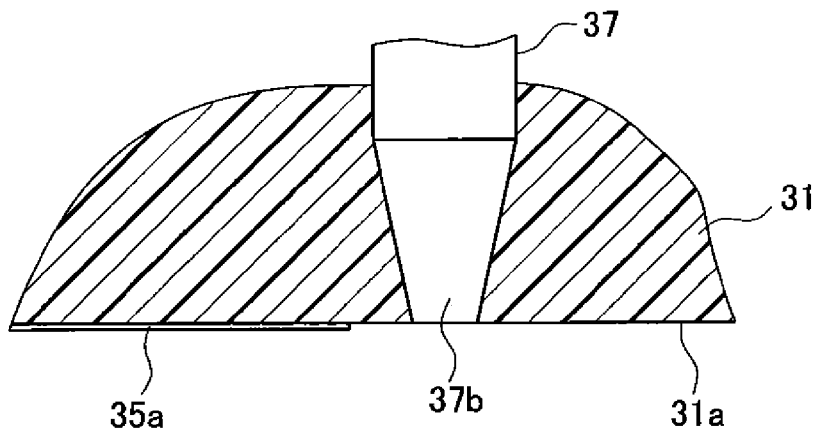
FIG. 30 is a partial enlarged sectional view showing an unconnected state between a second end portion of one terminal and a coil wire on a bottom surface of a detection part in a sixth embodiment.
Figure 31:
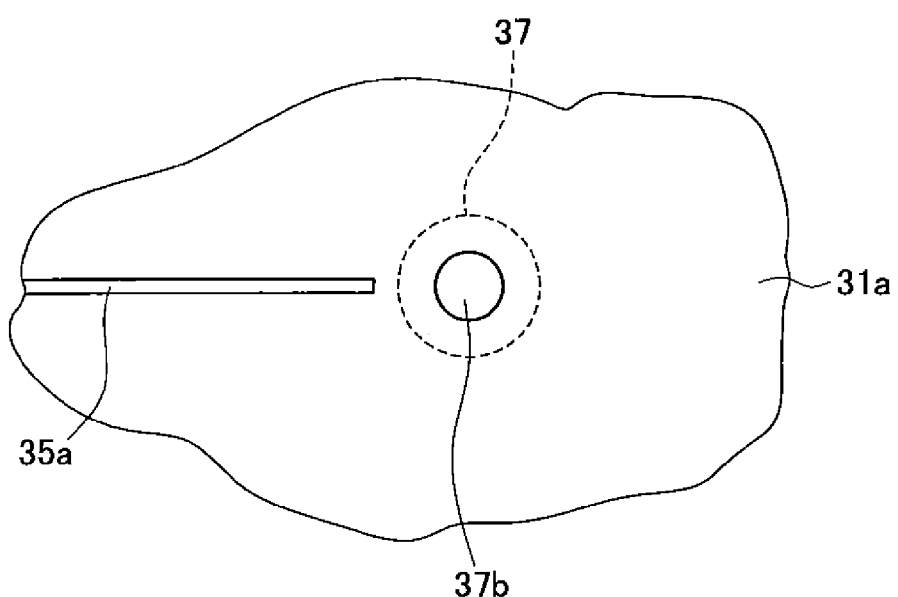
FIG. 31 is a partial enlarged bottom view showing the unconnected state between the second end portion of the one terminal and the coil wire on the bottom surface of the detection part in the sixth embodiment.

The present embodiment differs from the fourth embodiment in a configuration for connection between the second end portion 37*b* of one terminal 37 and the coil wire 35*a* on the bottom surface 31*a* of the detection part 31. FIG. 30 is an enlarged sectional view showing an unconnected state between the second end portion 37*b* of the one terminal 37 and the coil wire 35*a* on the bottom surface 31*a* of the detection part 31. FIG. 31 is an enlarged bottom view showing the unconnected state between the second end portion 37*b* of the one terminal 37 and the coil wire 35*a* on the bottom surface 31*a* of the detection part 31. The present embodiment differs from the fourth embodiment in the absence of the recesses 31*c* each centered at respective end portions 37*b* of the terminals 37 each being a round cross-section wire.

Figure 32:
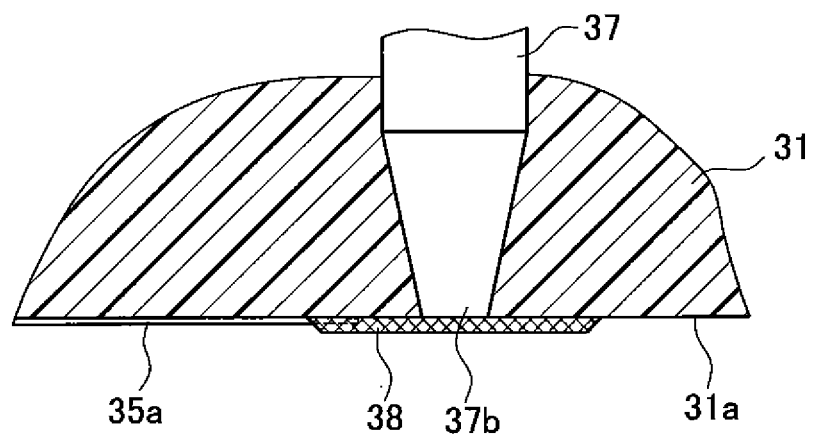
FIG. 32 is a partial enlarged sectional view showing a connected state between the second end portion of the one terminal and the coil wire on the bottom surface of the detection part in the sixth embodiment.
Figure 33:
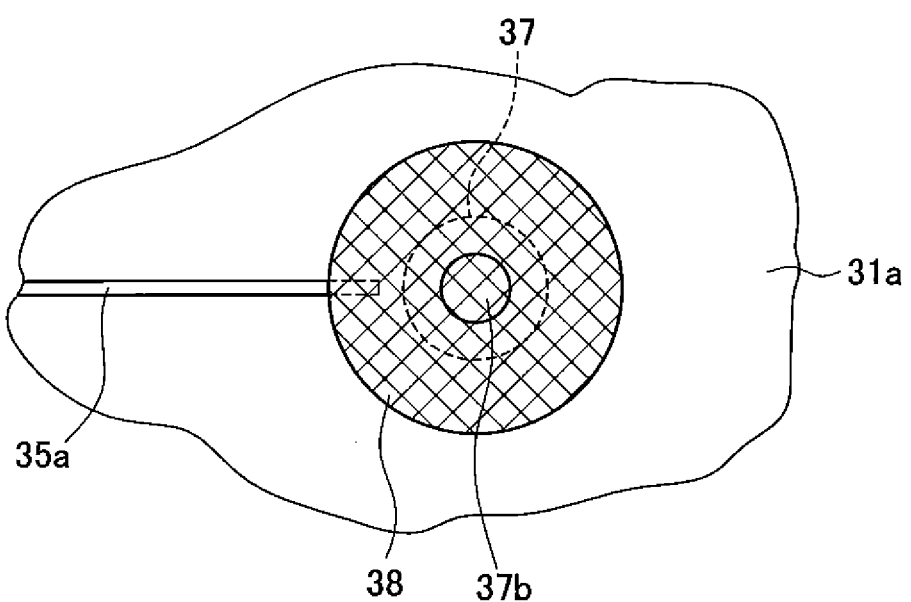
FIG. 33 is a partial enlarged bottom view showing the connected state between the second end portion of the one terminal and the coil wire on the bottom surface of the detection part in the sixth embodiment.

From the above state, the second end portions 37*b* of the terminals 37 and the leading end portions of the coil wires 35*a* are connected as below. FIG. 32 is an enlarged sectional view showing a connected state between the second end portion 37*b* of the one terminal 37 and the coil wire 35*a* on the bottom surface 31*a* of the detection part 31. FIG. 33 is an enlarged bottom view showing the connected state between the second end portion 37*b* of the one terminal 37 and the coil wire 35*a* on the bottom surface 31*a* of the detection part 31. In the present embodiment, conductive paste 38 is used to connect the terminals 37 and the coil wires 35*a*. Since the recesses 31*c* are absent in the present embodiment, different from the fourth embodiment, the coating thickness of the conductive paste 38 applied on the bottom surface 31*a* can be made uniform. Accordingly, it is possible to reduce stress at the time of thermal expansion, thereby preventing breakage of the conductive paste 38.

Other operations and effects in the present embodiment are substantially the same as those in the first embodiment.

Seventh Embodiment

A seventh embodiment of a detection stator, a rotation detector and its mounting structure according to the invention will be explained in detail below referring to the accompanying drawings.

Figure 34:
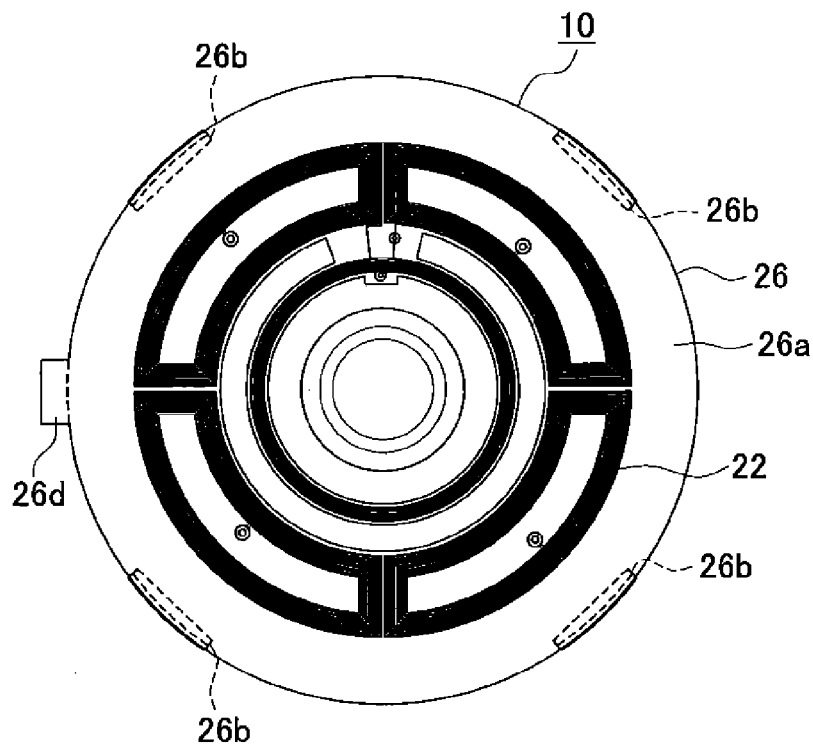
FIG. 34 is a plan view of a detection rotor in a seventh embodiment.
Figure 35:
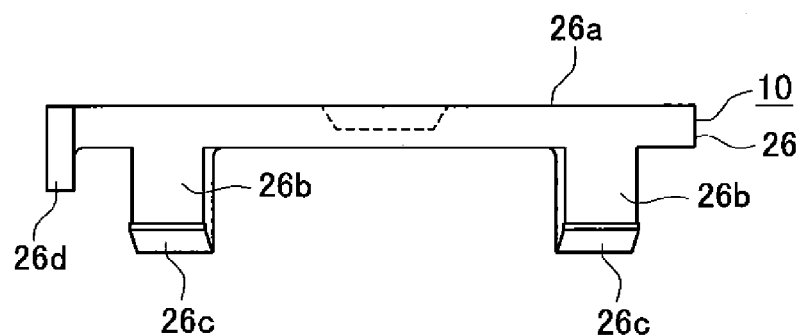
FIG. 35 is a front view of the detection rotor in the seventh embodiment.
Figure 36:
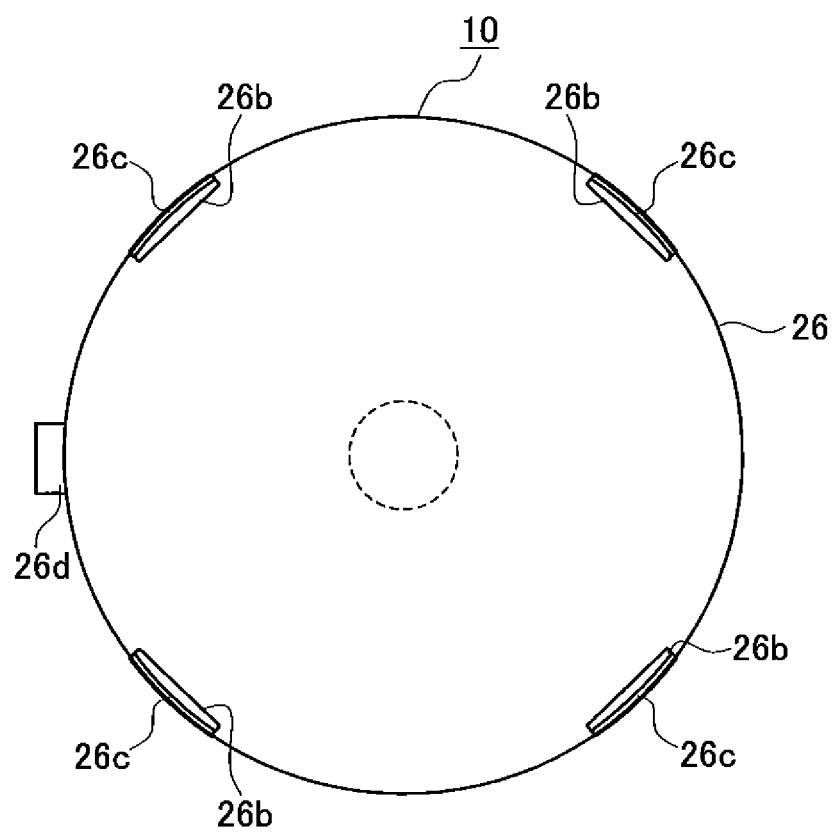
FIG. 36 is a bottom view of the detection rotor in the seventh embodiment.

The present embodiment differs from the above embodiments in a configuration of the detection rotor 10. FIG. 34 is a plan view of the detection rotor 10. FIG. 35 is a front view of the detection rotor 10. FIG. 36 is a bottom view of the detection rotor 10.

As shown in FIGS. 34 to 36, the detection rotor 10 in the present embodiment includes a resin substrate 26 that is wholly made of resin and formed like a circular flat plate, a planar coil 22 (see FIG. 34) placed on a surface (first surface) 26*a* of the resin substrate 26, a plurality (four in this embodiment) of legs 26*b* each integrally formed along the outer periphery of the resin substrate 26 and extending from a lower side, hooks 26*c* formed respectively in the outside of lower ends of the legs 26*b*, and a single lug 26*d* integrally formed in the resin substrate 26 to protrude outward. The resin substrate 26 and others are made of PPS resin, for example.

This detection rotor 10 is mounted on the shoulder 14*b* in the opening 14*a* of the rotary shaft 14 so that the surface 26*a* of the resin substrate 26 faces the bottom of the detection stator 6. Herein, the hooks 26*c* of the legs 26*b* are press-fitted in engagement with the inner peripheral surface of the opening 14*a* of the rotary shaft 14, thereby fixing the detection rotor 10 to the rotary shaft 14. At that time, when the lug 26*d* is engaged in a key groove (not shown) formed in the opening 14*a*, the detection rotor 10 is properly positioned in a circumferential direction with respect to the rotary shaft 14.

In the present embodiment, consequently, the resin substrate 26 and others of the detection rotor 10 are integrally made of resin, so that the detection rotor 10 can be more easily manufactured as compared with the detection rotor 7 in the first embodiment. Thus, cost reduction of the rotation detector 1 can be achieved.

Other operations and effects in the present embodiment are substantially the same as those in the first embodiment.

Eighth Embodiment

An eighth embodiment of a detection stator, a rotation detector and its mounting structure according to the invention will be explained in detail below referring to the accompanying drawings.

Figure 37:
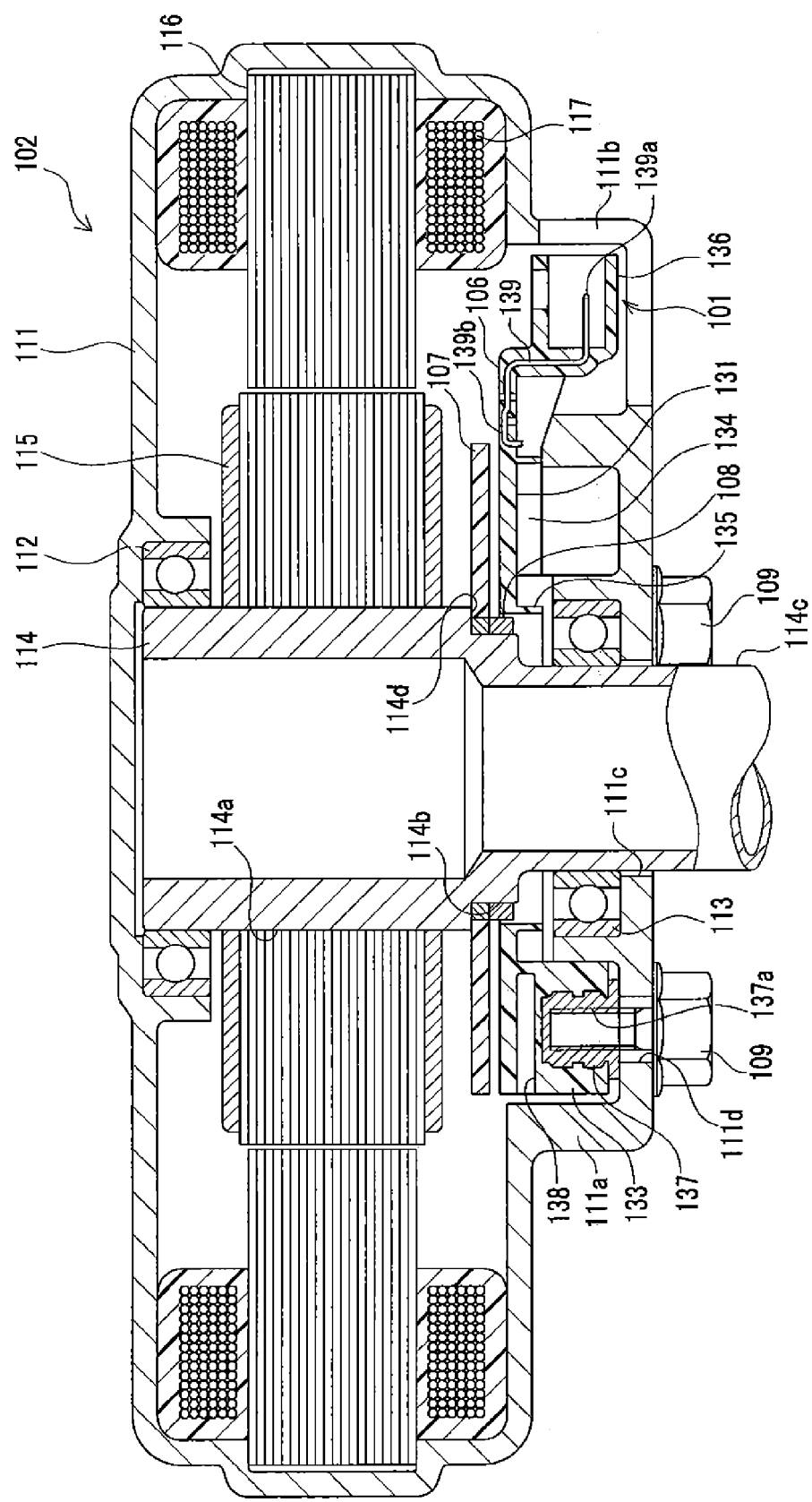
FIG. 37 is a front sectional view of a rotation detector and a motor to which the rotation detector is mounted in an eighth embodiment.

FIG. 37 is a front sectional view of a rotation detector 101 and a motor 102 to which the rotation detector 101 is mounted in the present embodiment (hereinafter, the orientation in FIG. 37 is referred to as a front view for convenience). The motor 102 includes a motor housing 111 having an almost disk-like outer shape, a rotary shaft 114 housed in the center of in the housing 111 and supported rotatably through bearings 112 and 113, a motor rotor 115 fixed on an outer periphery of the rotary shaft 114 inside the housing 111, and a motor stator 116 placed outside the motor rotor 115 and fixed to the inside of the housing 111 with a gap therefrom. The stator 116 is provided with a coil 117.

In FIG. 37, a housing part 111*a* is integrally formed at a lower side of the motor housing 111 to receive the rotation detector 101. This housing part 111*a* is defined by an almost annular peripheral wall centered at the rotary shaft 114 and the bearing 113. A part of the outer periphery of the housing part 111*a* is formed with a communication hole 111*b* communicating to the outside.

As shown in FIG. 37, the rotary shaft 114 of the motor 102 has an almost cylindrical shape and includes a large-diameter part 114*a*, a middle-diameter part 114*b*, and a small-diameter part 114*c*. The large-diameter part 114*a* is supported by the first bearing 112. The motor rotor 115 is fixed on the outer periphery of the large-diameter part 114*a*. The small-diameter part 114*c* is supported by the second bearing 113 and extends with its end portion protruding out of a shaft hole 111c formed in the bottom wall of the housing part 111a.

As shown in FIG. 37, the rotation detector 101 includes a detection stator 106 and a detection rotor 107. The detection rotor 107 is fixed to the outer periphery of the middle-diameter part 114b of the rotary shaft 114 inside the motor housing 111. Specifically, the detection rotor 107 is press-fitted on the middle-diameter part 114b of the rotary shaft 114 and fixed by a ring-shaped stopper 108. The detection stator 106 is placed in the housing part 111a of the motor housing 111 so as to face the detection rotor 107 and is fixed with bolts 109 serving as a fixing member. The bottom wall of the housing part 111a is formed with a plurality of bolt holes 111d in which the bolts 109 are respectively inserted.

Figure 38:
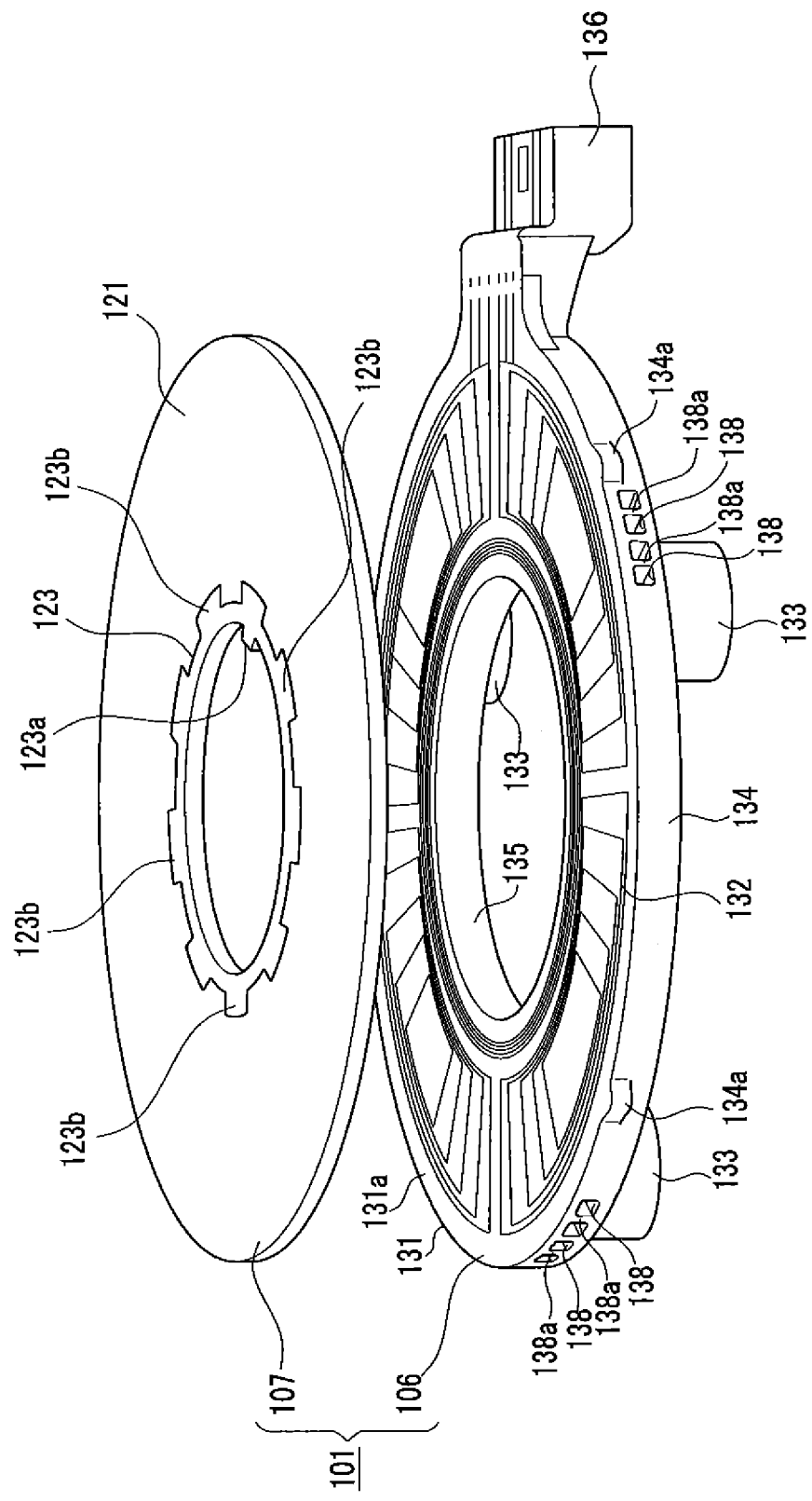
FIG. 38 is a perspective view showing a detection stator and a detection rotor, constituting a rotation detector, seen from obliquely above in the eighth embodiment.
Figure 39:
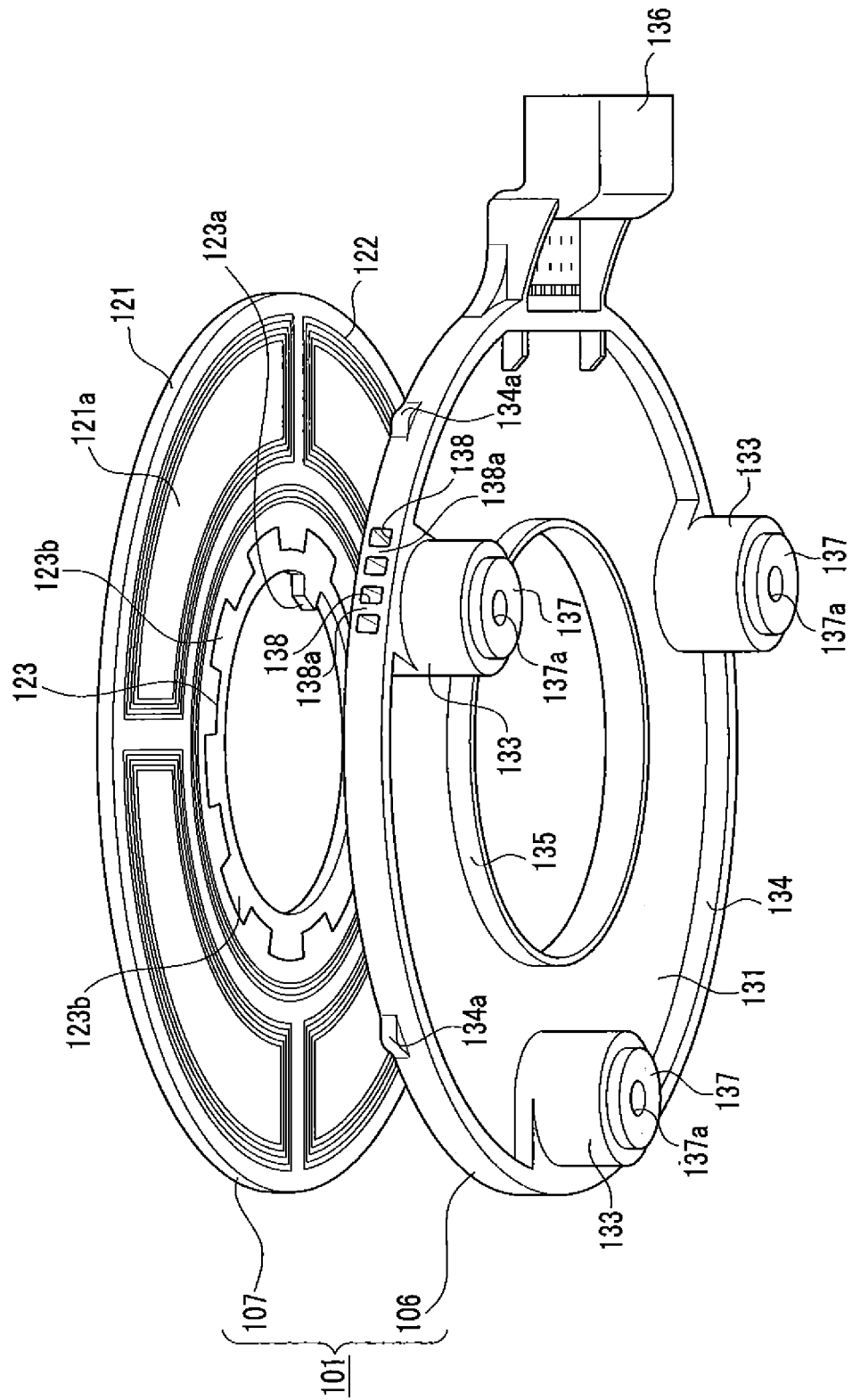
FIG. 39 is a perspective view showing the detection stator and the detection rotor, constituting the rotation detector, seen from obliquely below in the eighth embodiment.

FIG. 38 is a perspective view of the detection stator 106 and the detection rotor 107 constituting the rotation detector 101 in the present embodiment, seen from oblique above. FIG. 39 is a perspective view of the detection stator 106 and the detection rotor 107 constituting the rotation detector 101 in the present embodiment, seen from oblique below. As shown in FIGS. 38 and 39, the detection rotor 107 includes a resin substrate 121 having a circular flat plate shape, a planar coil 122 (see FIG. 3) placed on a surface 121a of the resin substrate 121, a metal member 123 having almost annular shape integrally provided with the resin substrate 121 and placed in contact with the rotary shaft 114 to fix the detection rotor 107 to the outer periphery of the rotary shaft 114, and a single lug 123a provided in the inner periphery of the metal member 123.

The resin substrate 121 is made of e.g. PPS resin. The metal member 123 is made of e.g. SUS. The planar coil 122 is formed on the resin substrate 121 by printing using ink jet or the like. Further, on the planar coil 122, an insulation layer is further formed.

As shown in FIGS. 38 and 39, the metal member 123 has a plurality of protrusions 123b each protruding radially outward from the outer periphery. Those protrusions 123b are arranged radially at equal angular intervals. The outer peripheral portion of the metal member 123 including the protrusions 123b is insert-molded in the resin substrate 121.

As shown in FIGS. 37 to 39, the detection rotor 107 is placed so that the surface 121a of the resin substrate 121 faces the surface side of the detection stator 106. The detection rotor 107 is attached to the outer periphery of the middle-diameter part 114b of the rotary shaft 114. Herein, the inner periphery of the metal member 123 is press-fitted on the outer periphery of the middle-diameter part 114b of the rotary shaft 114 and positioned on the shoulder 114d, so that the detection rotor 107 is prevented from coming off by the ring-shaped stopper 108. The lug 123a on the inner periphery of the metal member 123 is engaged in a groove (not shown) formed in the middle-diameter part 114b. Thereby, the detection rotor 107 is positioned properly and held against rotation with respect to the rotary shaft 114. As above, the detection rotor 107 is fixed to the rotary shaft 114.

Figure 40:
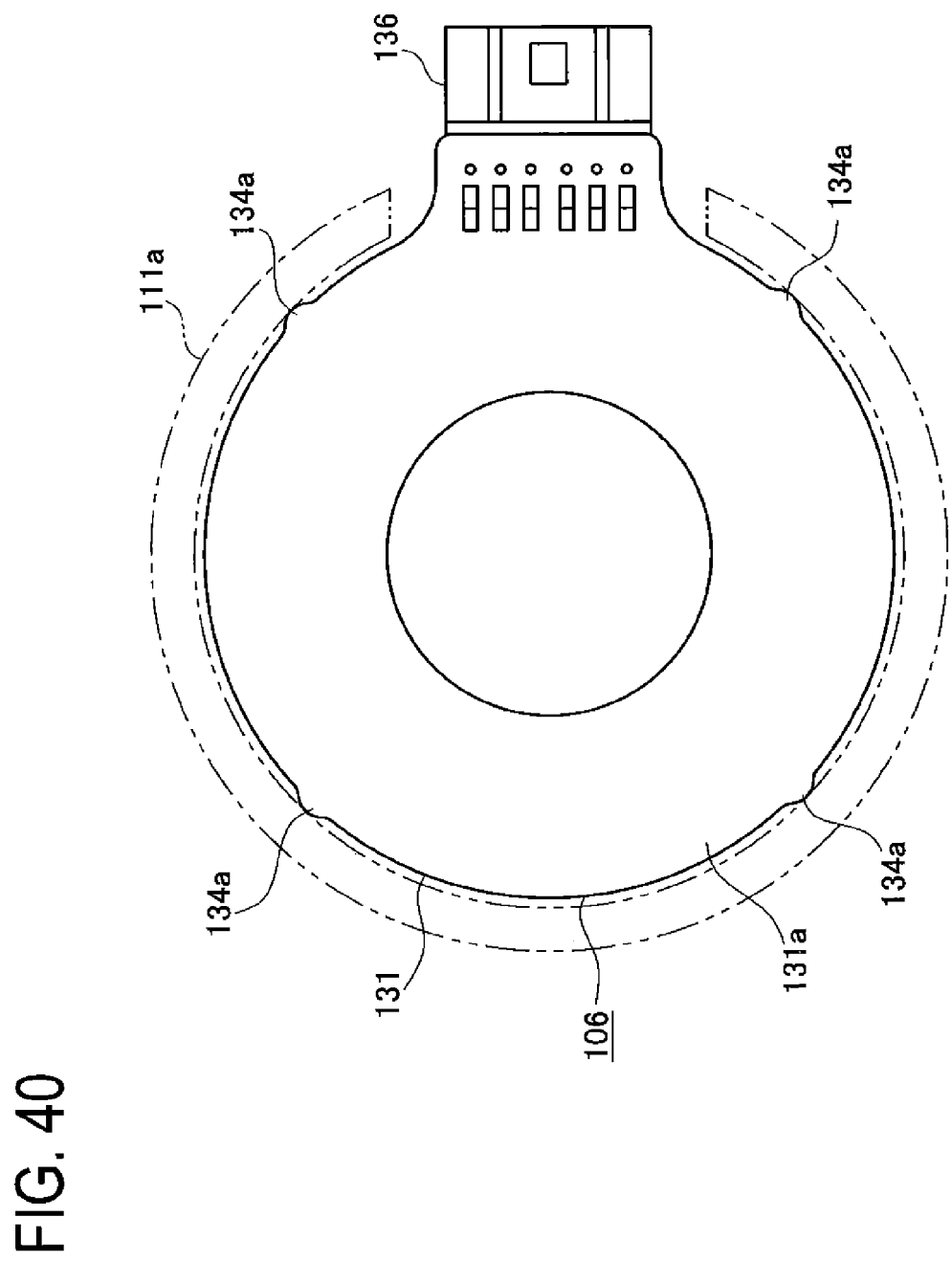
FIG. 40 is a plan view of the detection stator in the eighth embodiment.
Figure 41:
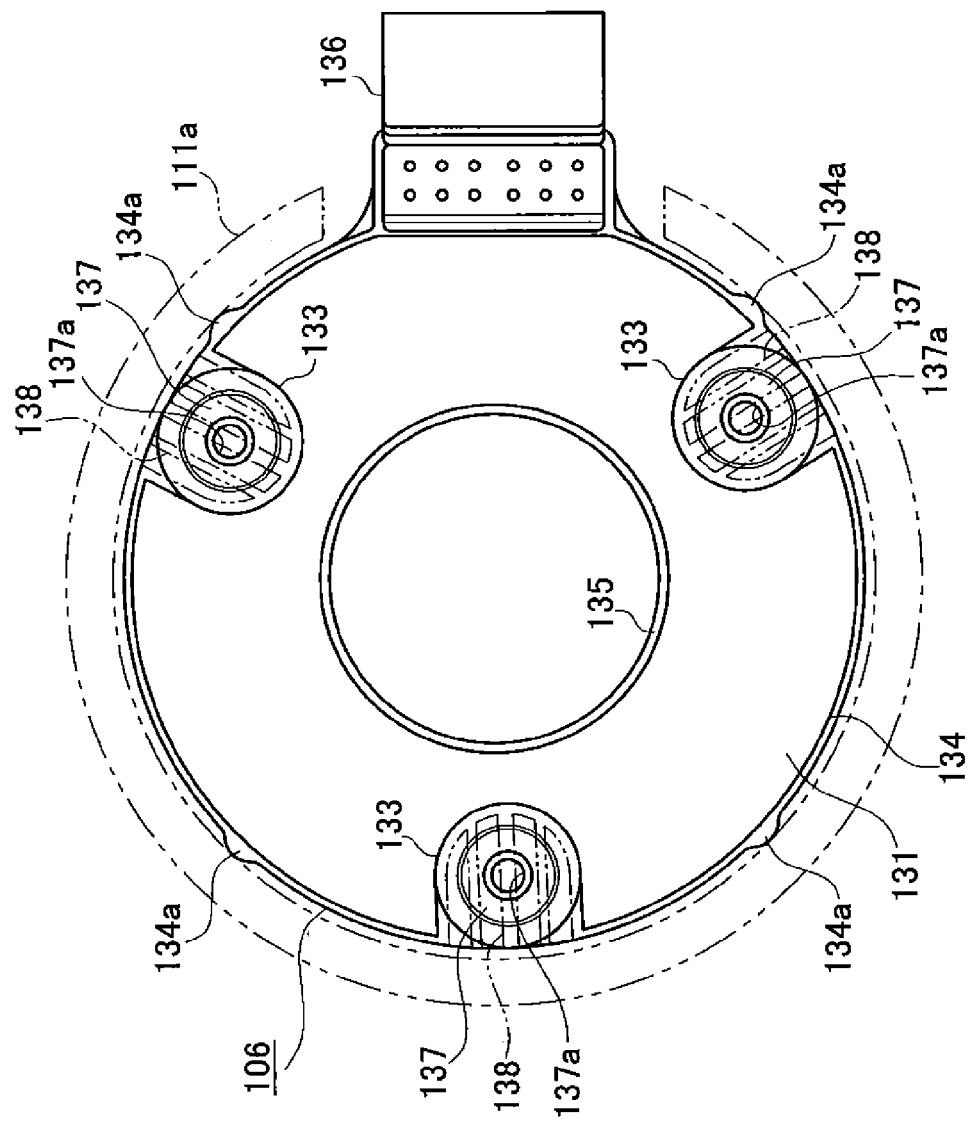
FIG. 41 is a bottom view of the detection stator in the eighth embodiment.
Figure 42:
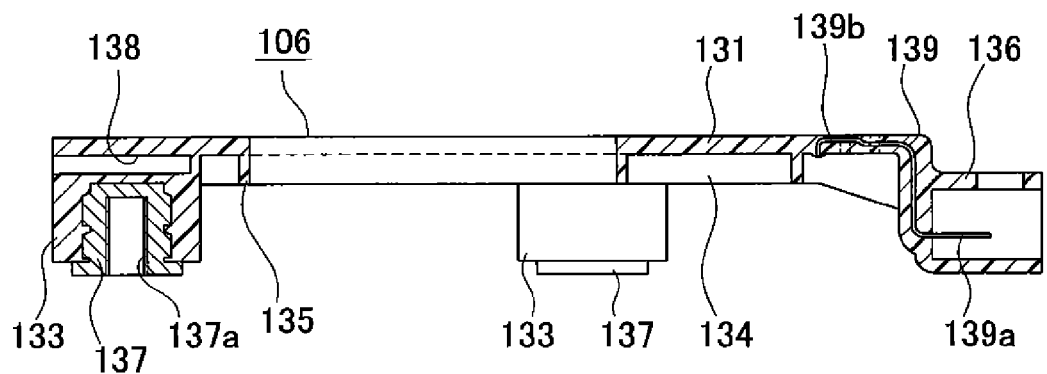
FIG. 42 is a front sectional view of the detection stator in the eighth embodiment.
Figure 43:
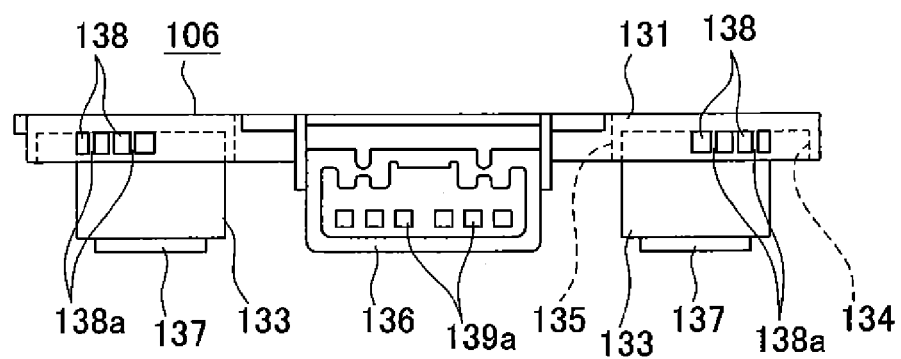
FIG. 43 is a right side view of the detection stator in the eighth embodiment.

FIG. 40 is a plan view of the detection stator 106 in the present embodiment. FIG. 41 is a bottom view of the detection stator 106 in the present embodiment. FIG. 42 is a front sectional view of the detection stator 106 in the present embodiment. FIG. 43 is a right side view of the detection stator 106 in the present embodiment. As shown in FIGS. 37 to 43, the detection stator 106 includes a detection part 131 made of resin into an almost annular flat plate shape having a surface (first surface) 131a on which a planar coil 132 is placed, a plurality of fixing protrusions 133 provided on a back surface of the detection part 131, an outer circumferential rib 134 formed along an outer circumferential edge on the back surface of the detection part 131 to serve as an outer peripheral wall extending in an axial direction, an inner circumferential rib 135 formed along an inner circumferential edge of a through hole on the back surface of the detection part 131 to serve as an inner peripheral wall extending in the axial direction, and a single connector 136 oriented sideways (in a horizontal direction) from the detection part 131. The outer circumferential rib 134 and the fixing protrusions 133 are continuously integrally formed. As shown in FIGS. 40 and 41, a plurality (four in this embodiment) of raised portions 134a are provided on the outer periphery of the outer circumferential rib 134 of the detection stator 106 so as to contact with the inner periphery of the housing part 111a. Those raised portions 134a are arranged at equal angular intervals on the outer periphery of the outer circumferential rib 134 and extending in an axial direction. As shown in FIG. 38, the planar coil 132 placed on the surface 131a of the detection part 131 is formed by printing using ink jet or the like. On the planar coil 132, an insulation layer is further formed.

As shown in FIGS. 37 to 43, each fixing protrusion 133 has a columnar shape. In the present embodiment, three protrusions 133 are provided at equal angular intervals along the outer circumference on the back surface of the detection part 131. Each protrusion 133 is provided with a metal bush 137 having a screw hole 137a and serving as a tightening fitting (a tightening metal piece). The metal bushes 137 are insert-molded individually in the protrusions 133. The metal bushes 137 are designed to allow the bolts 109 to be tightened therein to fix the detection stator 106 to the motor housing 111.

As shown in FIGS. 37 to 43, each fixing protrusion 133 is formed with cavities (holes) 138 in a position adjacent to the detection part 131. These cavities 138 are separated in a stripe pattern by ribs 138a.

As shown in FIGS. 37 and 42, a plurality of metal terminals 139 are insert-molded in the connector 136. Each terminal 139 is bent at right angle so that a first end portion 139a is placed in the connector 136 and a second end portion 139b is placed in the detection part 131. Each second end portion 139b placed in the detection part 131 is connected to a coil wire 132a (see FIGS. 46 and 47, and others) forming the planar coil 132.

Figure 44:
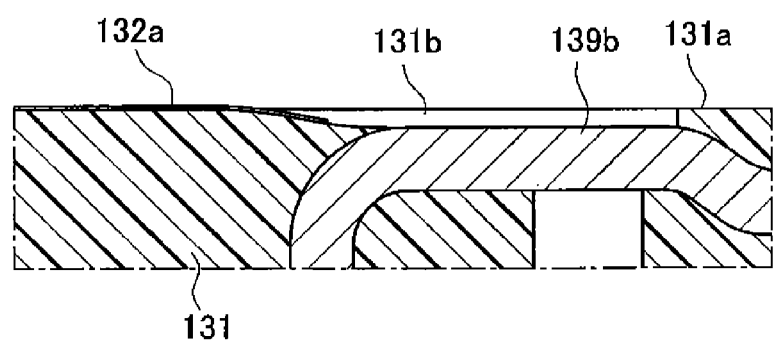
FIG. 44 is a partial enlarged sectional view showing an unconnected state between a second end portion of one terminal and a coil wire on a surface of a detection part in the eighth embodiment.
Figure 45:
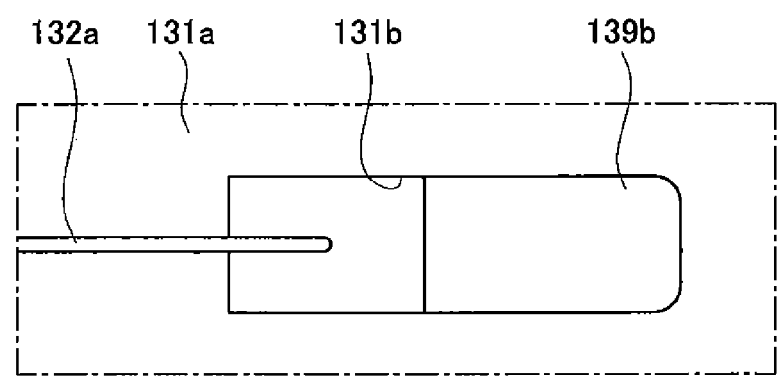
FIG. 45 is a partial enlarged plan view showing the unconnected state between the second end portion of the one terminal and the coil wire on the surface of the detection part in the eighth embodiment.

FIG. 44 is a partial enlarged sectional view showing an unconnected state between the second end portion 139b of one terminal 139 and the coil wire 132a in the surface 131a of the detection part 131. FIG. 45 is a partial enlarged plan view showing the unconnected state between the second end portion 139b of the one terminal 139 and the coil wire 132a in the surface 131a of the detection part 131. In the present embodiment, the surface 131a of the detection part 131 is formed with strip-shaped recesses 131b to expose parts of the second end portions 139b. A leading end portion of each coil wire 132a is disposed in a part of each recess 131b.

Figure 46:
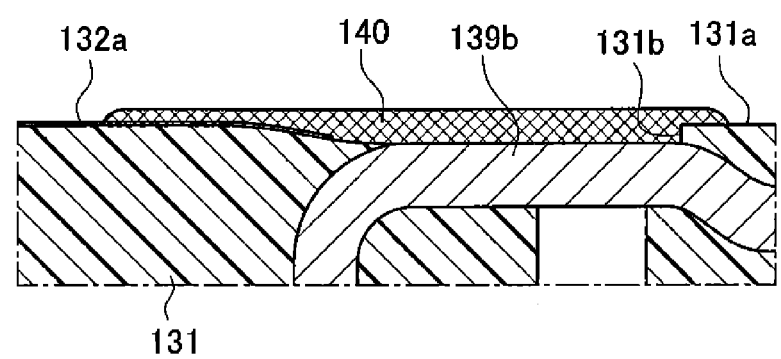
FIG. 46 is a partial enlarged sectional view showing a connected state between the second end portion of the one terminal and the coil wire on the surface of the detection part in the eighth embodiment.
Figure 47:
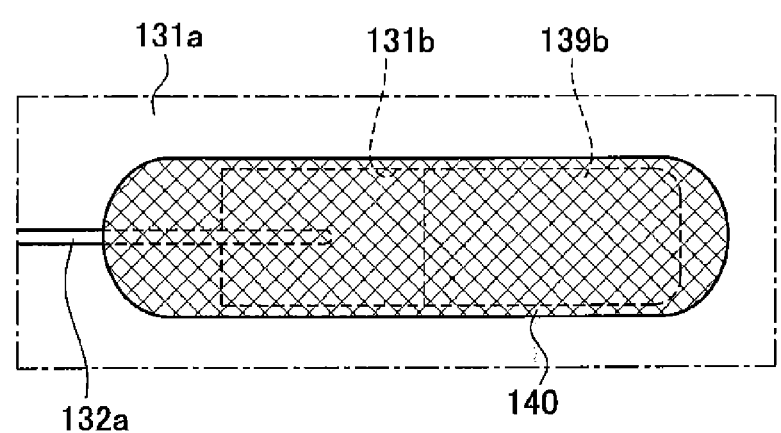
FIG. 47 is a partial enlarged plan view showing the connected state between the second end portion of the one terminal and the coil wire on the surface of the detection part in the eighth embodiment.

From the above state, the second end portions 139b of the terminals 139 and the leading end portions of the coil wires 132a are connected as below. FIG. 46 is a partial enlarged sectional view showing a connected state between the second end portion 139b of the one terminal 139 and the coil wire 132a on the surface 131a of the detection part 131. FIG. 47 is a partial plan view showing the connected state between the second end portion 139b of the one terminal 139 and the coil wire 132a on the surface 131a of the detection part 131. In the present embodiment, conductive paste 140 is used to connect the terminals 139 and the coil wires 132a. When the paste 140 enters each recess 131b, an application range of the paste 140 is stabilized by an anchor effect. This can improve joining strength of the paste 140 with the terminals 139 and the coil wires 132a. Further, the amount of the paste 140 can be reduced.

Figure 48:
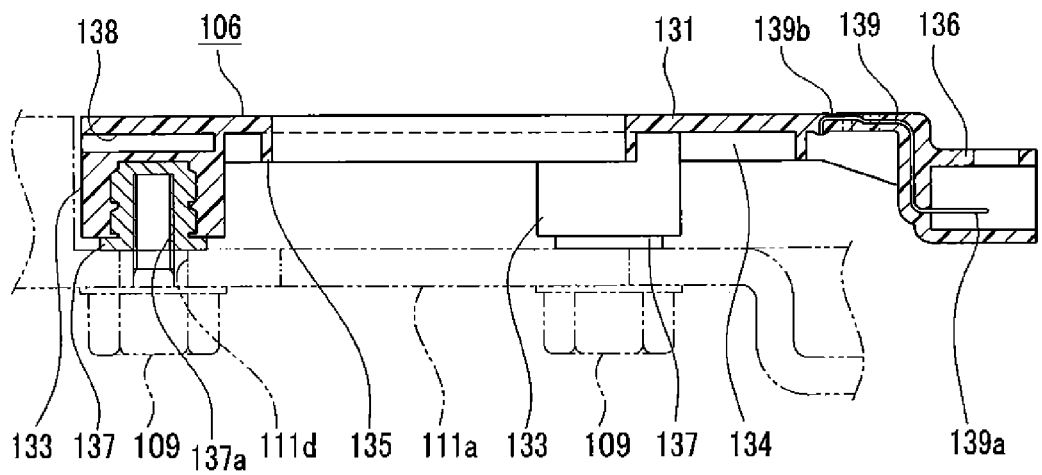
FIG. 48 is a front sectional view showing a mounting state of the detection stator to a housing part in the eighth embodiment.
Figure 49:
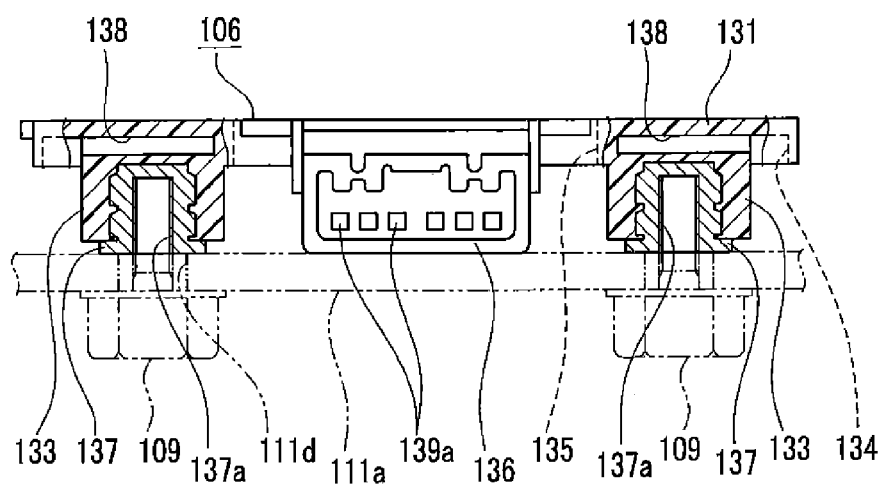
FIG. 49 is a right side view showing the mounting state of the detection stator to the housing part with a partial cutaway view in the eighth embodiment.

Herein, mounting of the detection stator 106 to the housing part 111a of the motor housing 111 will be explained. FIG. 48 is a front sectional view showing a mounting state of the detection stator 106 to the housing part 111a. FIG. 49 is a right side view showing the mounting state of the detection stator 106 to the housing part 111a with a partial cutaway view.

As shown in FIGS. 37, 48, and 49, the detection stator 106 is placed so that the surface 131a of the detection part 131 faces the surface 121a of the resin substrate 121 of the detection rotor 107. At that time, the outer periphery of the detection stator 106 is fitted inside the housing part 111a as shown in FIGS. 40 and 41. In this state, each fixing protrusion 133 is arranged on the bottom wall of the housing part 111a so as to be aligned with each bolt hole 111d. The bolts 109 are inserted in the corresponding bolt holes 111d and further tightened in the metal bushes 137 of the protrusions 133 from outside of the motor housing 111, thereby fixing the detection stator 106 to the housing part 111a. At that time, the degree of tightening each of the three bolts 109 is appropriately adjusted so that the parallelism of the surface 131a of the detection part 131 and the distance from and the position of the surface of the detection rotor 107 are adjusted.

According to the mounting structure of the rotation detector in the present embodiment explained as above, the detection part 131 includes three protrusions 133 on the back surface and the detection stator 106 is fixed in the housing part 111a of the motor housing 111 with the bolts 109 inserted in the protrusions 133 from the outside of the housing 11. Therefore, when the tightening degrees of the bolts 109 with respect to their corresponding protrusions 133 are appropriately adjusted, the parallelism of the surface 131a of the detection part 131 and the distance and the position with respect to the surface side of the detection rotor 107 can be adjusted. This makes it possible to facilitate alignment and positional adjustment of the detection stator 106 to ensure the parallelism and the precise distance with respect to the detection rotor 107, thereby ensuring the reliability of the detection stator 106 and hence achieving the detection accuracy of the rotation detector 101.

In the detection stator 106 of the present embodiment, the bolts 109 are not tightened directly in the detection part 131 but are tightened respectively in the fixing protrusions 133. Thus, the surface 131a of the detection part 131 is less likely to be warped or deformed. From this viewpoint, the reliability of the detection stator 106 can also be ensured, and hence the detection accuracy of the rotation detector 101 can be achieved.

In the detection stator 106 of the present embodiment, the outer circumferential rib 134 is formed on the back surface of the detection part 131 along the outer circumferential edge thereof, so that the detection part 131 is strengthened. Further, the inner circumferential rib 135 is formed on the back surface of the detection part 131 along the inner circumferential edge thereof, so that the detection part 131 is strengthened. Accordingly, the surface 131a of the detection part 131 is less likely to be warped or deformed. This can improve the reliability of the detection stator 106 and hence enhance the detection accuracy of the rotation detector 101.

In the detection stator 106 of the present embodiment, the outer circumferential rib 134 of the detection part 131 and the plurality of fixing protrusions 133 are continuously integrally formed. Therefore, the stress on each protrusion 133 exerted by each bolt 109 is borne by each protrusion 133 and the outer circumferential rib 134. This can reduce the stress that affects the surface of the detection part 131 and further improve the reliability of the detection stator 106, thus further enhancing the detection accuracy of the rotation detector 101.

In the detection stator 106 of the present embodiment, each fixing protrusion 133 is formed with the cavity 138 located adjacent to the detection part 131. Thus, expansion and contraction caused when the protrusions 133 are molded of resin are absorbed by the cavities 138. This can reduce the influence of the expansion and contraction of each protrusion 133 to the detection part 131 and thus ensure the parallelism of the surface 131a of the detection part 131.

In the present embodiment, since the strip-shaped ribs 138a are provided in each of the above cavities 138, the joining strength between each protrusion 133 and the detection part 131 is ensured in the portions formed with the cavities 138. In the detection stator 106, therefore, integrality between each fixing protrusion 133 and the detection part 131 can be ensured.

In the detection stator 106 of the present embodiment, the metal bushes 137 are provided respectively in the fixing protrusions 133. The joining strength between each protrusion 133 and each bolt 109 is enhanced. Thus, the fixing strength of the detection stator 106 can be easily adjusted by cooperation between the metal bushes 137 and the bolts 109. Accordingly, the detection stator 106 can be more reliably fixed to the motor housing 111, thereby facilitating a work of adjusting the position of the detection stator 106.

In the detection stator 106 of the present embodiment, three fixing protrusions 133 are provided in the detection part 131. Accordingly, the detection part 131 is less subject to twisting stress. This makes it possible to substantially ensure the parallelism of the surface 131a of the detection part 131. If only two fixing protrusions 133 are provided, the parallelism of the detection part 131 cannot be easily adjusted. If four or more fixing protrusions 133 are provided, the stress in a twisting direction is apt to occur in the detection part. For this reason, the optimal number of fixing protrusions 133 is three even in consideration of workability.

The detection stator 106 of the present embodiment can be suitably used in the rotation detector 101 in the aforementioned rotation detector mounting structure. Further, the rotation detector 101 in the present embodiment can be suitably used in the aforementioned rotation detector mounting structure.

Ninth Embodiment

A ninth embodiment of a detection stator, a rotation detector and its mounting structure according to the invention will be explained in detail below referring to the accompanying drawings.

The explanations of the ninth through twenty-fourth embodiments are given with the same reference signs to identical or similar parts or components to those in the above eighth embodiment, the details of which are omitted. Differences from the eighth embodiment are mainly explained below.

Figure 50:
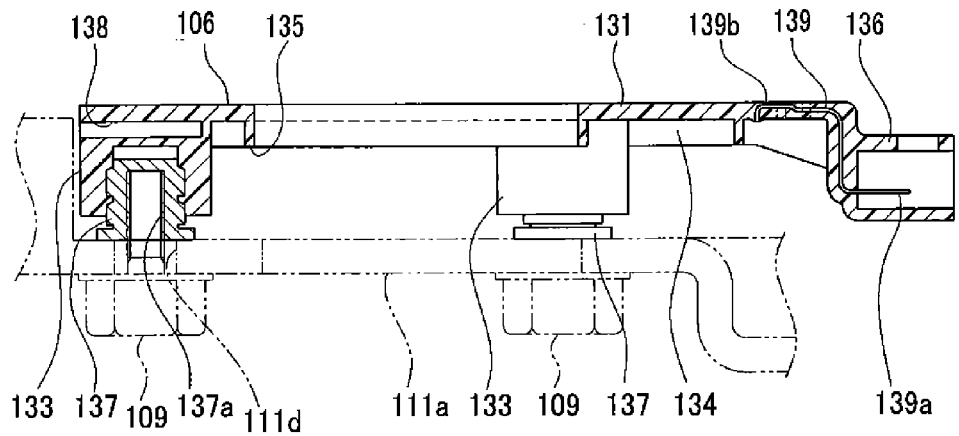
FIG. 50 is a front sectional view showing a mounting state of a detection stator to a housing part in a ninth embodiment.

The present embodiment differs from the eighth embodiment in a configuration of the detection stator 106. FIG. 50 is a front sectional view showing a mounting state of the detection stator 106 to the housing part 111a in the present embodiment. Specifically, in the present embodiment, metal bushes 137 are mounted respectively in fixing protrusions 133 by thermal press-fitting. By adjusting the thermal press-fitting height of the metal bushes 137 with respect to the protrusions 133, the distance of the surface 131a of the detection part 131 from the detection rotor 107 can be adjusted.

Other operations and effects in the present embodiment are substantially the same as those in the eighth embodiment.

Tenth Embodiment

A tenth embodiment of a detection stator, a rotation detector and its mounting structure according to the invention will be explained in detail below referring to the accompanying drawings.

Figure 51:
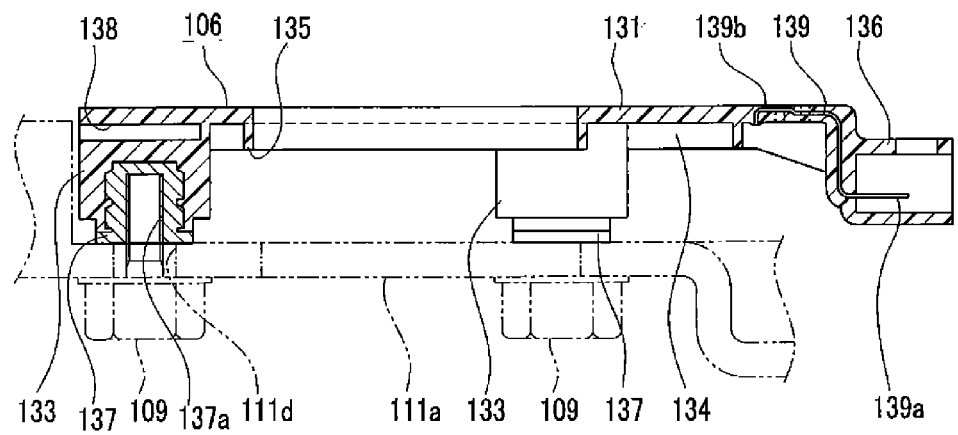
FIG. 51 is a front sectional view showing a mounting state of a detection stator to a housing part in a tenth embodiment.

The present embodiment differs from the eighth embodiment in a configuration of the detection stator 106. FIG. 51 is a front sectional view showing a mounting state of the detection stator 106 to the housing part 111a in the present embodiment. Specifically, in the present embodiment, when the detection part 131 and the protrusions 133 are to be molded of resin, a shim or the like is inserted in each hole for the metal bushes 137 in a molding die to change the depths of the holes. The metal bushes 137 are then insert-molded respectively in the fixing protrusions 133. By such adjustment of the insertion height of the metal bushes 137 with respect to the fixing protrusions 133, the distance of the surface 131a of the detection part 131 from the detection rotor 107 can be adjusted.

Other operations and effects in the present embodiment are substantially the same as those in the eighth embodiment.

Eleventh Embodiment

An eleventh embodiment of a detection stator, a rotation detector and its mounting structure according to the invention will be explained in detail below referring to the accompanying drawings.

Figure 52:
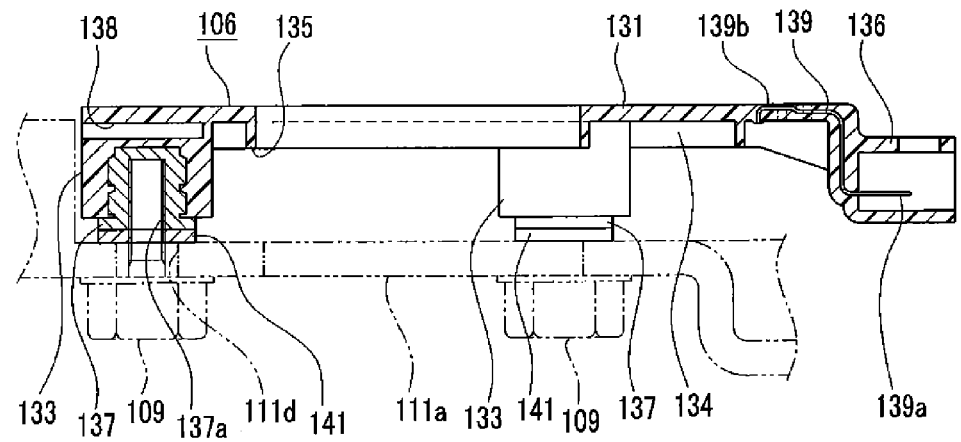
FIG. 52 is a front sectional view showing a mounting state of a detection stator to a housing part in an eleventh embodiment.

The present embodiment differs from the eighth embodiment in a configuration of the detection stator 106. FIG. 52 is a front sectional view showing a mounting state of the detection stator 106 to the housing part 111a in the present embodiment. Specifically, in the present embodiment, a shim 141 for size adjustment is interposed between a metal bush 137 and the bottom wall of the housing part 111a. The thickness of the shim 141 is changed appropriately. Thus, the distance of the surface 131a of the detection part 131 from the detection rotor 107 can be adjusted.

Other operations and effects in the present embodiment are substantially the same as those in the eights embodiment.

Twelfth Embodiment

A twelfth embodiment of a detection stator, a rotation detector and its mounting structure according to the invention will be explained in detail below referring to the accompanying drawings.

Figure 53:
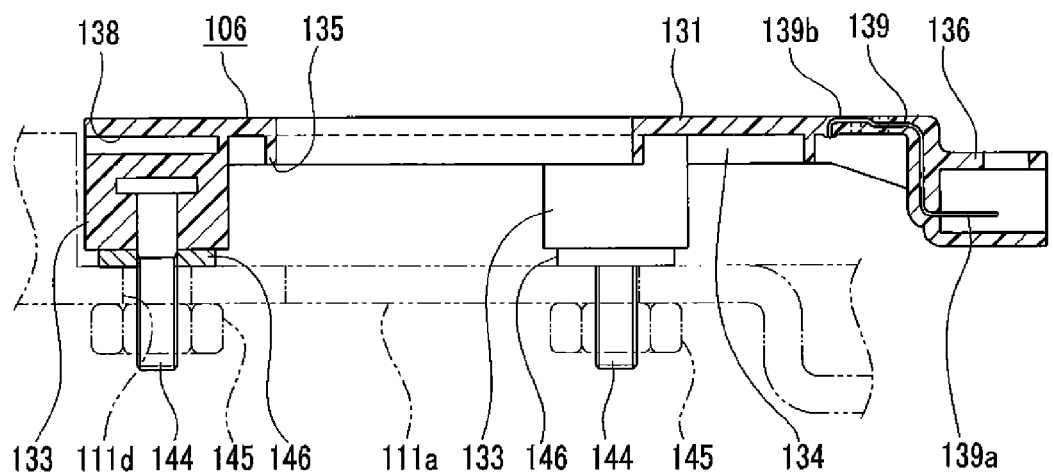
FIG. 53 is a front sectional view showing a mounting state of a detection stator to a housing part in a twelfth embodiment.

The present embodiment differs from the eighth through eleventh embodiments in a configuration of the detection stator 106. FIG. 53 is a front sectional view showing a mounting state of the detection stator 106 to the housing part 111a in the present embodiment. In the present embodiment, specifically, instead of the metal bushes 137, bolts 144 serving as a tightening fitting are respectively insert-molded in the fixing protrusions 133. As a fixing member, nuts 145 for the bolts 144 are used. Washers 146 are individually interposed between each protrusion 133 and the bottom wall of the housing part 111a. By changing the thickness of the washers 146, in the present embodiment, the distance of the detection stator 106 from the detection rotor 107 can be adjusted.

Other operations and effects in the present embodiment are substantially the same as those in the eighth embodiment.

Thirteenth Embodiment

A thirteenth embodiment of a detection stator, a rotation detector and its mounting structure according to the invention will be explained in detail below referring to the accompanying drawings.

Figure 54:
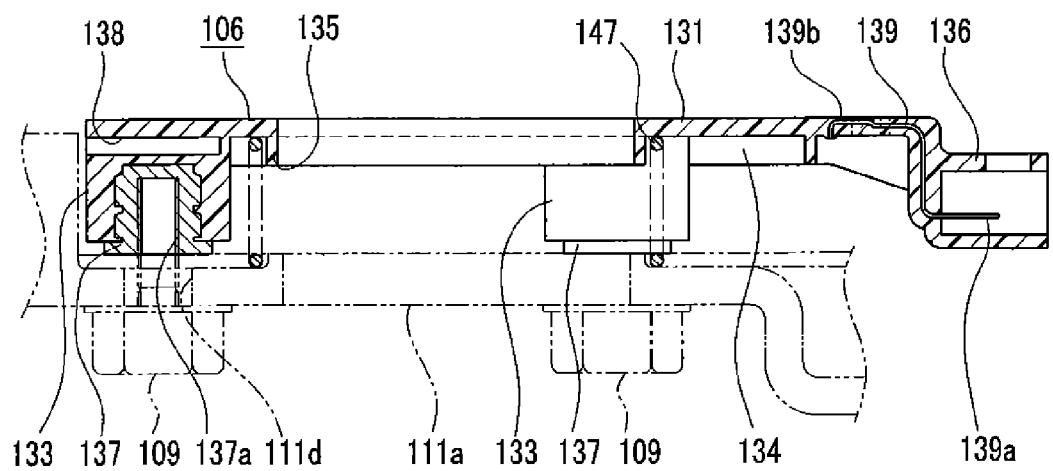
FIG. 54 is a front sectional view showing a mounting state of a detection stator to a housing part in a thirteenth embodiment.

The present embodiment differs from the eighth embodiment in a configuration of the detection stator 106. FIG. 54 is a front sectional view showing a mounting state of the detection stator 106 to the housing part 111a in the present embodiment. Specifically, the present embodiment differs from the eighth embodiment in that a spring 147 is interposed between the detection part 131 and the bottom wall of the housing part 111a. This spring 147 is placed concentric with the inner circumferential rib 135 of the detection part 131. The elastic force of the spring 147 can prevent rattle of the detection stator 106 with respect to the housing part 111a.

Other operations and effects in the present embodiment are substantially the same as those in the eighth embodiment.

Fourteenth Embodiment

A fourteenth embodiment of a detection stator, a rotation detector and its mounting structure according to the invention will be explained in detail below referring to the accompanying drawings.

Figure 55:
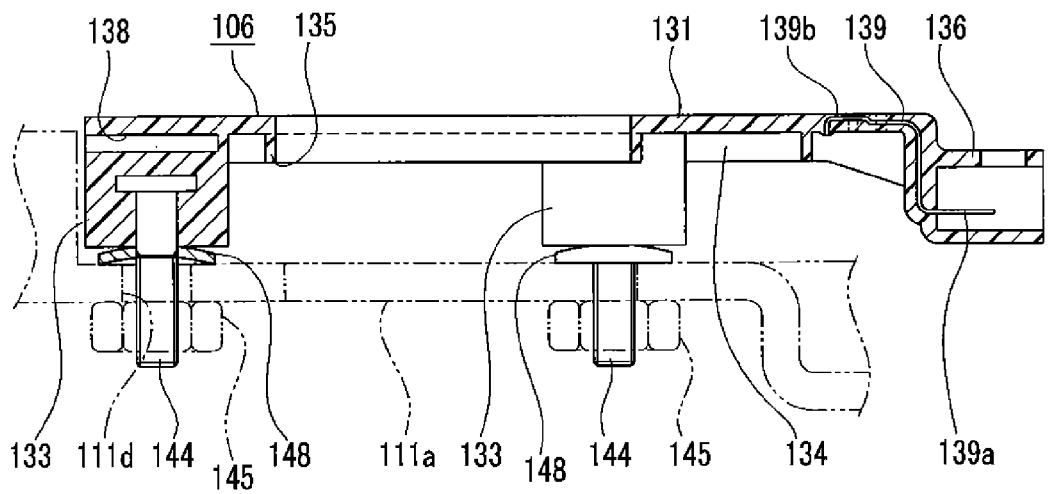
FIG. 55 is a front sectional view showing a mounting state of a detection stator to a housing part in a fourteenth embodiment.

The present embodiment differs from the twelfth embodiment in a configuration of the detection stator 106. FIG. 55 is a front sectional view showing a mounting state of the detection stator 106 to the housing part 111a in the present embodiment. Specifically, the present embodiment differs from the twelfth embodiment in the use of spring washers 148 instead of the washers 146 in the twelfth embodiment. The elastic force of the spring washers 148 can therefore prevent rattle of the detection stator 106 with respect to the housing part 111a.

Other operations and effects in the present embodiment are substantially the same as those in the eighth embodiment.

Fifteenth Embodiment

A fifteenth embodiment of a detection stator, a rotation detector and its mounting structure according to the invention will be explained in detail below referring to the accompanying drawings.

Figure 56:
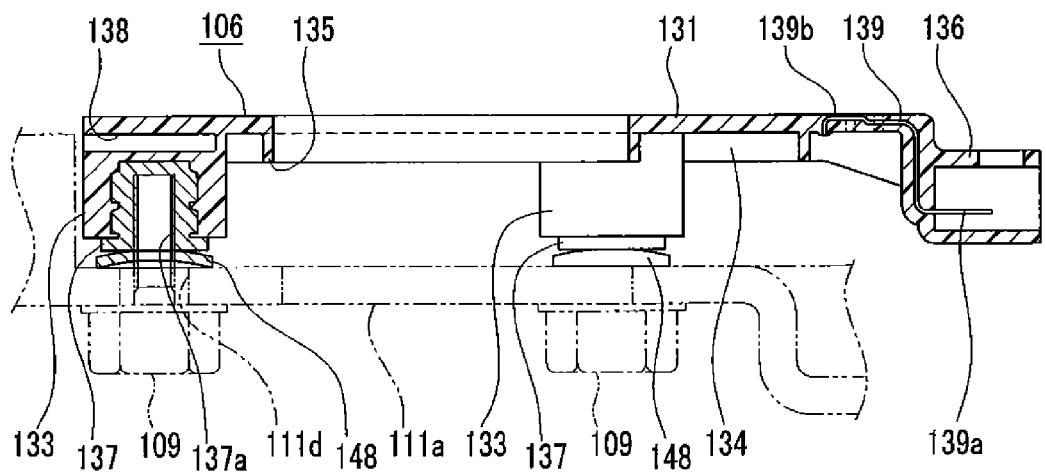
FIG. 56 is a front sectional view showing a mounting state of a detection stator to a housing part in a fifteenth embodiment.

The present embodiment differs from the eleventh embodiment in a configuration of the detection stator 106. FIG. 56 is a front sectional view showing a mounting state of the detection stator 106 to the housing part 111a in the present embodiment. Specifically, the present embodiment differs from the eleventh embodiment in the use of spring washers 148 instead of the shims 141 in the eleventh embodiment. The elastic force of the spring washers 148 can therefore prevent rattle of the detection stator 106 with respect to the housing part 111a.

Other operations and effects in the present embodiment are substantially the same as those in the eighth embodiment.

Sixteenth Embodiment

A sixteenth embodiment of a detection stator, a rotation detector and its mounting structure according to the invention will be explained in detail below referring to the accompanying drawings.

Figure 57:
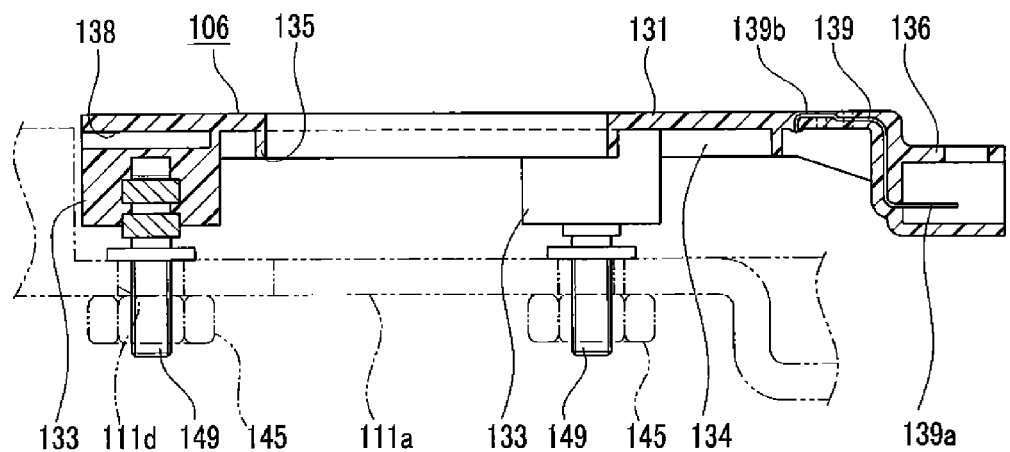
FIG. 57 is a front sectional view showing a mounting state of a detection stator to a housing part in a sixteenth embodiment.

The present embodiment differs from the eighth embodiment in a configuration of the detection stator 106. FIG. 57 is a front sectional view showing a mounting state of the detection stator 106 to the housing part 111*a* in the present embodiment. In the present embodiment, specifically, instead of the bolts 144, flanged bolts 149 are inserted as a tightening fitting respectively into the fixing protrusions 133 by thermal press-fitting. Nuts 145 for the flanged bolts 149 are used as a fixing member. In the present embodiment, by adjusting the thermal press-fitting height of the flanged bolts 149 with respect to the protrusions 133, the distance of the detection stator 106 from the detection rotor 107 can be adjusted.

Other operations and effects in the present embodiment are substantially the same as those in the eighth embodiment.

Seventeenth Embodiment

A seventeenth embodiment of a detection stator, a rotation detector and its mounting structure according to the invention will be explained in detail below referring to the accompanying drawings.

Figure 58:
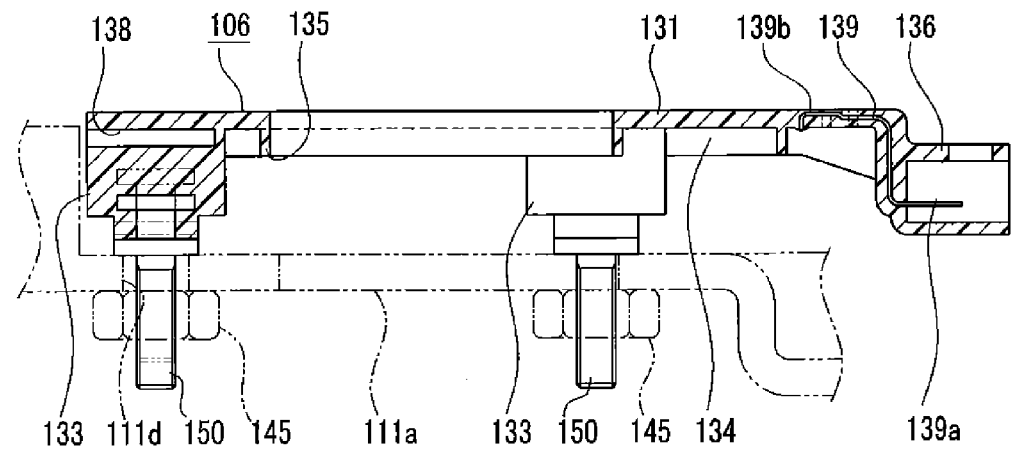
FIG. 58 is a front sectional view showing a mounting state of a detection stator to a housing part in a seventeenth embodiment.

The present embodiment differs from the eighth embodiment in a configuration of the detection stator 106. FIG. 58 is a front sectional view showing a mounting state of the detection stator 106 to the housing part 111*a* in the present embodiment. In the present embodiment, specifically, instead of the bolts 144, flanged bolts 150 are insert-molded respectively as a tightening fitting into the fixing protrusions 133. Nuts 145 for the flanged bolts 150 are used as a fixing member. In the present embodiment, the inserting height of the flanged bolt 150 in the fixing protrusion 133 is changed, thereby adjusting the distance of the detection stator 106 from the detection rotor 107.

Other operations and effects in the present embodiment are substantially the same as those in the eighth embodiment.

Eighteenth Embodiment

An eighteenth embodiment of a detection stator, a rotation detector and its mounting structure according to the invention will be explained in detail below referring to the accompanying drawings.

Figure 59:
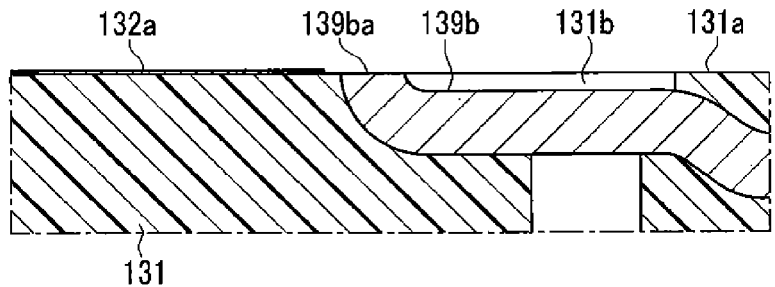
FIG. 59 is a partial enlarged sectional view showing an unconnected state between a second end portion of one terminal and a coil wire on a surface of a detection part in an eighteenth embodiment.
Figure 60:
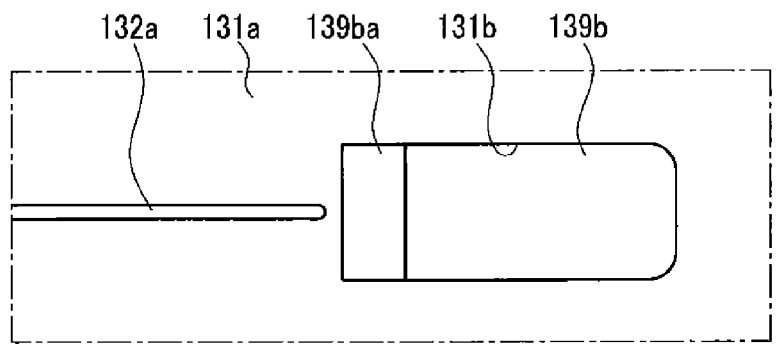
FIG. 60 is a partial enlarged plan view showing the unconnected state between the second end portion of the one terminal and the coil wire on the surface of the detection part in the eighteenth embodiment.

The present embodiment differs from the eighth embodiment in a configuration for connection between a second end portion 139*b* of one terminal 139 and a coil wire 132*a* on the surface 131*a* of the detection part 131. FIG. 59 is a partial enlarged sectional view showing an unconnected state between the second end portion 139*b* of the one terminal 139 and the coil wire 132*a* on the surface 131*a* of the detection part 131. FIG. 60 is a partial enlarged plan view showing the unconnected state between the second end portion 139*b* of the one terminal 139 and the coil wire 132*a* on the surface 131*a* of the detection part 131. In the present embodiment, the surface 131*a* of the detection part 131 is formed with strip-shaped recesses 131*b* to expose parts of the second end portions 139*b*. Further, each second end portion 139*b* is bent so that respective end faces 139*ba* are flush with the surface 131*a* of the detection part 131. Leading end portions of the coil wires 132*a* are placed near the corresponding end faces 139*ba*.

Figure 61:
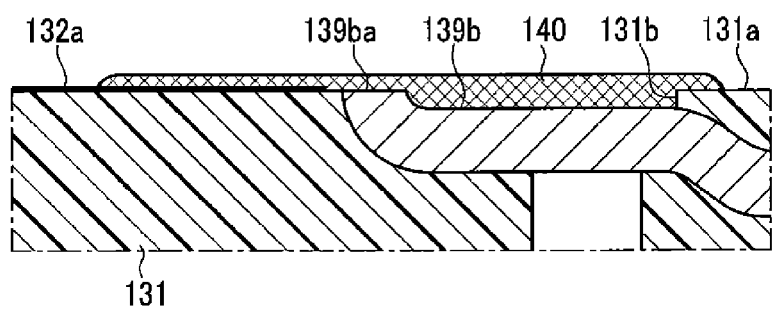
FIG. 61 is a partial enlarged sectional view showing a connected state between the second end portion of the one terminal and the coil wire on the surface of the detection part in the eighteenth embodiment.
Figure 62:
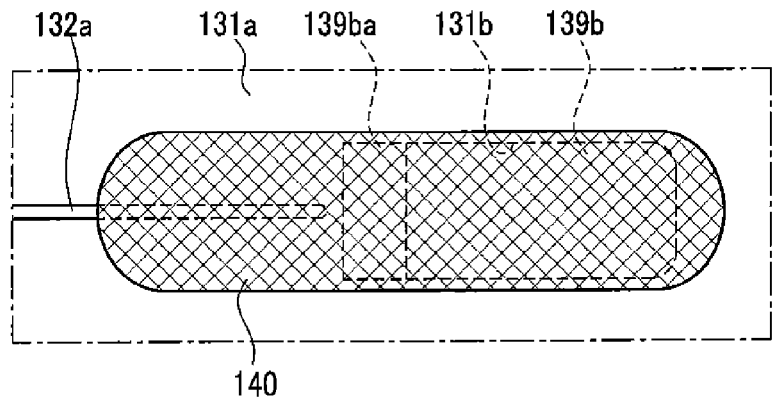
FIG. 62 is a partial enlarged plan view showing the connected state between the second end portion of the one terminal and the coil wire on the surface of the detection part in the eighteenth embodiment.

From the above state, the second end portions 139*b* of the terminals 139 are connected respectively with the leading end portions of the coil wires 132*a* in the following manner. FIG. 61 is a partial enlarged sectional view showing a connected state between the second end portion 139*b* of the one terminal 139 and the coil wire 132*a* on the surface 131*a* of the detection part 131. FIG. 62 is a partial enlarged plan view showing the connected state between the second end portion 139*b* of the one terminal 139 and the coil wire 132*a* on the surface 131*a* of the detection part 131. In the present embodiment, conductive paste 140 is used to connect the terminals 139 to the coil wires 132*a*. When the paste 140 enters each recess 131*b*, an application range of the paste 140, is stabilized by an anchor effect. This can improve joining strength of the paste 140 with the terminals 139 and the coil wires 132*a*. Since the end face 139*ba* of each second end portion 139*b* is bent to be flush with the surface 131*a* of the detection part 131, the joining strength of the paste 140 in that portion can be enhanced. Further, the amount of the paste 140 can be reduced.

Nineteenth Embodiment

A nineteenth embodiment of a detection stator, a rotation detector and its mounting structure according to the invention will be explained in detail below referring to the accompanying drawings.

Figure 63:
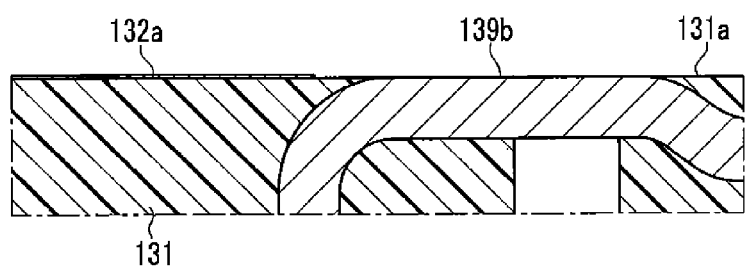
FIG. 63 is a partial enlarged sectional view showing an unconnected state between a second end portion of one terminal with a coil wire on a surface of a detection part in a nineteenth embodiment.
Figure 64:
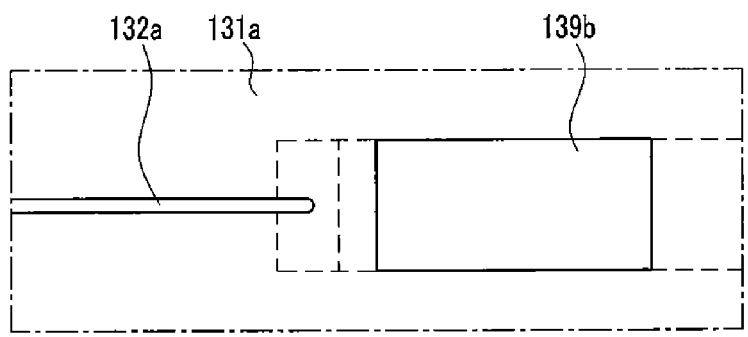
FIG. 64 is a partial enlarged plan view showing the unconnected state between the second end portion of the one terminal and the coil wire on the surface of the detection part in the nineteenth embodiment.

The present embodiment differs from the eighth embodiment in a configuration for connection between a second end portion 139*b* of one terminal 139 and a coil wire 132*a* on the surface 131*a* of the detection part 131. FIG. 63 is a partial enlarged sectional view showing an unconnected state between the second end portion 139*b* of the one terminal 139 and the coil wire 132*a* on the surface 131*a* of the detection part 131. FIG. 64 is a partial enlarged plan view showing the unconnected state between the second end portion 139*b* of the one terminal 139 and the coil wire 132*a* on the surface 131*a* of the detection part 131. The present embodiment differs from the eighth embodiment in the absence of the recesses 131*b* provided corresponding to the second end portions 139*b*, and parts of the second end portions 139*b* are made flush with the surface 131*a*.

Figure 65:
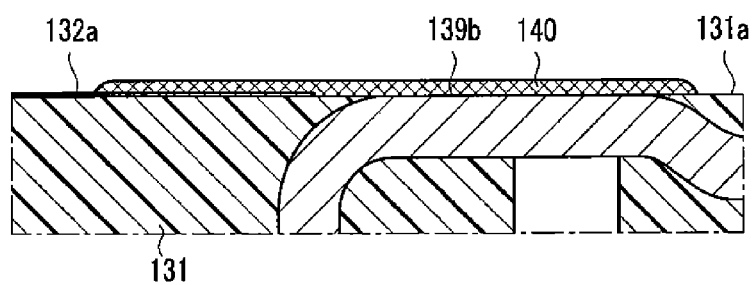
FIG. 65 is a partial enlarged sectional view showing a connected state between the second end portion of the one terminal and the coil wire on the surface of the detection part in the nineteenth embodiment.
Figure 66:
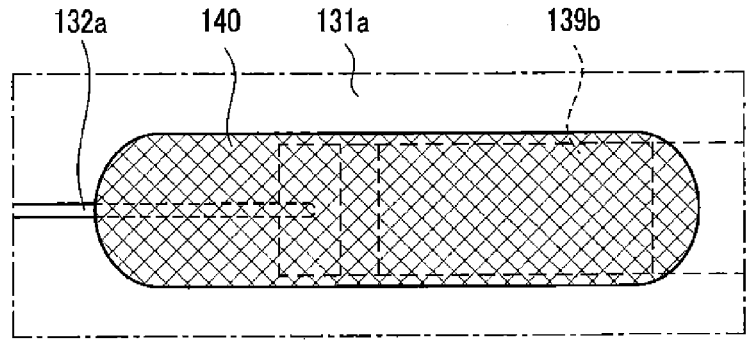
FIG. 66 is a partial enlarged plan view showing the connected state between the second end portion of the one terminal and the coil wire on the surface of the detection part in the nineteenth embodiment.

From the state, the second end portions 139*b* of the terminals 139 are connected respectively with the leading end portions of the coil wires 132*a* in the following manner. FIG. 65 is a partial enlarged sectional view showing a connected state between the second end portion 139*b* of one terminal 139 and the coil wire 132*a* on the surface 131*a* of the detection part 131. FIG. 66 is a partial enlarged plan view showing the connected state between the second end portion 139*b* of one terminal 139 and the coil wire 132*a* on the surface 131*a* of the detection part 131. In the present embodiment, conductive paste 140 is used to connect the terminals 139 to the coil wires 132*a*. Since the recess 131*b* is absent, differently from the eighth embodiment, the coating thickness of the conductive layer 140 can be made uniform. Accordingly, it is possible to reduce stress at the time of thermal expansion, thereby preventing breakage of the conductive paste 140.

Other operations and effects in the present embodiment are substantially the same as those in the eighth embodiment.

Twentieth Embodiment

A twentieth embodiment of a detection stator, a rotation detector and its mounting structure according to the invention will be explained in detail below referring to the accompanying drawings.

Figure 67:
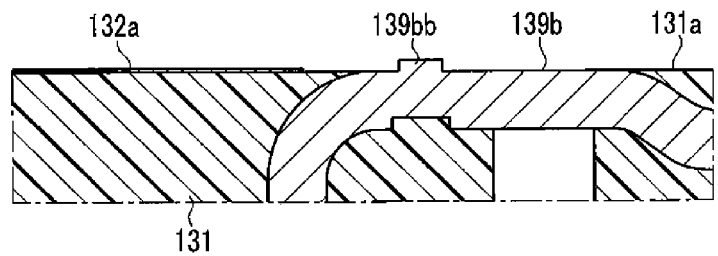
FIG. 67 is a partial enlarged sectional view showing an unconnected state between a second end portion of one terminal and a coil wire on a surface of a detection part in a twentieth embodiment.
Figure 68:
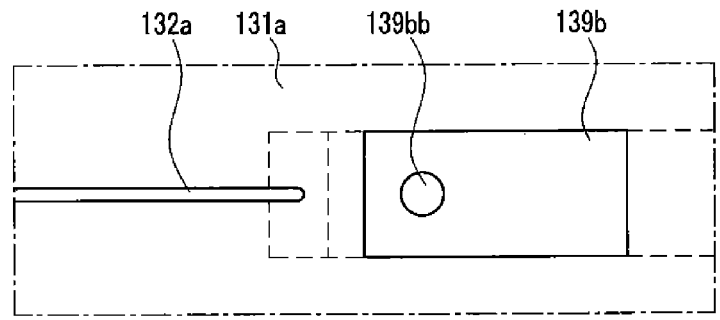
FIG. 68 is a partial enlarged plan view showing the unconnected state between the second end portion of the one terminal and the coil wire on the surface of the detection part in the twentieth embodiment.

The present embodiment differs from the eighth embodiment in a configuration for connection between a second end portion 139*b* of one terminal 139 and a coil wire 132*a* on the surface 131*a* of the detection part 131. FIG. 67 is a partial enlarged sectional view showing an unconnected state between the second end portion 139*b* of the one terminal 139 and the coil wire 132*a* on the surface 131*a* of the detection part 131. FIG. 68 is a partial enlarged plan view showing the unconnected state between the second end portion 139*b* of the one terminal 139 and the coil wire 132a on the surface 131a of the detection part 131. The present embodiment differs from the nineteenth embodiment in that each second end portion 139b flush with the surface 131a of the detection part 131 is provided with a protrusion 139bb.

Figure 69:
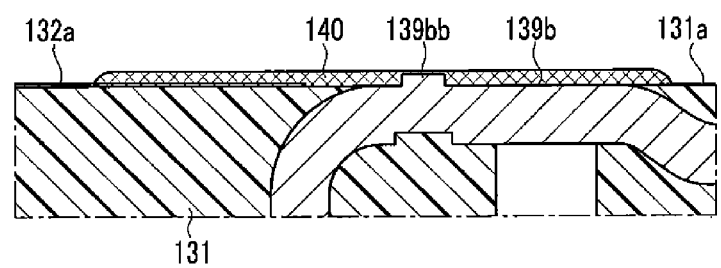
FIG. 69 is a partial enlarged sectional view showing a connected state between the second end portion of the one terminal and the coil wire on the surface of the detection part in the twentieth embodiment.
Figure 70:
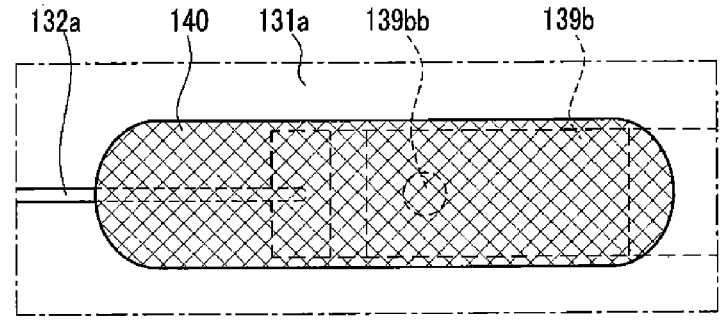
FIG. 70 is a partial enlarged plan view showing the connected state between the second end portion of the one terminal and the coil wire on the surface of the detection part in the twentieth embodiment.

From the above state, the second end portions 139b of the terminals 139 are connected respectively with the leading end portions of the coil wires 132a in the following manner. FIG. 69 is a partial enlarged sectional view showing a connected state between the second end portion 139b of the one terminal 139 and the coil wire 132a on the surface 131a of the detection part 131. FIG. 70 is a partial enlarged plan view showing the connected state between the second end portion 139b of the one terminal 139 and the coil wire 132a on the surface 131a of the detection part 131. In the present embodiment, conductive paste 140 is used to connect the terminals 139 to the coil wires 132a. Since the recesses 131b are absent in the present embodiment, different from the eighth embodiment, the coating thickness of the conductive paste 140 can be made uniform on the surface 131a. Accordingly, it is possible to reduce stress at the time of thermal expansion, thereby preventing breakage of the conductive paste 140. Further, with the presence of the protrusions 139bb, the second end portions 139b can provide higher joining strength with the conductive paste 140.

Other operations and effects in the present embodiment are substantially the same as those in the eighth embodiment.

Twenty-First Embodiment

A twenty-first embodiment of a detection stator, a rotation detector and its mounting structure according to the invention will be explained in detail below referring to the accompanying drawings.

Figure 71:
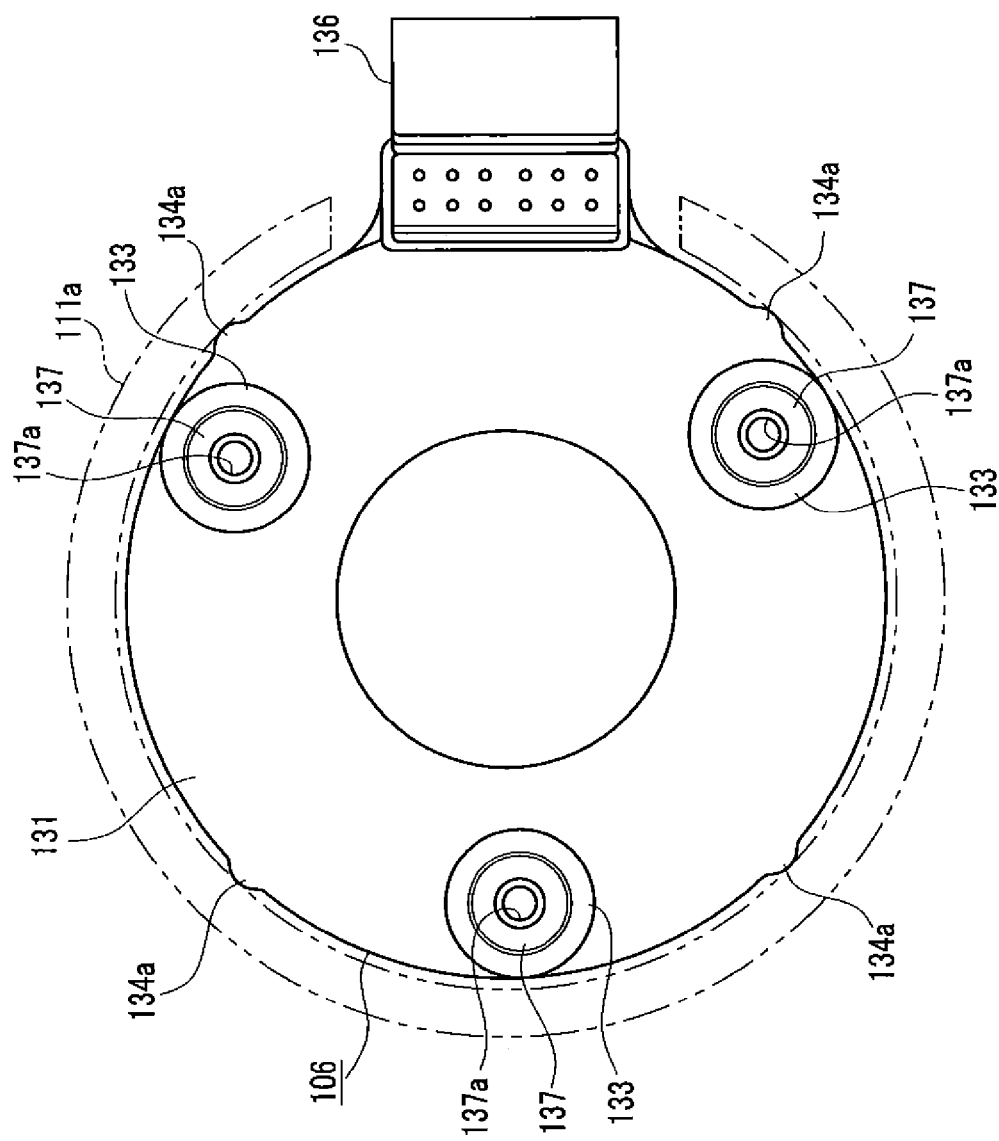
FIG. 71 is a bottom view of a detection stator in a twenty-first embodiment.
Figure 72:
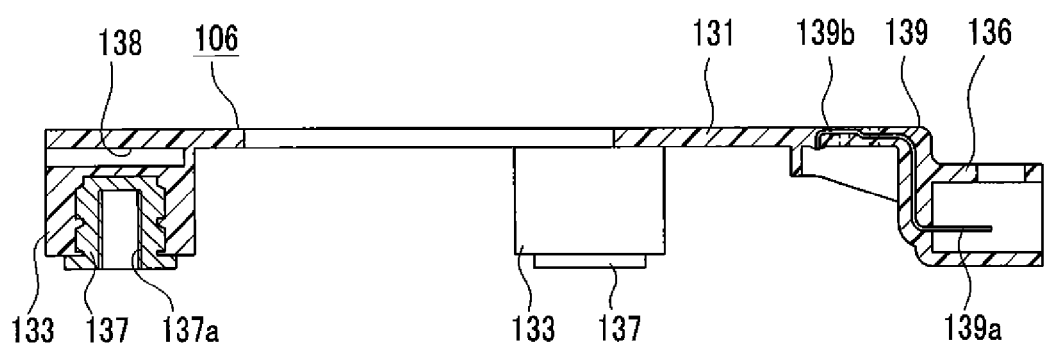
FIG. 72 is a front sectional view of the detection stator in the twenty-first embodiment.
Figure 73:
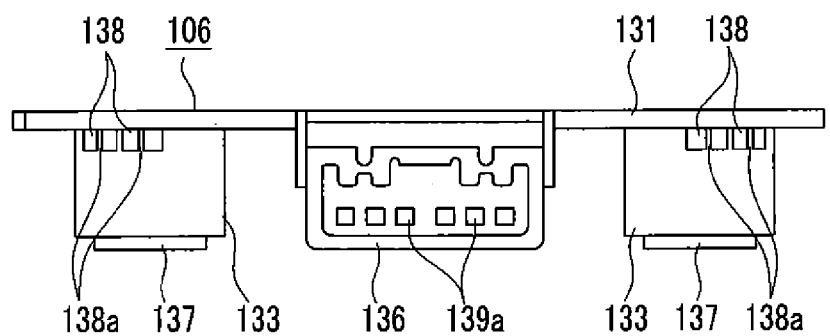
FIG. 73 is a right side view of the detection stator in the twenty-first embodiment.

FIG. 71 is a bottom view of the detection stator 106 in the present embodiment. FIG. 72 is a front sectional view of the detection stator 106 in the present embodiment. FIG. 73 is a right side view of the detection stator 106 in the present embodiment. The detection stator 106 of the present embodiment differs from that of the eighth embodiment in the absence of the outer circumferential rib 134 and the inner circumferential rib 135 on the back side of the detection part 131. Accordingly, in the detection stator 106 of the present embodiment not including the outer circumferential rib 134 and the inner circumferential rib 135, the shape of the detection part 131 can be made simpler by just that much.

Other operations and effects in the present embodiment are substantially the same as those in the eighth embodiment.

Twenty-Second Embodiment

A twenty-second embodiment of a detection stator, a rotation detector and its mounting structure according to the invention will be explained in detail below referring to the accompanying drawings.

Figure 74:
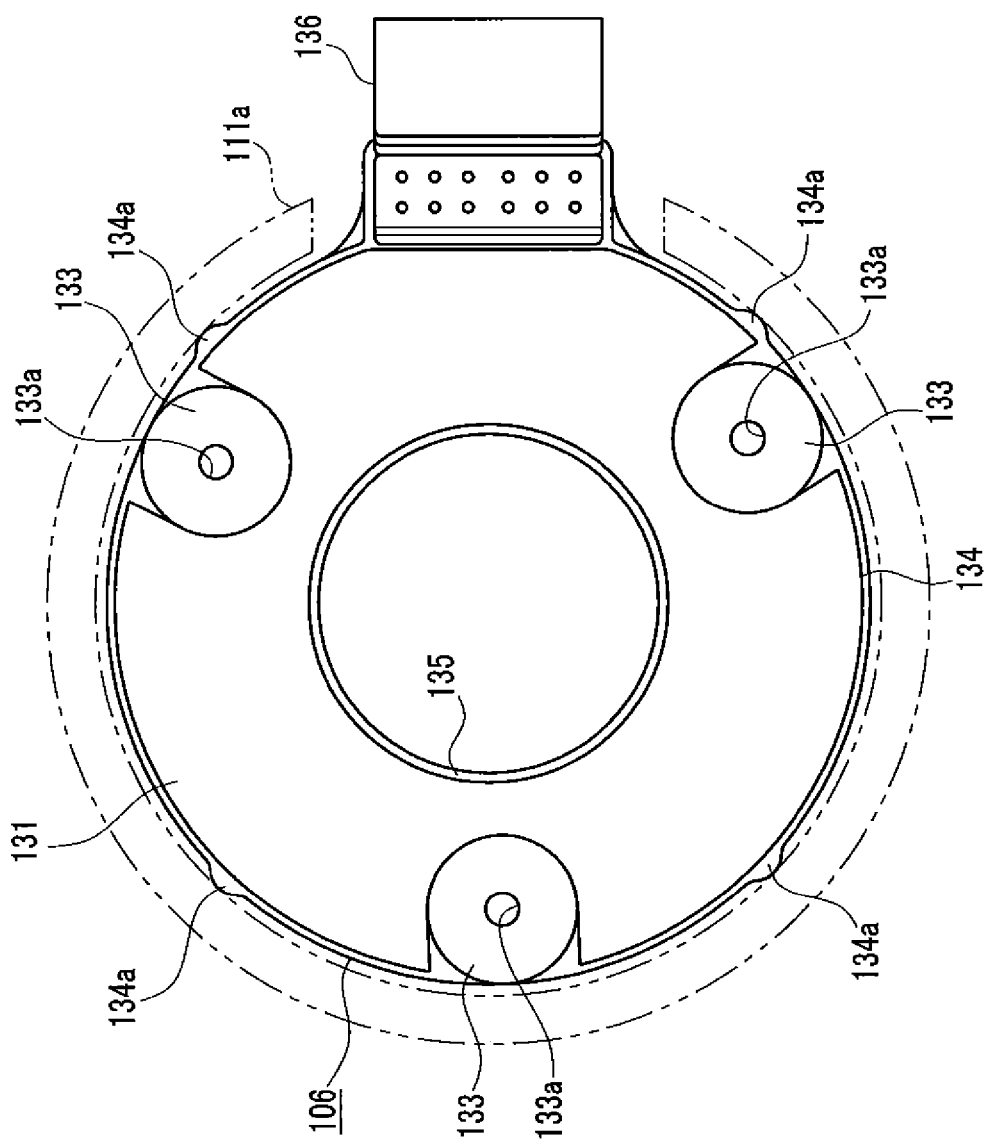
FIG. 74 is a bottom view of a detection stator in a twenty-second embodiment.
Figure 75:
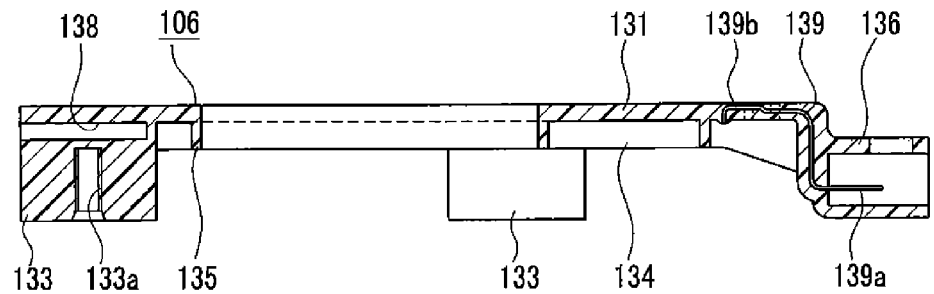
FIG. 75 is a front sectional view of the detection stator in the twenty-second embodiment.
Figure 76:
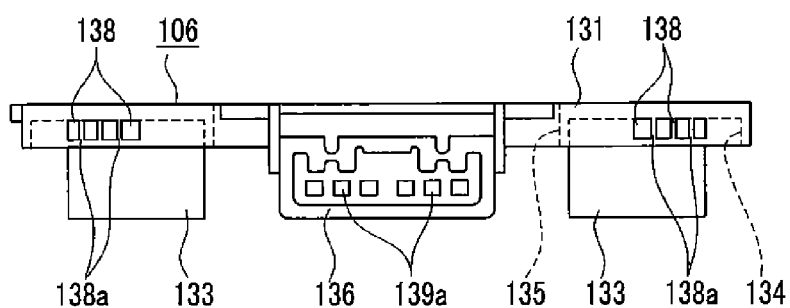
FIG. 76 is a right side view of the detection stator in the twenty-second embodiment.
Figure 77:
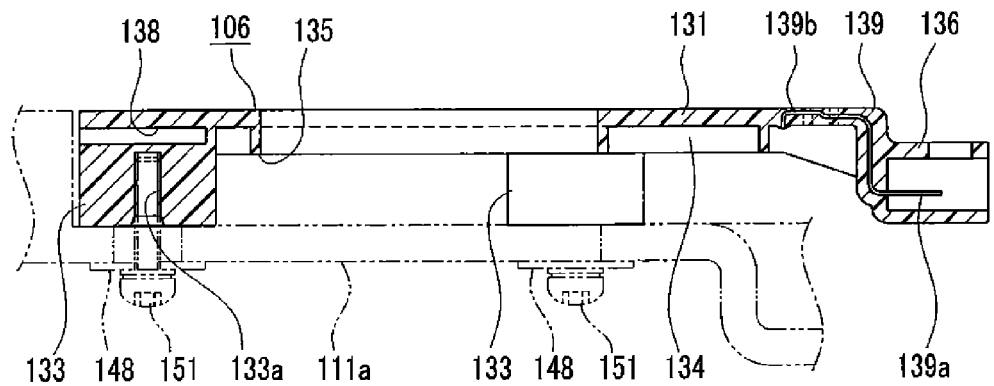
FIG. 77 is a front sectional view showing a mounting state of the detection stator to a housing part in the twenty-second embodiment.

FIG. 74 is a bottom view of the detection stator 106 of the present embodiment. FIG. 75 is a front sectional view of the detection stator 106 of the present embodiment. FIG. 76 is a right side view of the detection stator 106 of the present embodiment. FIG. 77 is a front sectional view showing a mounting state of the detection stator 106 to the housing part 111a in the present embodiment. The detection stator 106 of the present embodiment differs from that of the eighth embodiment in that the metal bushes 137 are omitted in the fixing protrusions 133 and instead tapping screws 151 serving as a fixing member are directly screwed in corresponding holes 133a formed in the protrusions 133 through spring washers 148. Accordingly, in the detection stator 106 of the present embodiment with omission of the metal bush 137 as the tightening fitting, the detection stator 106 can be configured more simply and more lightweight.

Other operations and effects in the present embodiment are substantially the same as those in the eighth embodiment.

Twenty-Third Embodiment

A twenty-third embodiment of a detection stator, a rotation detector and its mounting structure according to the invention will be explained in detail below referring to the accompanying drawings.

Figure 78:
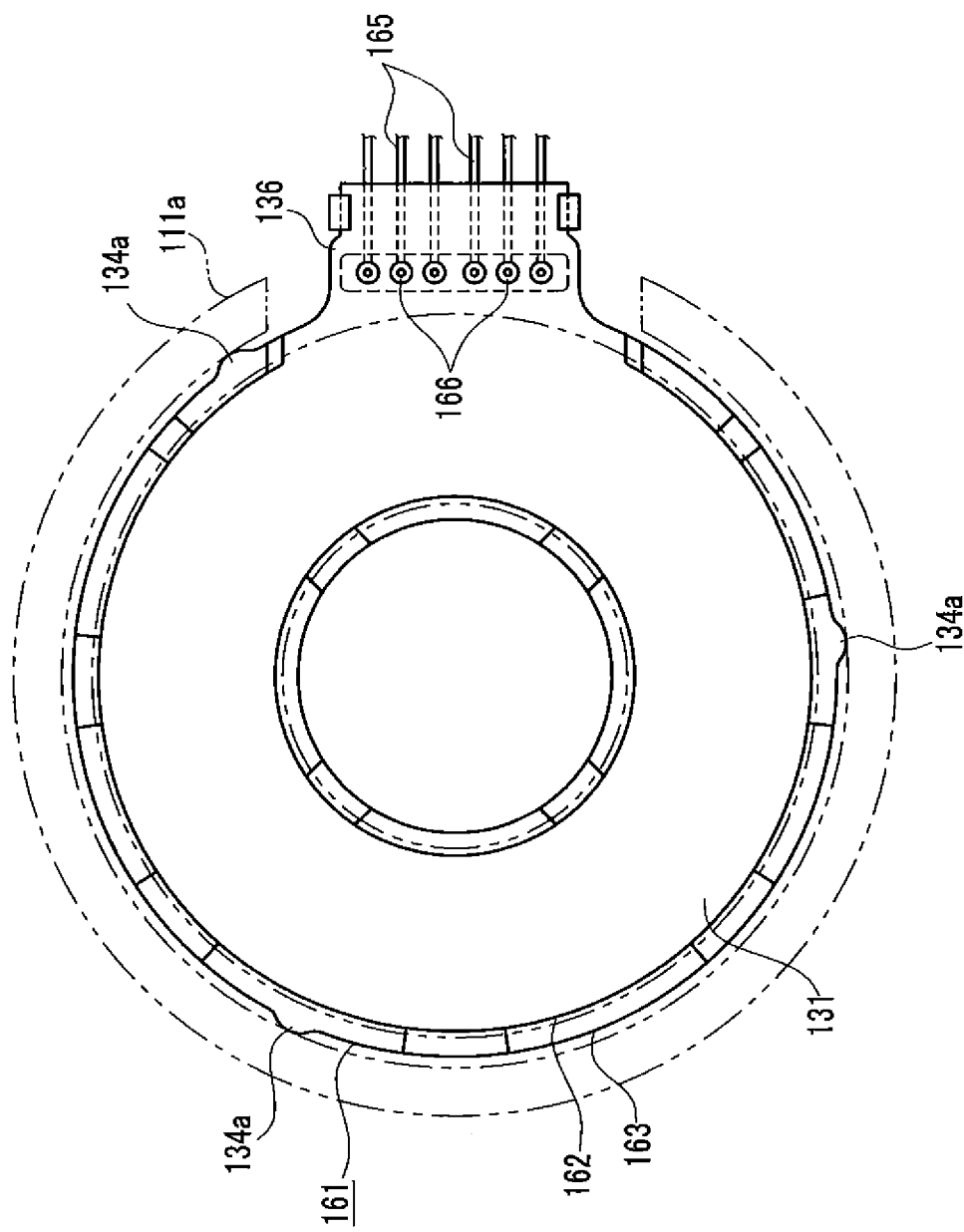
FIG. 78 is a plan view of a detection stator in a twenty-third embodiment.
Figure 79:
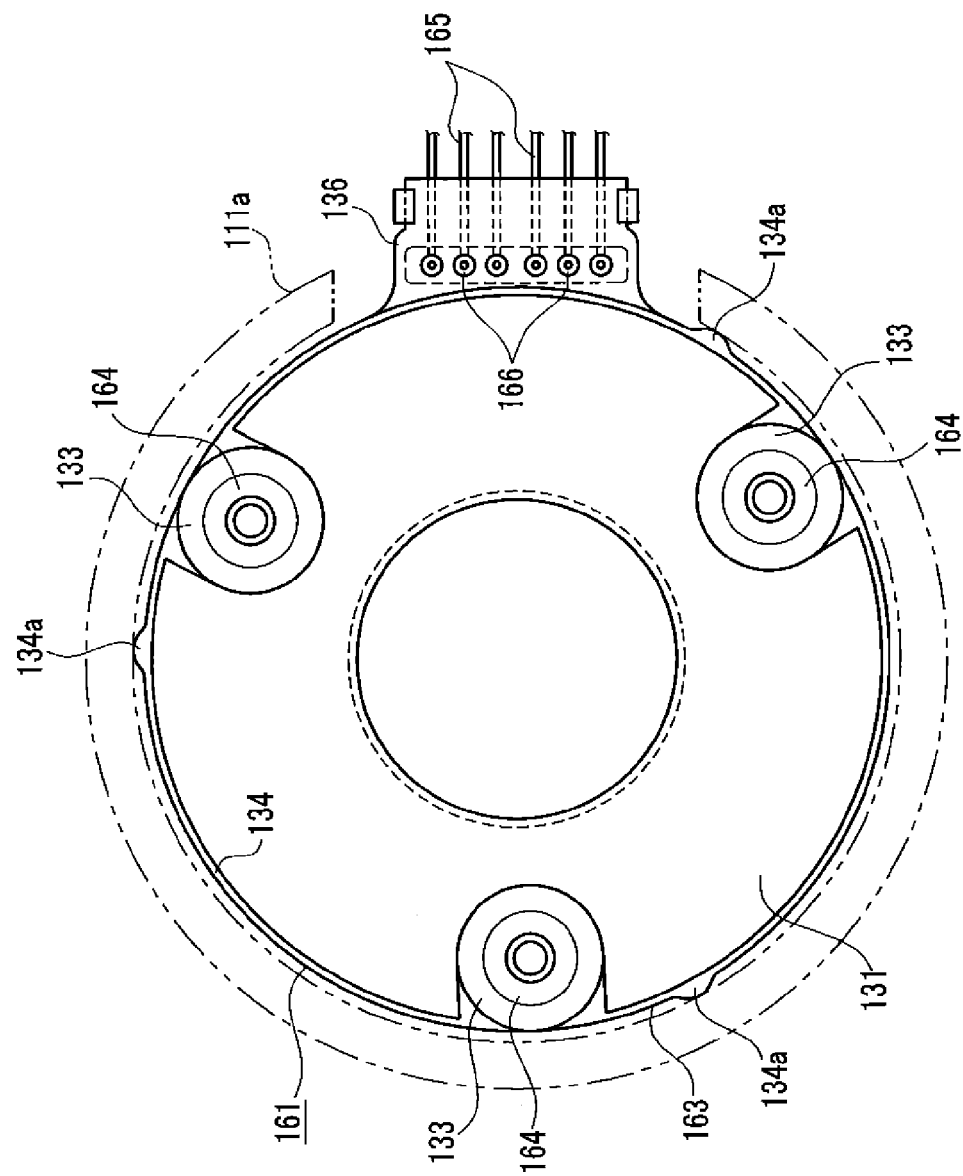
FIG. 79 is a bottom view of the detection stator in the twenty-third embodiment.
Figure 80:
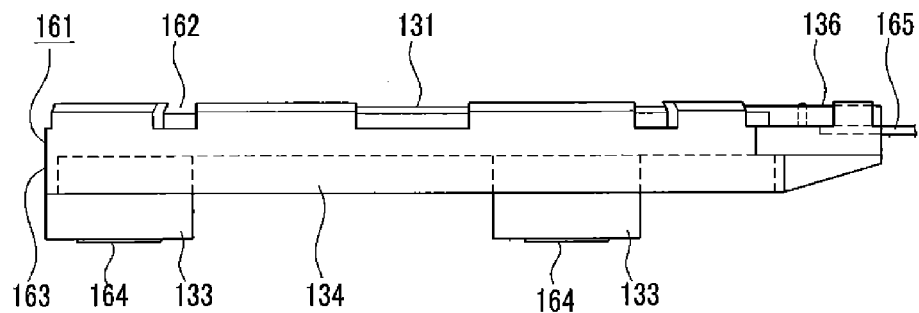
FIG. 80 is a front view of the detection stator in the twenty-third embodiment.
Figure 81:
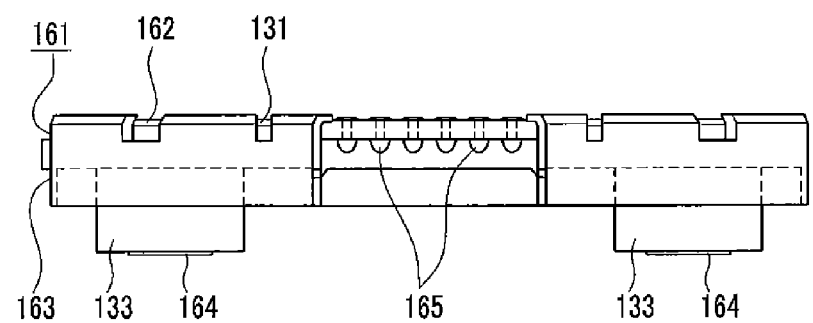
FIG. 81 is a right side view of the detection stator in the twenty-third embodiment.
Figure 82:
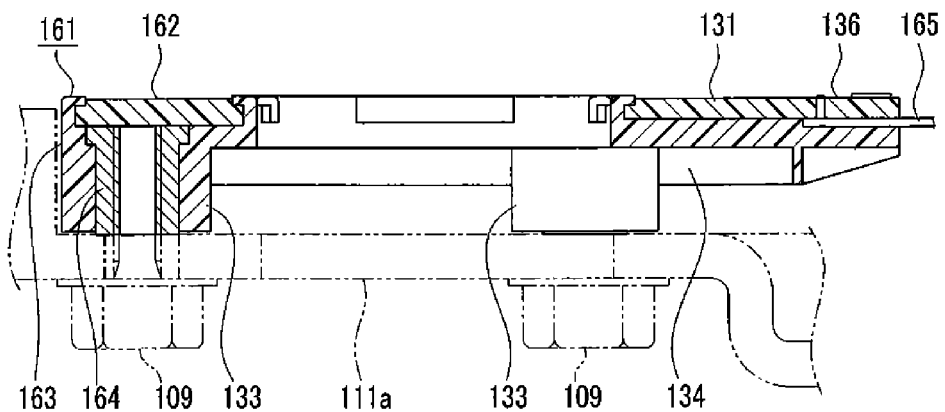
FIG. 82 is a front sectional view showing a mounting state of the detection stator to a housing part in the twenty-third embodiment.

FIG. 78 is a plan view of a detection stator 161 of the present embodiment. FIG. 79 is a bottom view of the detection stator 161 of the present embodiment. FIG. 80 is a front view of the detection stator 161 of the present embodiment. FIG. 81 is a right side view of the detection stator 161 of the present embodiment. FIG. 82 is a front sectional view showing a mounting state of the detection stator 161 to the housing part 111a in the present embodiment. The detection stator 161 of the present embodiment differs from those of the eighth through twenty-second embodiments in the following configuration. The detection stator 161 is configured as a two-body structure consisting of a coil substrate 162 integrally including a planar coil (not shown) and a holder 163 that holds the coil substrate 162. Between those coil substrate 162 and holder 163, a metal bush 164 or a terminal 165 is press-fitted or inserted as a tightening fitting. Then, the coil substrate 162 and the holder 163 are finally united by thermal caulking and snap-fitting.

Figure 83:
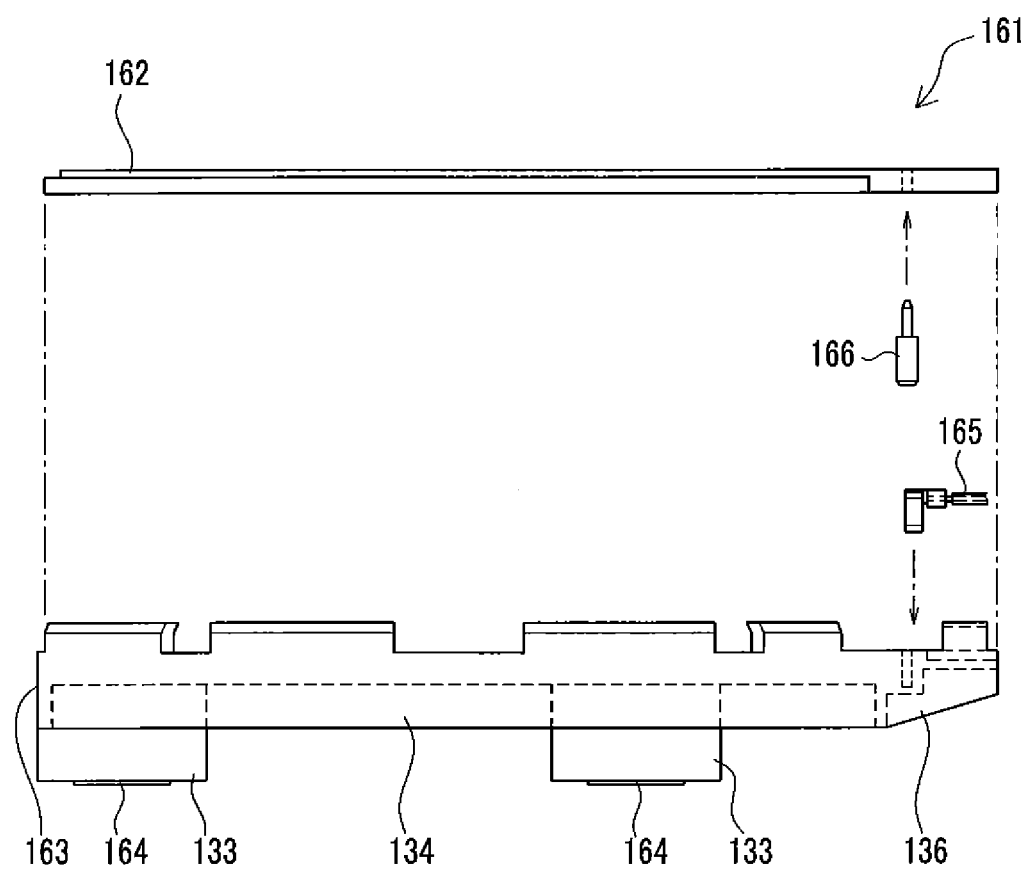
FIG. 83 is an exploded front view of the detection stator in the twenty-third embodiment.
Figure 84:
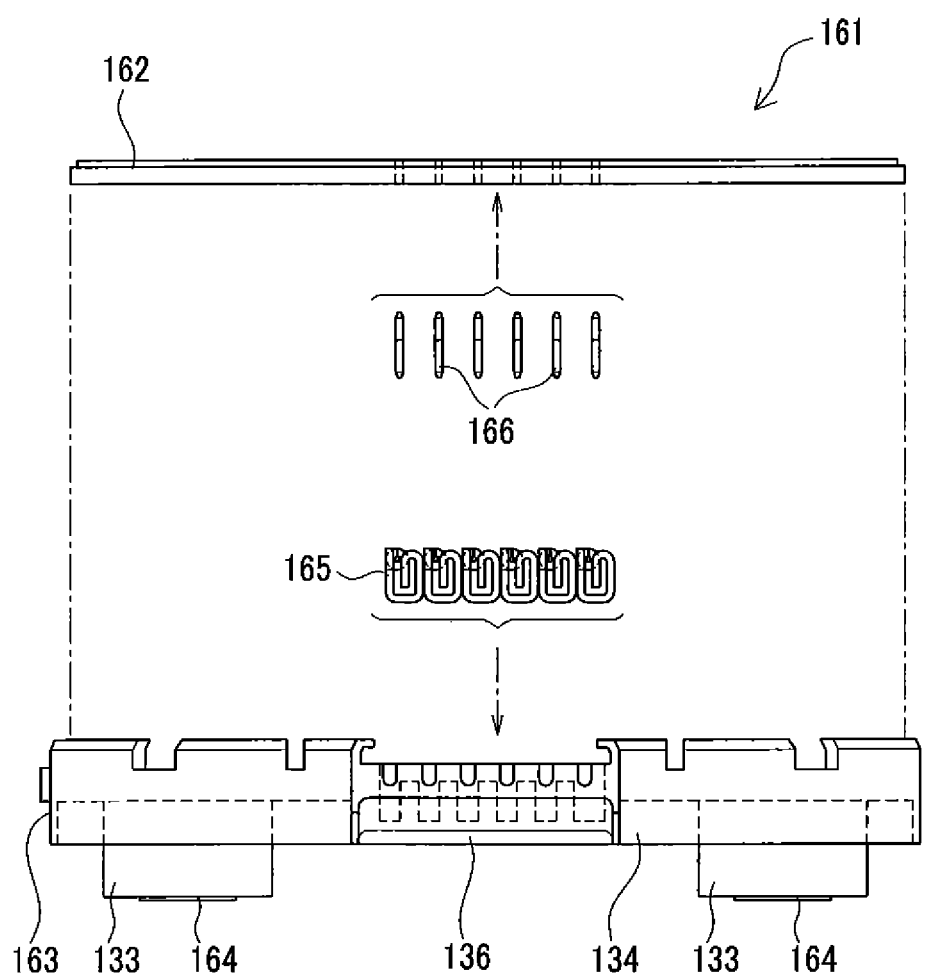
FIG. 84 is an exploded right side view of the detection stator in the twenty-third embodiment.

FIG. 83 is an exploded front view of the detection stator 161 of the present embodiment. FIG. 84 is an exploded right side view of the detection stator 161 of the present embodiment. For manufacturing the detection stator 161 of the present embodiment, the coil substrate 162 including the planar coil and the holder 163 are respectively molded of resin in advance as shown in FIGS. 83 and 84. In the present embodiment, the coil substrate 162 may be made of a material such as polyimide (PI) resin and the holder 163 may be made of a low-cost material such as nylon.

Thereafter, the terminal 165 and a terminal pin 166 are press-fitted or inserted between the coil substrate 162 and the holder 163 and then the coil substrate 162 and the holder 163 are united by thermal caulking and snap-fitting.

In the present embodiment, accordingly, since the coil substrate 162 forming the detection stator 161 is separately molded of resin, it can be formed in a thin, uniform, simple plate-like shape. This can easily achieve the parallelism of the surface on which the planar coil is to be provided. Further, the coil substrate 162 and the holder 163 have different functions and can be designed separately, so that their design freedoms are increased. In the case where the coil substrate 162 is made of PI resin, it is the same material as PI ink which is an insulation material of the planar coil. Thus, the joining strength resulting from sintering with the planar coil can be enhanced. As a result, one step of the printing process of the planar coil can be eliminated.

Other operations and effects in the present embodiment are substantially the same as those in the eighth embodiment.

Twenty-Fourth Embodiment

A twenty-fourth embodiment of a detection stator, a rotation detector and its mounting structure according to the invention will be explained in detail below referring to the accompanying drawings.

Figure 85:
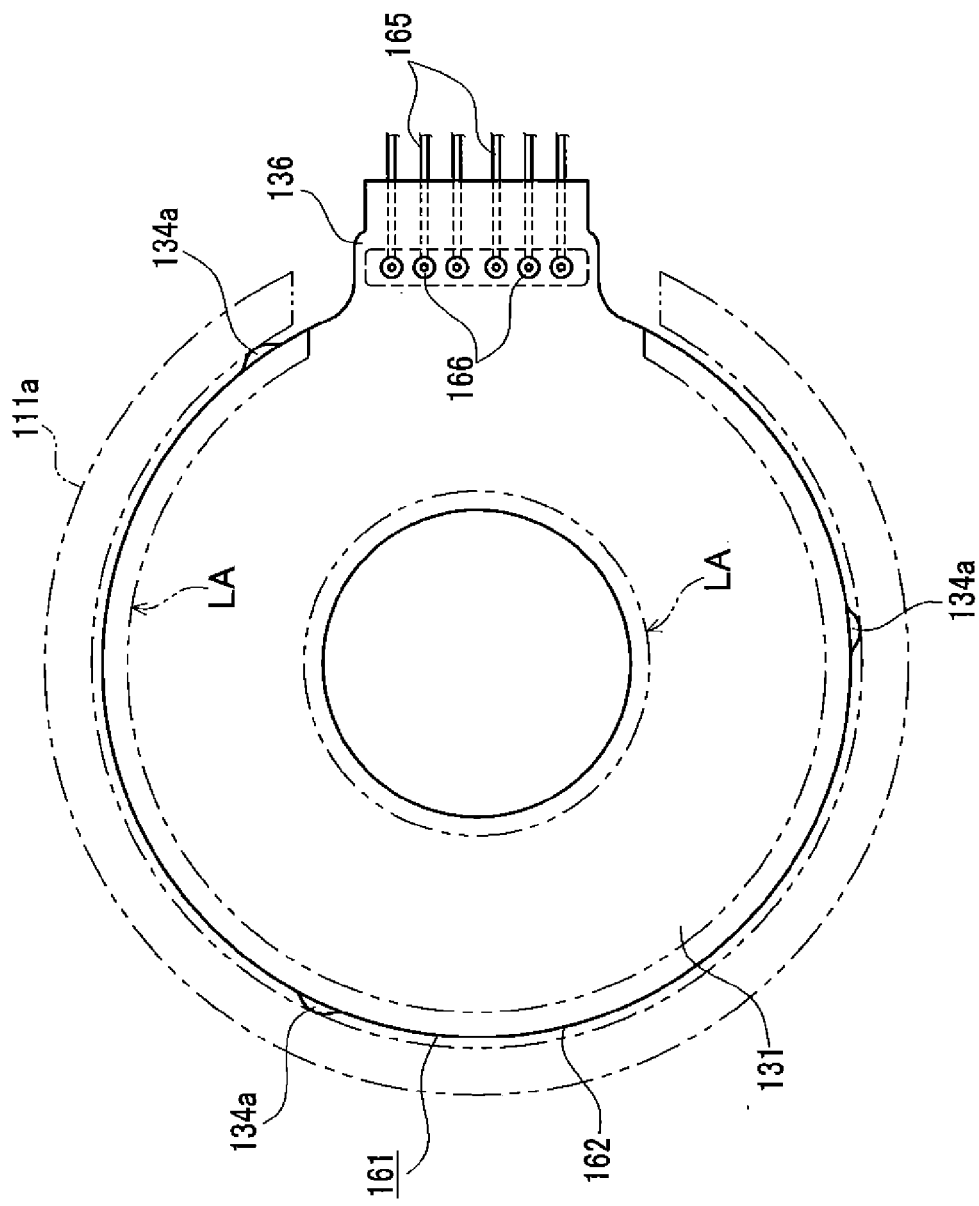
FIG. 85 is a plan view of a detection stator in a twenty-fourth embodiment.
Figure 86:
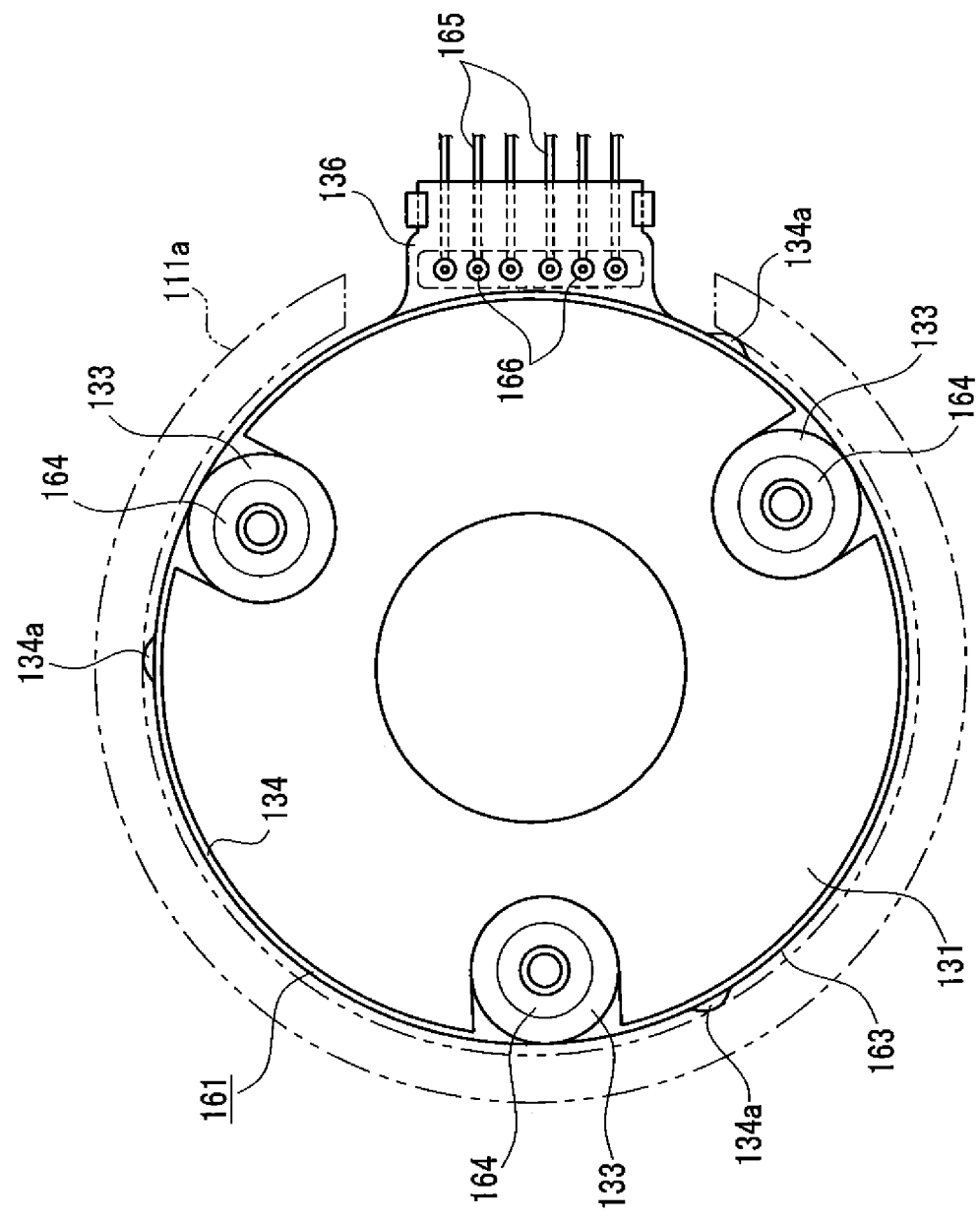
FIG. 86 is a bottom view of the detection stator in the twenty-fourth embodiment.
Figure 87:
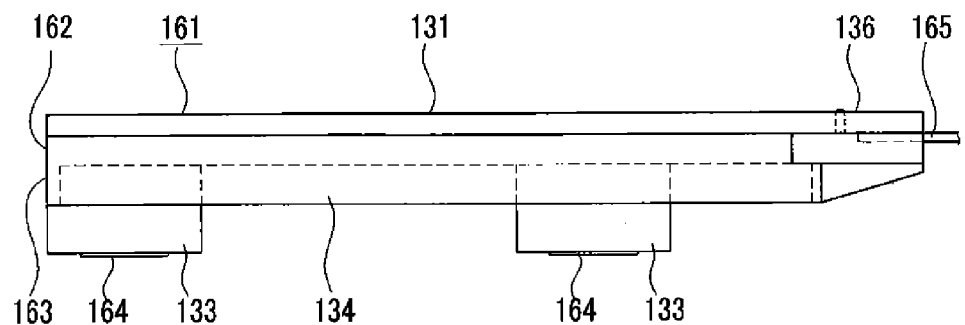
FIG. 87 is a front view of the detection stator in the twenty-fourth embodiment.
Figure 88:
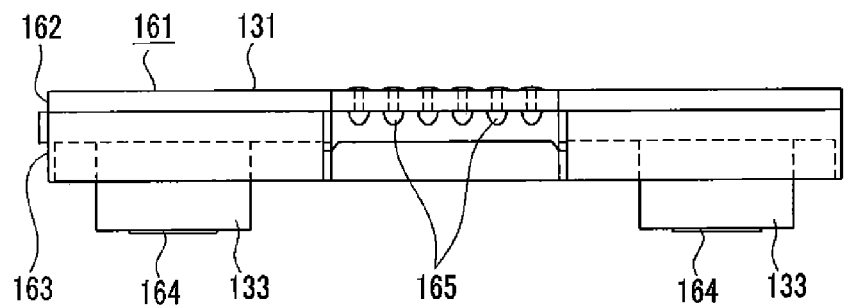
FIG. 88 is a right side view of the detection stator in the twenty-fourth embodiment.
Figure 89:
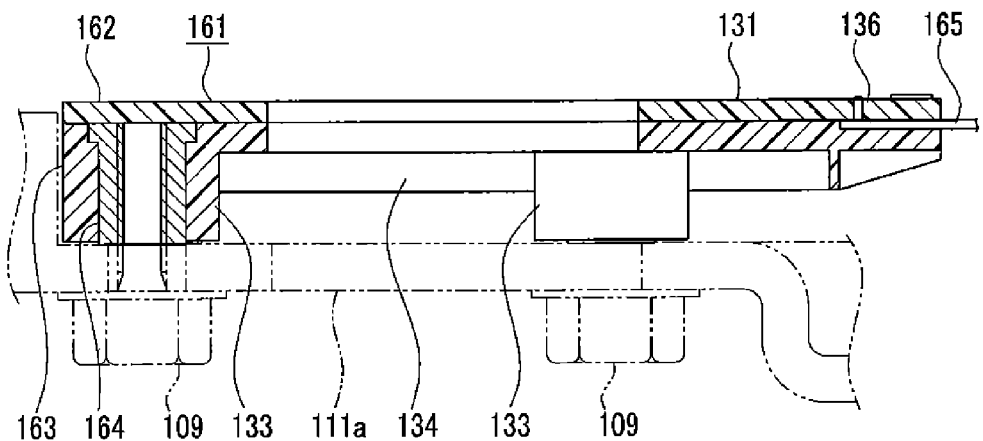
FIG. 89 is a front sectional view showing a mounting state of the detection stator to a housing part in the twenty-fourth embodiment.

FIG. 85 is a plan view of the detection stator 161 of the present embodiment. FIG. 86 is a bottom view of the detection stator 161 of the present embodiment. FIG. 87 is a front view of the detection stator 161 of the present embodiment. FIG. 88 is a right side view of the detection stator 161 of the present embodiment. FIG. 89 is a front sectional view showing a mounting state of the detection stator 161 to the housing part 111a in the present embodiment. The detection stator 161 of the present embodiment differs from those of the eighth through twenty-third embodiments in the following configuration. The detection stator 161 is configured as a two-body structure consisting of a coil substrate 162 integrally including a planar coil (not shown) and a holder 163 that holds the coil substrate 162. Between those coil substrate 162 and holder 163, a metal bush 164 or a terminal 165 are press-fitted or inserted as a tightening fitting. Then, the coil substrate 162 and the holder 163 are finally united by laser welding.

Figure 90:
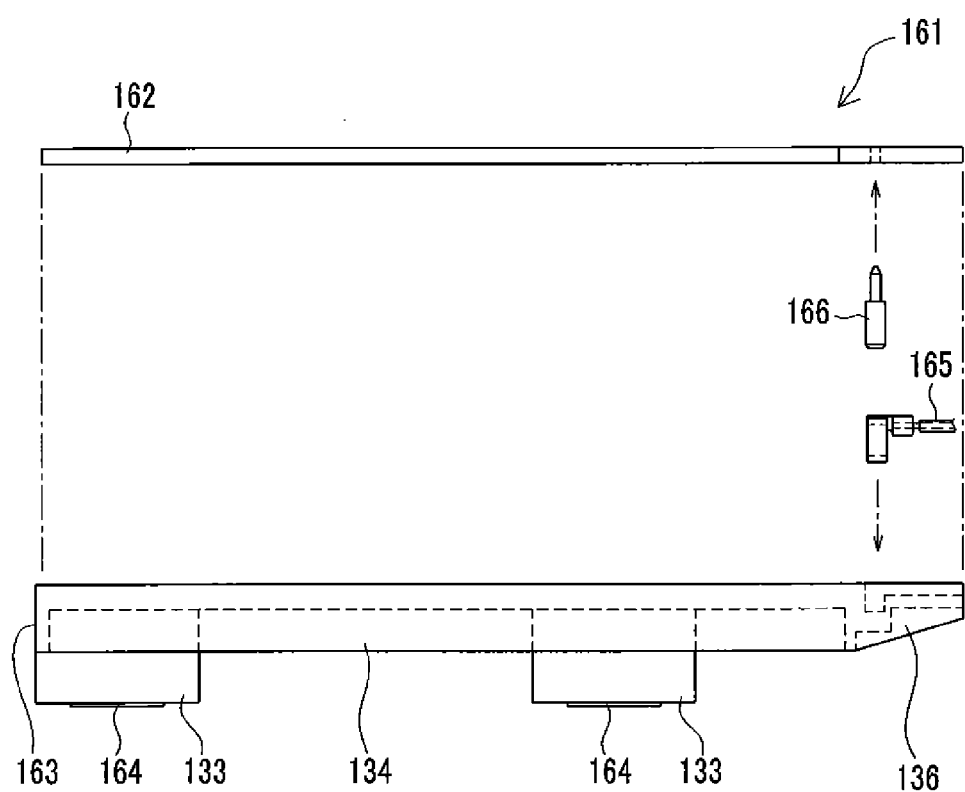
FIG. 90 is an exploded front view of the detection stator in the twenty-fourth embodiment.
Figure 91:
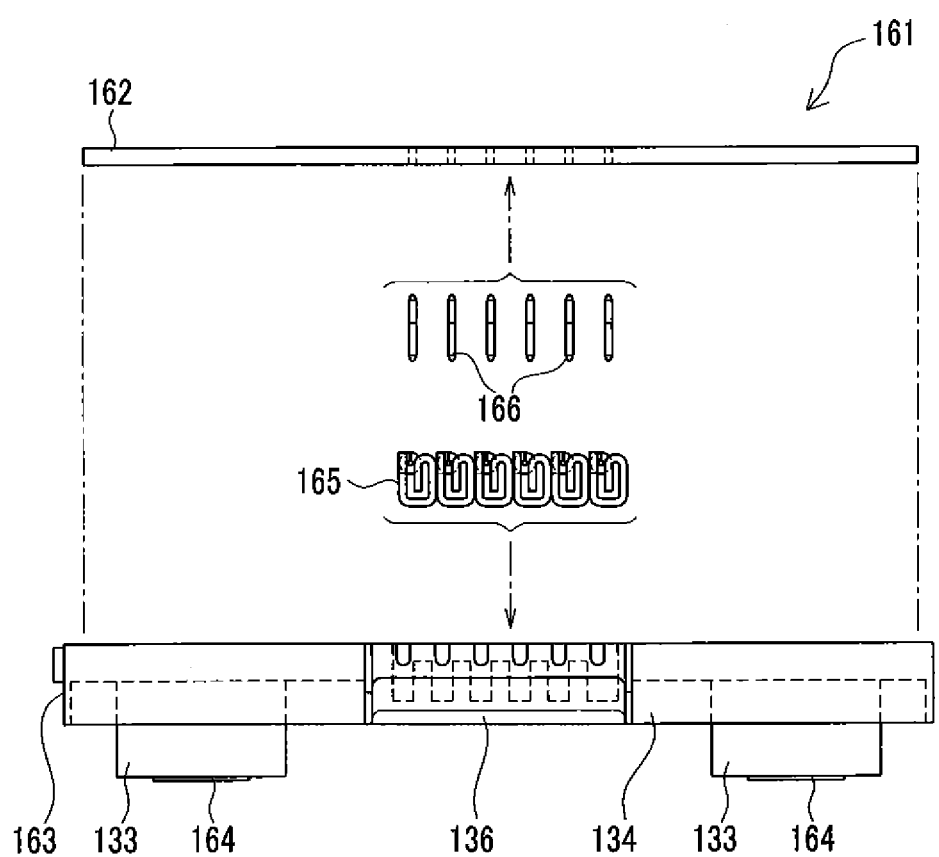
FIG. 91 is an exploded right side view of the detection stator in the twenty-fourth embodiment.

FIG. 90 is an exploded front view of the detection stator 161 of the present embodiment. FIG. 91 is an exploded right side view of the detection stator 161 of the present embodiment. For manufacturing the detection stator 161 of the present embodiment, the coil substrate 162 including a planar coil and the holder 163 are respectively molded of resin in advance as shown in FIGS. 90 and 91. In the present embodiment, the coil substrate 162 may be made of a material such as polyimide (PI) resin and the holder 163 may be made of a low-cost material such as nylon.

Thereafter, the terminals 165 and terminal pins 166 are press-fitted or inserted between the coil substrate 162 and the holder 163 and then the coil substrate 162 and the holder 163 are united by laser welding. A portion LA to be laser-welded is indicated by a chain double-dashed line in FIG. 85.

Since the coil substrate 162 and the holder 163 are welded to each other by laser in the present embodiment, it is consequently possible to join the coil substrate 162 and the holder 163 in a relatively short time. Other operations and effects in the present embodiment are substantially the same as those in the twenty-third embodiment.

The present invention is not limited to the above embodiments and may be embodied in other specific forms without departing from the essential characteristics thereof.

For instance, in the first through seventh embodiments, the detection rotor 7 is fitted and mounted on the shoulder 14b of the opening 14a of the rotary shaft 14. As an alternative, the detection rotor may be configured to be fitted over the end of the rotary shaft.

In the eighth through twenty-third embodiments, the detection rotor 107 is fitted and fixed on the outer periphery of the rotary shaft 14. As an alternative, the detection rotor may be configured to be mounted at the end of the rotary shaft.

Each of the above embodiments uses the detection rotor formed with the coil on the surface. However, the configuration of the detection rotor is not limited thereto. By the use of a detection rotor configured to include non-magnetic regions and magnetic regions alternately arranged so that a magnetic property changes cyclically in a circumferential direction, a rotation detector configured to use self-inductance changes of a coil provided in a detection stator or a rotation detector configured to have two coils in a detection stator and use mutual inductance changes between both coils (e.g., disclosed in JP 2011-099837A and JP 2011-137633A).

INDUSTRIAL APPLICABILITY

The present invention is available in detection of rotation of the rotary shaft of the motor.

While the presently preferred embodiment of the present invention has been shown and described, it is to be understood that this disclosure is for the purpose of illustration and that various changes and modifications may be made without departing from the scope of the invention as set forth in the appended claims.

DESCRIPTION OF THE REFERENCE SIGNS 1, 101 Rotation detector
2, 102 Motor
6, 8, 9, 106, 161 Detection stator
7, 10, 107 Detection rotor
11, 111 Motor housing
14, 114 Rotary shaft
18 Mounting hole
31, 131 Detection part
31a Bottom surface (Surface)
32 Outer peripheral wall
32a Protrusion
33 Flange
33a Elongated hole
35, 132 Planar coil
36 Collar
39 Screw (Fixing member)
109 Bolt (Fixing member)
111a Housing part
131a Surface
133 Fixing protrusion
133a Hole
134 Outer circumferential rib (Outer peripheral wall)
137, 164 Metal bush (Tightening fitting)
138 Cavity
138a Rib
144 Bolt (Tightening fitting)
145 Nut (Fixing member)
149, 150 Flanged bolt (Tightening fitting)

The invention claimed is:
1. A mounting structure of a rotation detector to a motor, the rotation detector including a detection stator and a detection rotor, wherein
the motor includes a rotary shaft and a motor housing internally housing the rotary shaft, the motor housing being provided with a mounting hole in a position corresponding to an end of the rotary shaft,
the detection rotor is fixed to the end of the rotary shaft,
the detection stator includes: a detection part made of resin in a plate-like shape, the detection part having a surface on which a planar coil is placed; an outer peripheral wall formed along an outer circumferential edge of the detection part and extending in an axial direction; and a flange extending from the outer peripheral wall in a radial direction,
the mounting structure includes a fixing member for fixing the detection stator to the motor housing, and
the detection stator is placed so that the surface of the detection part faces the detection rotor and the surface of the detection part faces an inside of the motor housing through the mounting hole, and the detection stator is fixed to the outside of the motor housing by the fixing member in the flange, wherein the detection stator includes a metal collar in the flange, the collar includes a hole, and the fixing member is screw mounted in the hole of the collar.

2. The mounting structure of rotation detector according to claim 1, wherein the metal collar is insert-molded in the flange.

3. The mounting structure of rotation detector according to claim 1, wherein the hole has an almost oblong shape in a plan view.

4. A mounting structure of a rotation detector to a motor, the rotation detector including a detection stator and a detection rotor, wherein the motor includes a rotary shaft and a motor housing internally housing the rotary shaft, the motor housing being provided with a mounting hole in a position corresponding to an end of the rotary shaft, the detection rotor is fixed to the end of the rotary shaft, the detection stator includes: a detection part made of resin in a plate-like shape, the detection part having a surface on which a planar coil is placed; an outer peripheral wall formed along an outer circumferential edge of the detection part and extending in an axial direction; and a flange extending from the outer peripheral wall in a radial direction, the mounting structure includes a fixing member for fixing the detection stator to the motor housing, and the detection stator is placed so that the surface of the detection part faces the detection rotor and the surface of the detection part faces an inside of the motor housing through the mounting hole, and the detection stator is fixed to the outside of the motor housing by the fixing member in the flange, wherein the detection stator is mounted to the motor housing in such a manner that the outer peripheral wall is inserted along an inner periphery of the mounting hole, and wherein the outer peripheral wall is provided with a plurality of protrusions that contact with the inner periphery of the mounting hole.

5. A rotation detector to be mounted to a motor for use, the rotation detector including a mounting structure, a detection stator and a detection rotor, wherein the motor includes a rotary shaft and a motor housing internally housing the rotary shaft, the motor housing being provided with a mounting hole in a position corresponding to an end of the rotary shaft, the detection rotor is configured to be fixed to the end of the rotary shaft of the motor, the detection stator includes: a detection part made of resin in a plate-like shape, the detection part having a surface on which a planar coil is placed; an outer peripheral wall formed along an outer circumferential edge of the detection part and extending in an axial direction; and a flange extending from the outer peripheral wall in a radial direction, the mounting structure includes a fixing member for fixing the detection stator to the motor housing, and the detection stator is placed so that the surface of the detection part faces the detection rotor and the surface of the detection part faces an inside of the motor housing through the mounting hole, and the detection stator is fixed to the outside of the motor housing by the fixing member in the flange, and wherein the detection stator is provided, on the outer peripheral wall, with a plurality of protrusions that contact the inner periphery of the mounting hole.

6. A detection stator to form a rotation detector in cooperation with a detection rotor, the detection stator including:

a detection part made of resin in a plate-like shape, having a surface on which a planar coil is placed;

an outer peripheral wall formed along an outer circumferential edge of the detection part and extending in an axial direction; and a flange extending from the outer peripheral wall in a radial direction, the detection part being placed with its surface facing the detection rotor, and fixed to a motor by a fixing member through the flange, wherein the outer peripheral wall is provided with a plurality of protrusions.

* * * * *